US010810103B2

(12) United States Patent
Lin et al.

(10) Patent No.: US 10,810,103 B2
(45) Date of Patent: Oct. 20, 2020

(54) METHOD AND SYSTEM FOR IDENTIFYING EVENT-MESSAGE TRANSACTIONS

(71) Applicant: VMware, Inc., Palo Alto, CA (US)

(72) Inventors: Junyuan Lin, Seattle, WA (US); Nicholas Kushmerick, Seattle, WA (US); Jon Herlocker, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 773 days.

(21) Appl. No.: 15/379,005

(22) Filed: Dec. 14, 2016

(65) Prior Publication Data

US 2018/0165173 A1  Jun. 14, 2018

(51) Int. Cl.
| | | |
|---|---|---|
| *G06F 16/00* | (2019.01) | |
| *G06F 11/34* | (2006.01) | |
| *G06F 11/30* | (2006.01) | |
| *G06F 16/25* | (2019.01) | |
| *G06F 16/28* | (2019.01) | |

(52) U.S. Cl.
CPC ......... *G06F 11/3476* (2013.01); *G06F 11/30* (2013.01); *G06F 11/3006* (2013.01); *G06F 16/258* (2019.01); *G06F 16/285* (2019.01); *G06F 2201/835* (2013.01); *G06F 2201/86* (2013.01)

(58) Field of Classification Search
CPC .. G06F 11/3476; G06F 16/285; G06F 16/258; G06F 11/30; G06F 11/3006; G06F 2201/835; G06F 2201/86
See application file for complete search history.

(56) References Cited

U.S. PATENT DOCUMENTS

| | | | | |
|---|---|---|---|---|
| 5,469,463 A | * | 11/1995 | Polich | G06F 11/2257 706/916 |
| 8,079,081 B1 | * | 12/2011 | Lavrik | H04L 41/069 709/223 |
| 8,332,690 B1 | * | 12/2012 | Banerjee | G06F 11/0793 714/26 |
| 8,850,263 B1 | * | 9/2014 | Yourtee | G06F 11/0709 714/20 |
| 9,465,684 B1 | * | 10/2016 | Carter | G06F 11/0766 |
| 2009/0113246 A1 | * | 4/2009 | Sabato | G06F 11/0769 714/37 |
| 2011/0185234 A1 | * | 7/2011 | Cohen | G06F 16/285 714/37 |
| 2012/0191638 A1 | * | 7/2012 | Li | G06N 5/025 706/48 |
| 2013/0080367 A1 | * | 3/2013 | Tonouchi | G06N 5/02 706/46 |
| 2014/0380105 A1 | * | 12/2014 | Michel | G06F 11/0769 714/57 |

(Continued)

FOREIGN PATENT DOCUMENTS

WO  WO-2014043623 A1 *  3/2014  ............ G06F 11/008

*Primary Examiner* — Jared M Bibbee

(57) ABSTRACT

The current document is directed to methods and systems that process, classify, efficiently store, and display large volumes of event messages generated in modern computing systems. In a disclosed implementation, event messages are assigned types and transformed into event records with well-defined fields that contain field values. Recurring patterns of event messages, referred to as "transactions," are identified within streams or sequences of time-associated event messages and streams or sequences of time-associated event records.

20 Claims, 77 Drawing Sheets

(56) References Cited

U.S. PATENT DOCUMENTS

| | | | |
|---|---|---|---|
| 2015/0067410 A1* | 3/2015 | Kumar | G06F 11/004 714/47.3 |
| 2015/0143182 A1* | 5/2015 | Rajamanickam | G06F 11/0781 714/48 |
| 2018/0113773 A1* | 4/2018 | Krishnan | G06F 11/0706 |

* cited by examiner

```
2013-12-02T10:44:24.095Z li-qe-esx5.vmware.com Rhttpproxy:
[28959B90 verbose 'Proxy Req 46691'] Connected to
localhost:8307 ———— 1212                        1206
```
```
2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)
```
```
2013-12-02T10:44:24.093Z li-qe-esx5.vmware.com Rhttpproxy:
[2889B90 verbose 'Proxy Req 46685'] The client closed the
stream, not unexpectedly.
```
```
Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -
```
```
2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback
```
```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd
```
```
2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```
```
2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59
```
```
2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'
```
```
2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)
```
```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction
```

FIG. 12

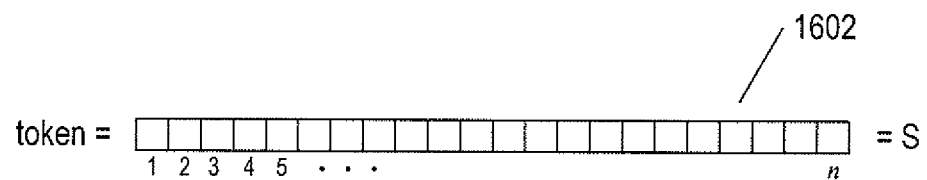
$$1604 \begin{cases} A_1 = & 1 \oplus S_1 \\ B_1 = & A_1 \\ \\ A_2 & A_1 \oplus S_2 \\ B_2 & B_1 \oplus A_2 \\ \\ A_3 & A_2 \oplus S_3 \\ B_3 & B_2 \oplus A_3 \\ \vdots \\ A_n = & A_{n-1} \oplus S_n \\ B_n = & B_{n-1} \oplus A_n \end{cases}$$
where $x \oplus y = (x+y) \bmod 65521$
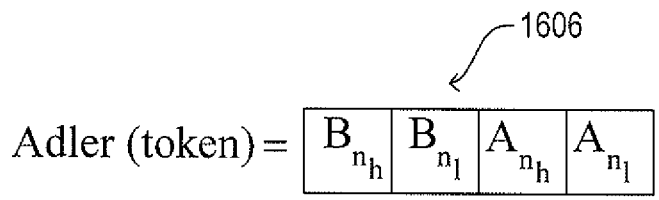
FIG. 16

$$\mathbf{u} = \boxed{u_1 | u_2 | u_3 | u_4 | u_5 | \cdots | u_n}$$

$$\mathbf{v} = \boxed{v_1 | v_2 | v_3 | v_4 | v_5 | \cdots | v_n}$$

$$\mathbf{u} - \mathbf{v} = \boxed{u_1-v_1 | u_2-v_2 | u_3-v_3 | u_4-v_4 | u_5-v_5 | \cdots | u_n-v_n}$$

FIG. 18A $$\mathbf{u} \cdot \mathbf{v} = \boxed{u_1 | u_2 | u_3 | u_4 | u_5 | \cdots | u_n} \times \boxed{v_1 | v_2 | v_3 | v_4 | v_5 | \cdots | v_n} = u_1 v_1 + u_2 v_2 + u_3 v_3 + \ldots u_n v_n$$

FIG. 18B $$f_i(\mathbf{T}) = \underset{j}{\arg\max}\left(\left[P_i * \text{Adler}(\mathbf{t}_j) + Q_i\right] \mod \text{0xffffffff}\right)$$

1904 — $\mathbf{T} = (\text{xServer}, 36\text{-A-}102, \text{NIC}, \text{transmission}, \text{failure})$ 1906 —
$\begin{cases} h_1 = P_i * \text{Adler}(\text{"xServer"}) + Q_i \\ h_2 = P_i * \text{Adler}(\text{"36-A-102"}) + Q_i \\ h_3 = P_i * \text{Adler}(\text{"NIC"}) + Q_i \\ h_4 = P_i * \text{Adler}(\text{"transmission"}) + Q_i \\ h_5 = P_i * \text{Adler}(\text{"feature"}) + Q_i \end{cases}$ 1908 — $f_i(\mathbf{T}) = \underset{j}{\arg\max}(h_j)$

FIG. 19

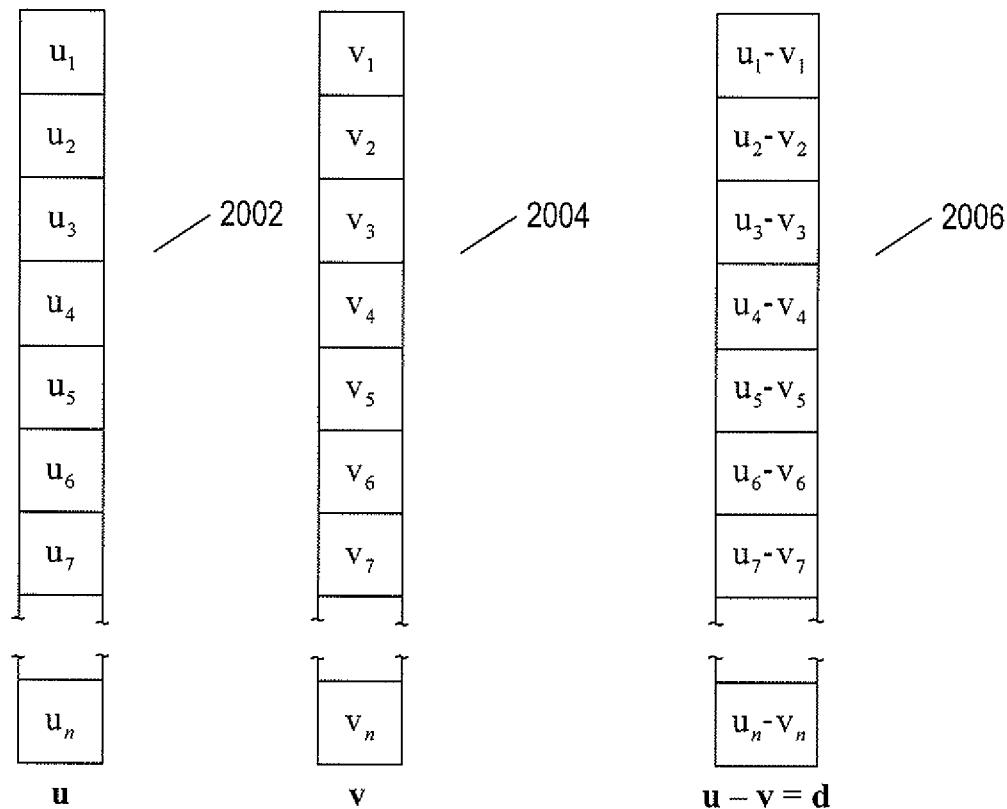
when $u_i = v_i$, $u_i - v_i = 0$
otherwise $u_i - v_i \neq 0$
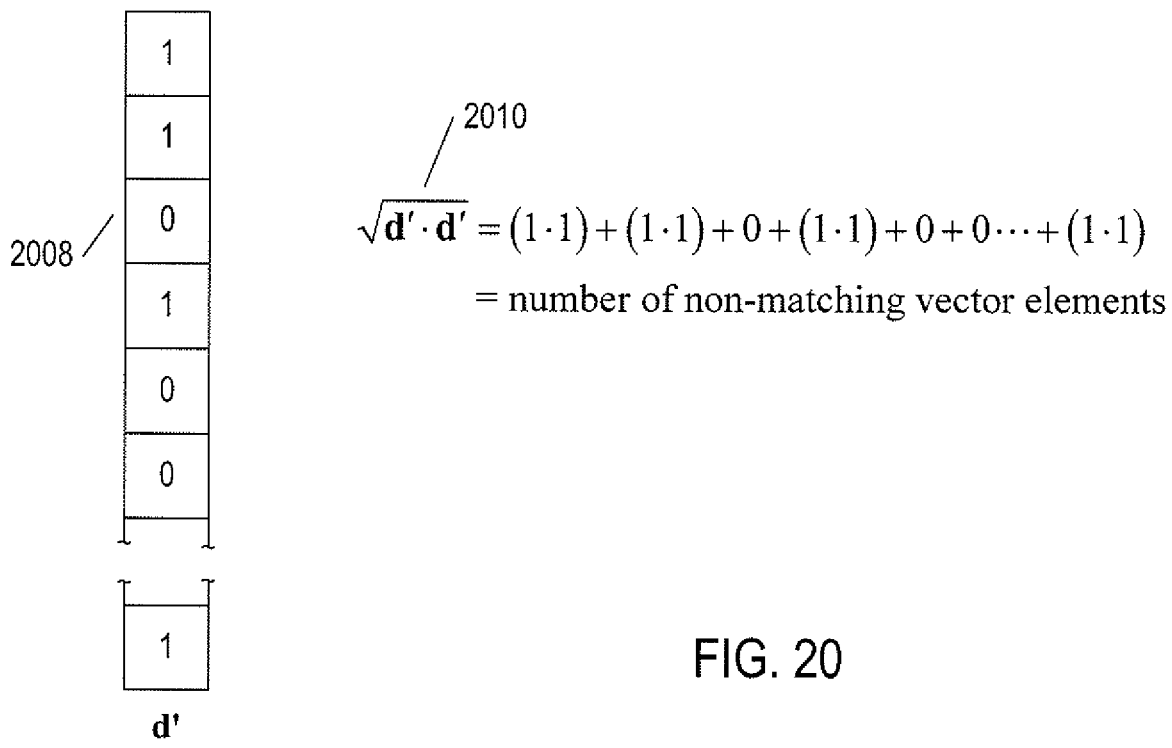
$$\sqrt{\mathbf{d}' \cdot \mathbf{d}'} = (1 \cdot 1) + (1 \cdot 1) + 0 + (1 \cdot 1) + 0 + 0 \cdots + (1 \cdot 1)$$
= number of non-matching vector elements
FIG. 20

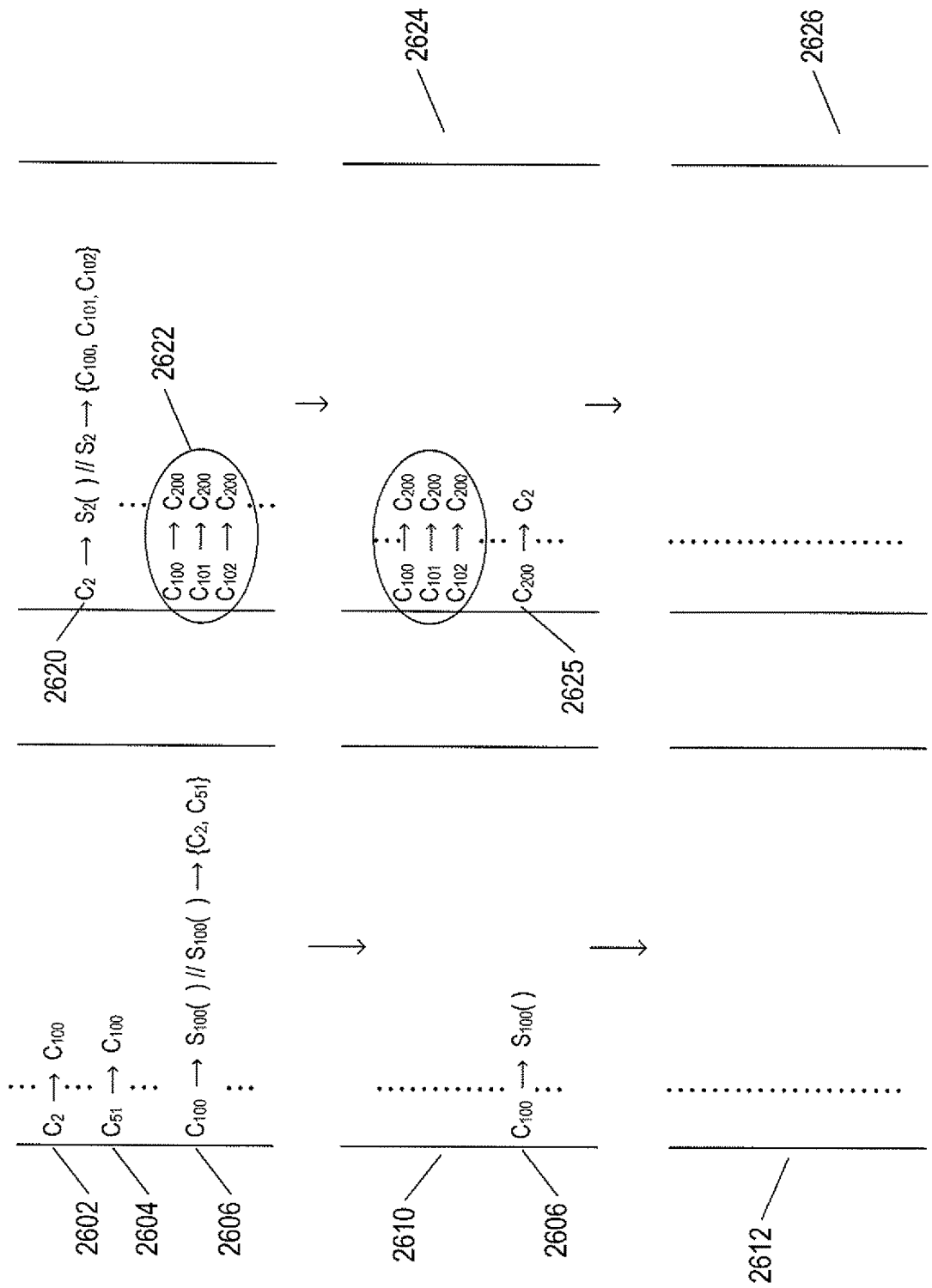

| | Date | Regular Expression |
|---|---|---|
| ① | Dec 13 2014 | (Jan\|Feb\|Mar\|Apr\|May\|Jun\|Jul\|Aug\|Sep\|Oct\|Nov\|Dec)\s [0-3]?\d 20\d\d |
| ② | 12/13/2014 | (0\|1)?\d-[0-3]?\d/20\d\d |
| ③ | December 13, 2014 | (January\|February\|March\|April\|May\|June\|July\|August\|September\|October\|November\|December)\s[0-3]?\d,20\d\d |
| ④ | 12-13-14 | (0\|1)?\d-[0-3]?\d-\d\d |
| ⑤ | 13 Dec 2014 | [0-3]?\d\s(Jan\|Feb\|Mar\|Apr\|May\|Jun\|Jul\|Aug\|Sep\|Oct\|Nov\|Dec)\s20\d\d |
| ⑥ | 13 December, 2014 | [0-3]?\d\s(January\|February\|March\|April\|May\|June\|July\|August\|September\|October\|November\|December),20\d\d |

FIG. 27A

① and ③

(Jan|January|Feb|February|Mar|March|Apr|April|May|Jun|June|Jul|July|Aug|August|Sep|September|Oct|October|Nov|November|Dec|December) \s [0-3]? \d,? 20 \d\d
/ 2720

FIG. 27B

①, ②, and ③, ((Jan|January|Feb|February|Mar|March|Apr|April|May|Jun|June|Jul|July|Aug|August|Sep|September|Oct|October|Nov|November|Dec|December)|(0|1)?\d))(\s|/) [0-3]? \s|/),? 20 \d\d
/ 2724

Regular Expression ⟶ NFA ⟶ DFA ⟶ computer routine
/ 2732        / 2734   / 2736      / 2738
          / 2742      / 2746     / 2740 num find (RegularExpression $r$, string $s$, int* positions);
                                  / 2744  / 2748

Example:
         / 2758
2750 /   $r$ = "\d\d\d";
         $s$ = | E | r | r | o | r | : | | 1 | 6 | 7 | | D | e | v | i | c | | | F | a | i | l | u | r | e | : | | N | | | C | | | 1 | 6 | 3 | B | | 1 | 4 | A | 6 | 7 | | 8 | F | A | | 0 |
         positions = |-1|-1|-1|-1|-1|-1|  |-1|-1|-1|
         $num$ = find($r$, $s$, positions);
         $num$ = 2  / 2754
         positions = | 7 | 31 |-1|
                           / 2756

$p$ = non-digit input character
$d$ = digit input character

FIG. 27D

| Date Type | Regular Expression |
|---|---|
| date | |
| date | |
| date | |
| date | |
| date | |
| time | |
| time | |
| time | |
| time | |
| IPv4 | |
| IPv4 | |
| IPv4 | |
| IPv4 | |
| MAC | |
| MAC | |
| real number | |
| signed integer | |
| integer | |

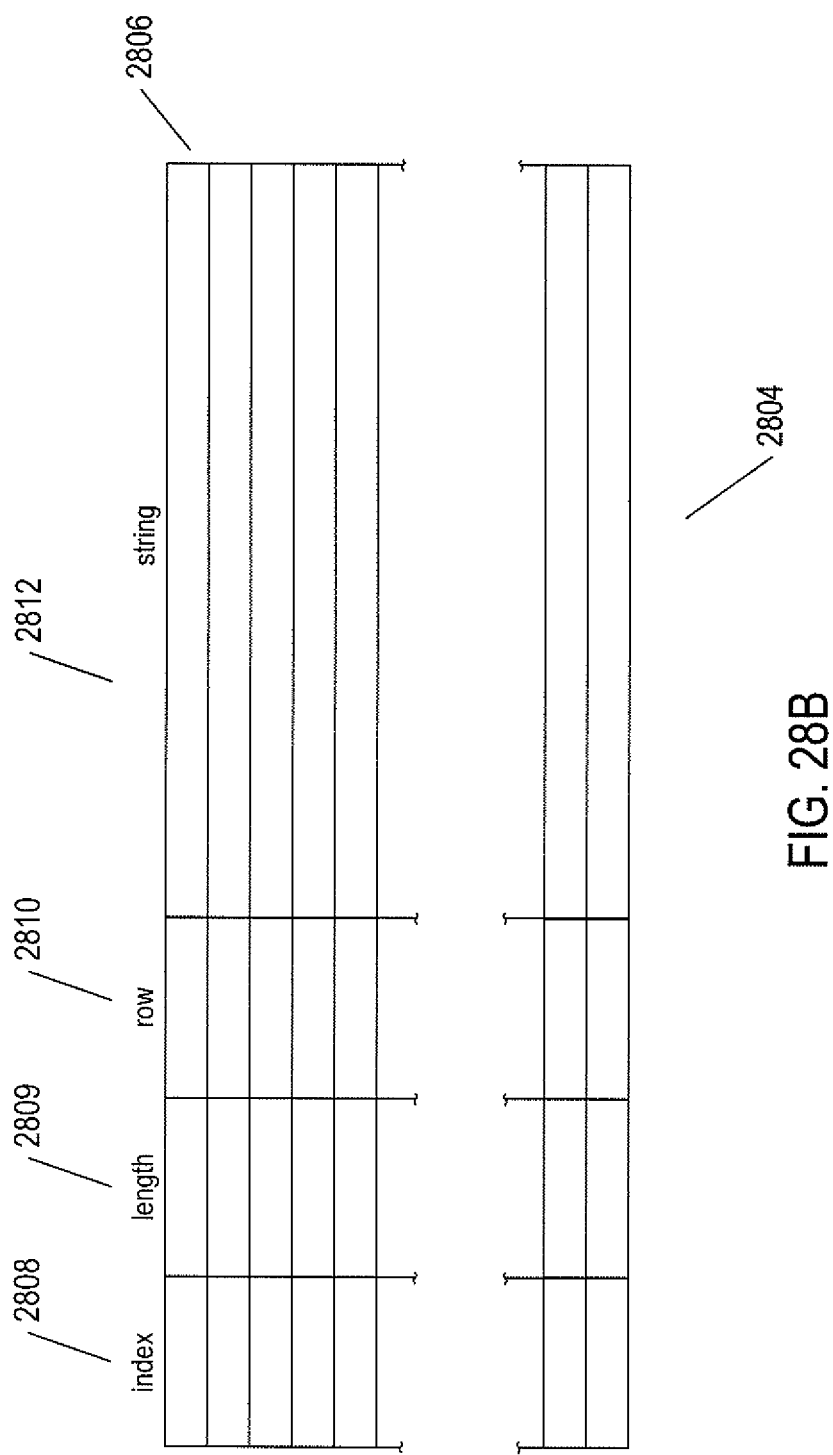

2902 — Error http://abc returned 501
2903 — Error https://pqr returned 501
2904 — Error http://abc returned 404
2905 — Error https://pqr returned 404

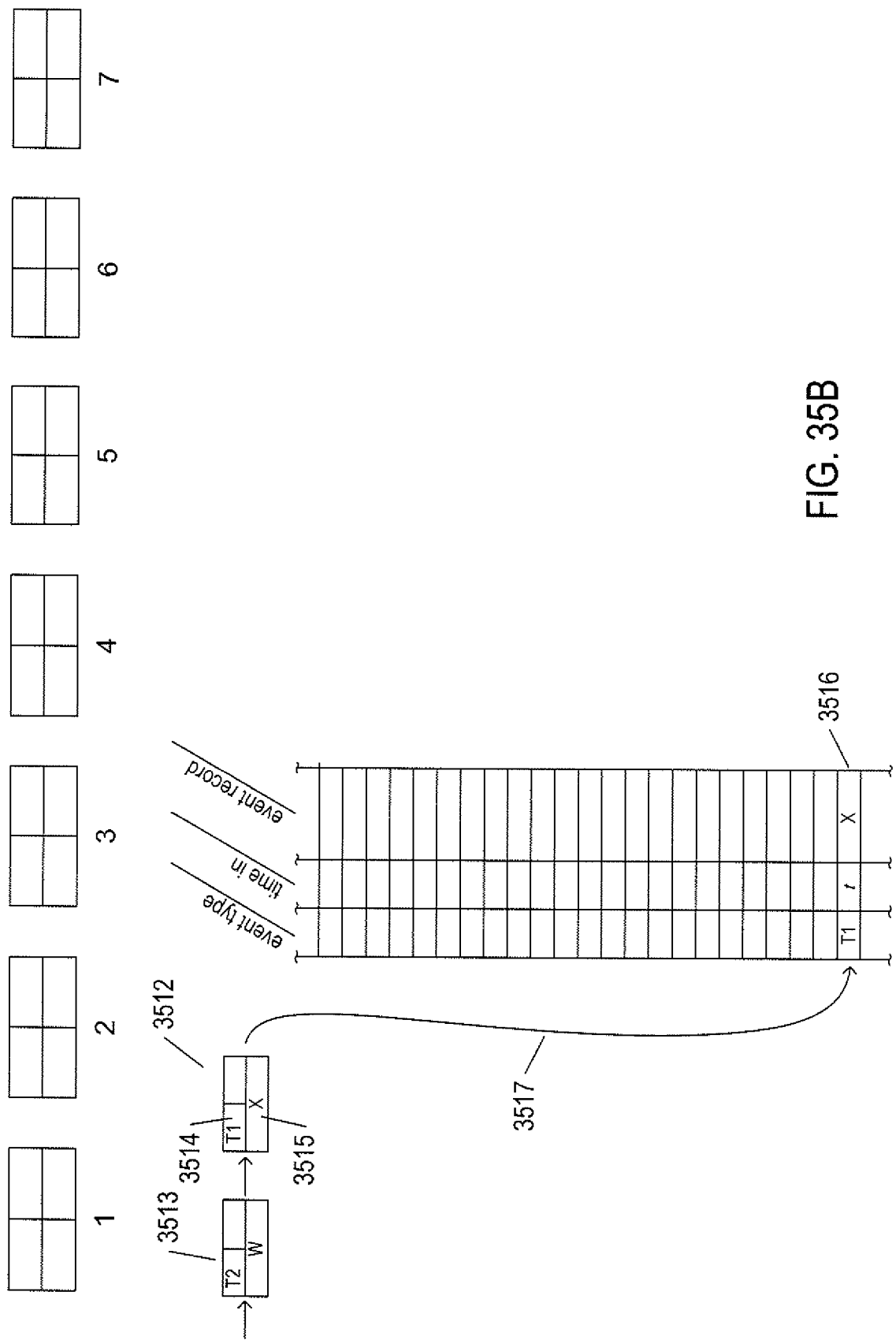

METHOD AND SYSTEM FOR IDENTIFYING EVENT-MESSAGE TRANSACTIONS

TECHNICAL FIELD

The current document is directed to event logging and event-log interpretation in complex computing systems and, in particular, to methods and systems that process event messages in order to type the event message, transform the event messages into event records, and identify related event-message types and event-message transactions within event-message streams, event-record streams, and event logs.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies.

It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems. System administrators, maintenance personnel, and other users of event messages continue to seek new automated methods and subsystems to facilitate using event logs to detect and diagnose operational anomalies and to administer, manage, and maintain distributed computer systems.

SUMMARY

The current document is directed to methods and systems that process, classify, efficiently store, and display large volumes of event messages generated in modern computing systems. In a disclosed implementation, event messages are assigned types and transformed into event records with well-defined fields that contain field values. Recurring patterns of event messages, referred to as "transactions," are identified within streams or sequences of time-associated event messages and streams or sequences of time-associated event records.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIGS. 15-20 illustrate one implementation of the logic used by an event-message-clustering system to compute a metric for a received event message that allows the event message to be assigned to a particular existing cluster.

FIGS. 26A-C illustrate examples of editing of the redirection-rule table.

FIG. 27A illustrates regular expressions corresponding to various types of formats in which dates may be encoded in event messages.

FIG. 27B illustrates construction of generalized regular expressions that identify two or more types of date formats.

FIG. 27C illustrates an example of the use of regular expressions in text processing.

FIG. 27D shows a representation of the deterministic finite automata 2760 corresponding to the regular expression 2750 in the example shown in FIG. 27C.

FIGS. 28A-B illustrate implementation of a regular-expression-based variable-finding subsystem.

FIGS. 35A-H illustrate a counter-based method, incorporated into various event-record-processing subsystems, that monitors event-message-type co-occurrences, with respect to time, in order to establish event-message-type time correlations, from which certain types of transactions can be inferred.

DETAILED DESCRIPTION

Figure 1:
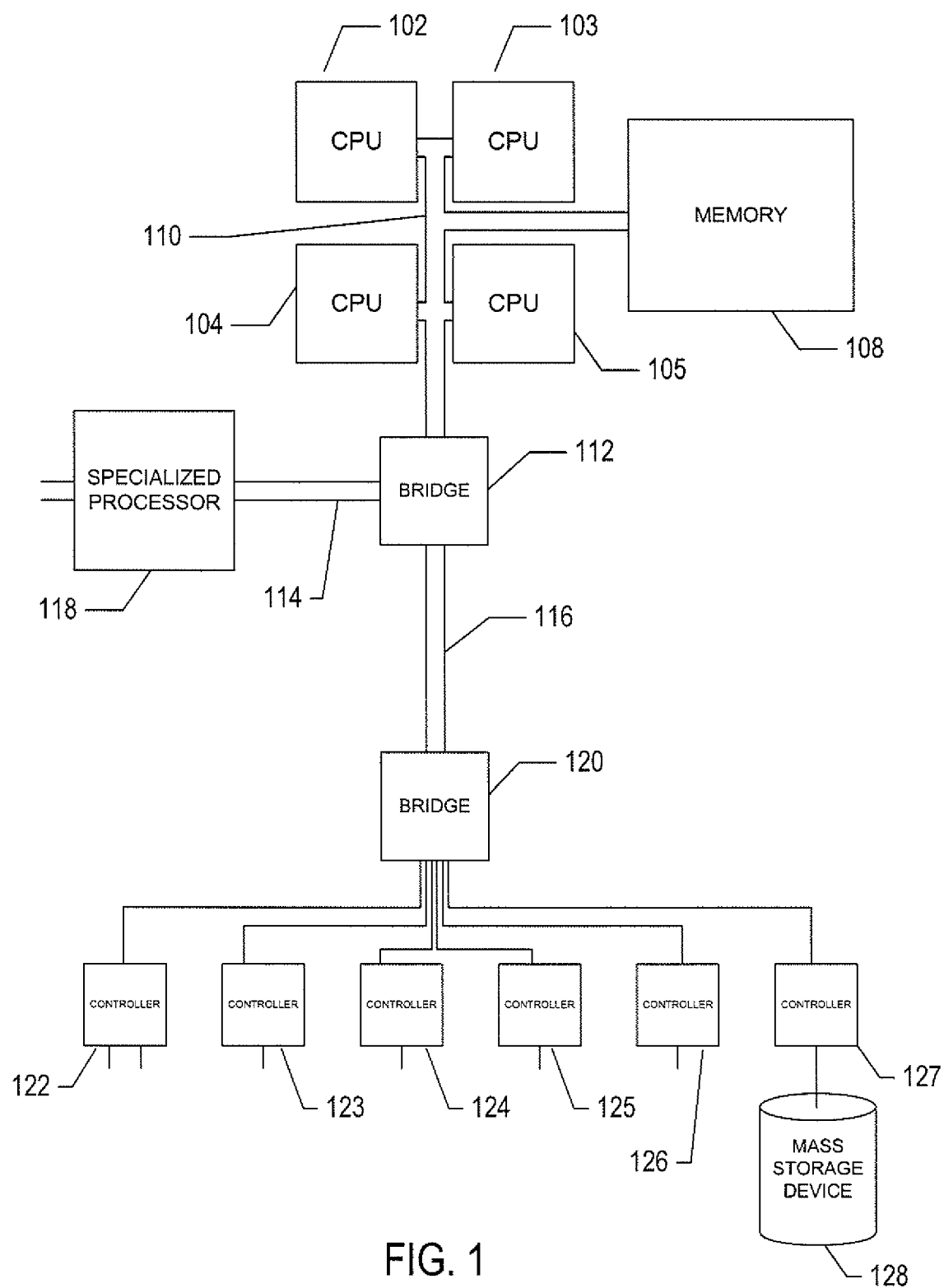
FIG. 1 provides a general architectural diagram for various types of computers.

The current document is directed to methods and systems that identify transactions in streams and sequences of event messages and event records. In a first subsection, below, a detailed description of computer hardware, complex computational systems, and virtualization is provided with reference to FIGS. 1-10. In a second subsection, methods and systems that process, classify, and efficiently store event messages are discussed with reference to FIGS. 11-33B. In a final subsection, methods and systems that identify and display event-message transactions in streams and sequences of event messages and in streams and sequences of event records are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
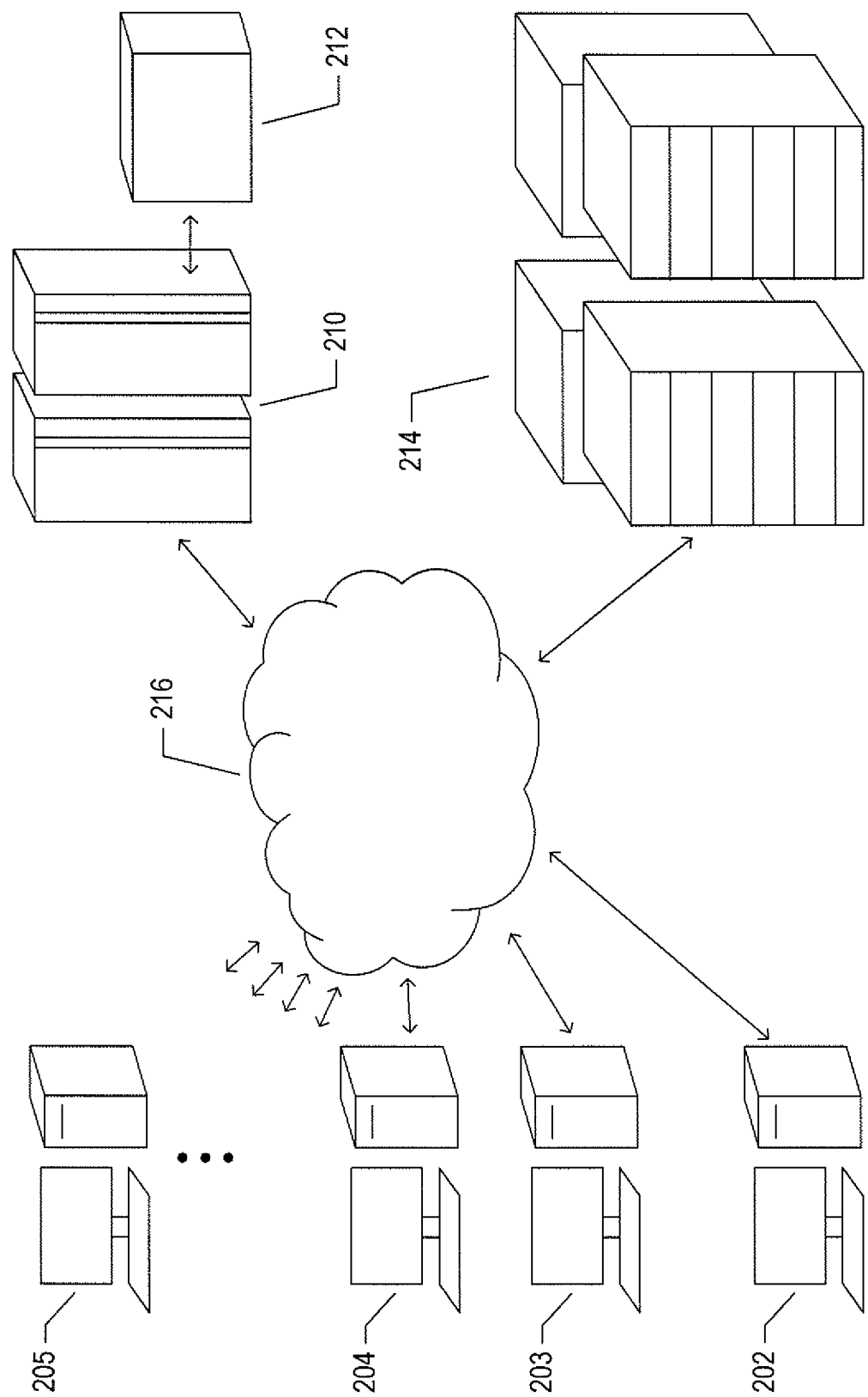
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
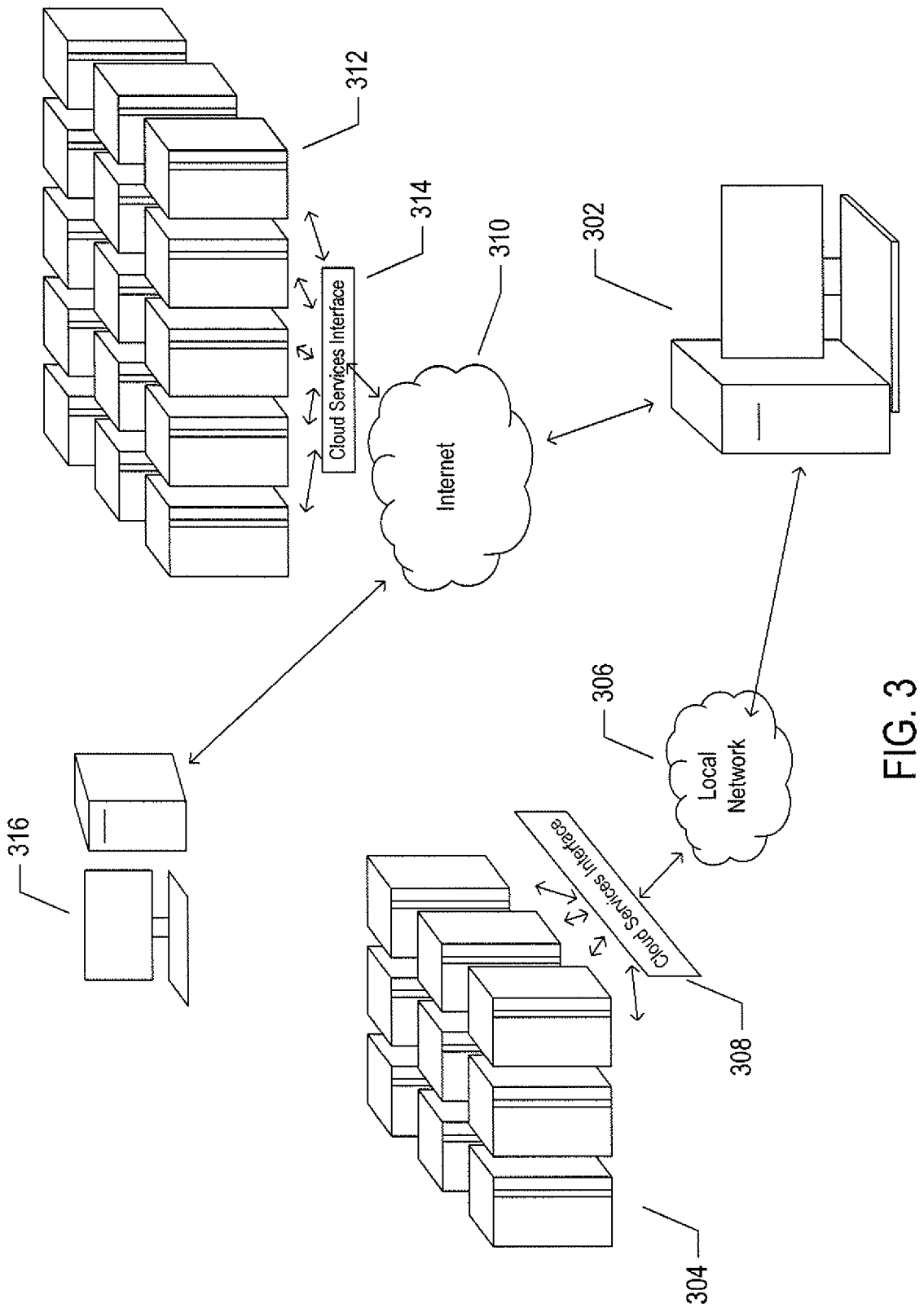
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
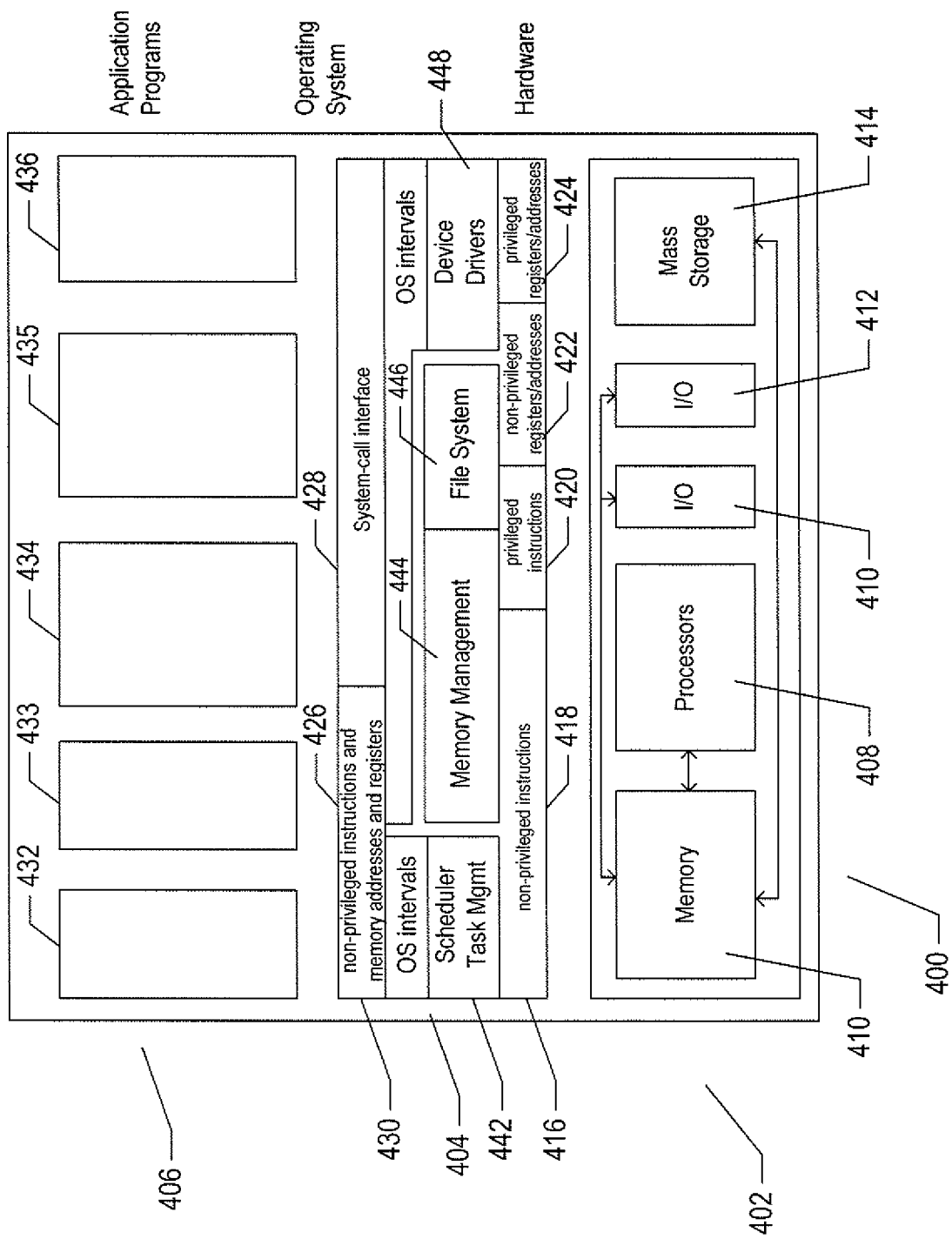
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406.

The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
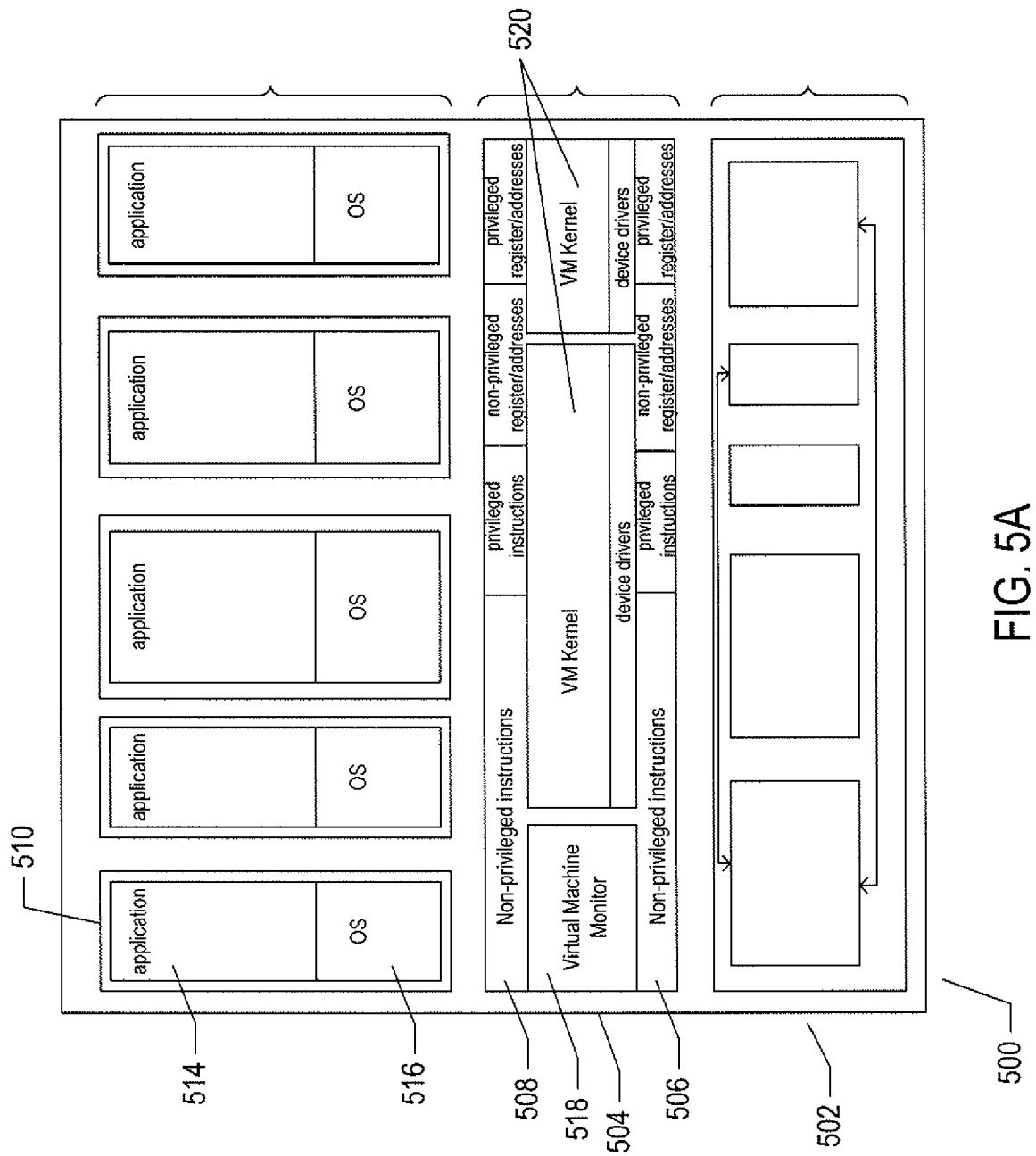
FIGS. 5A-B illustrate two types of virtual machine and virtual-machine execution environments.
Figure 5B:
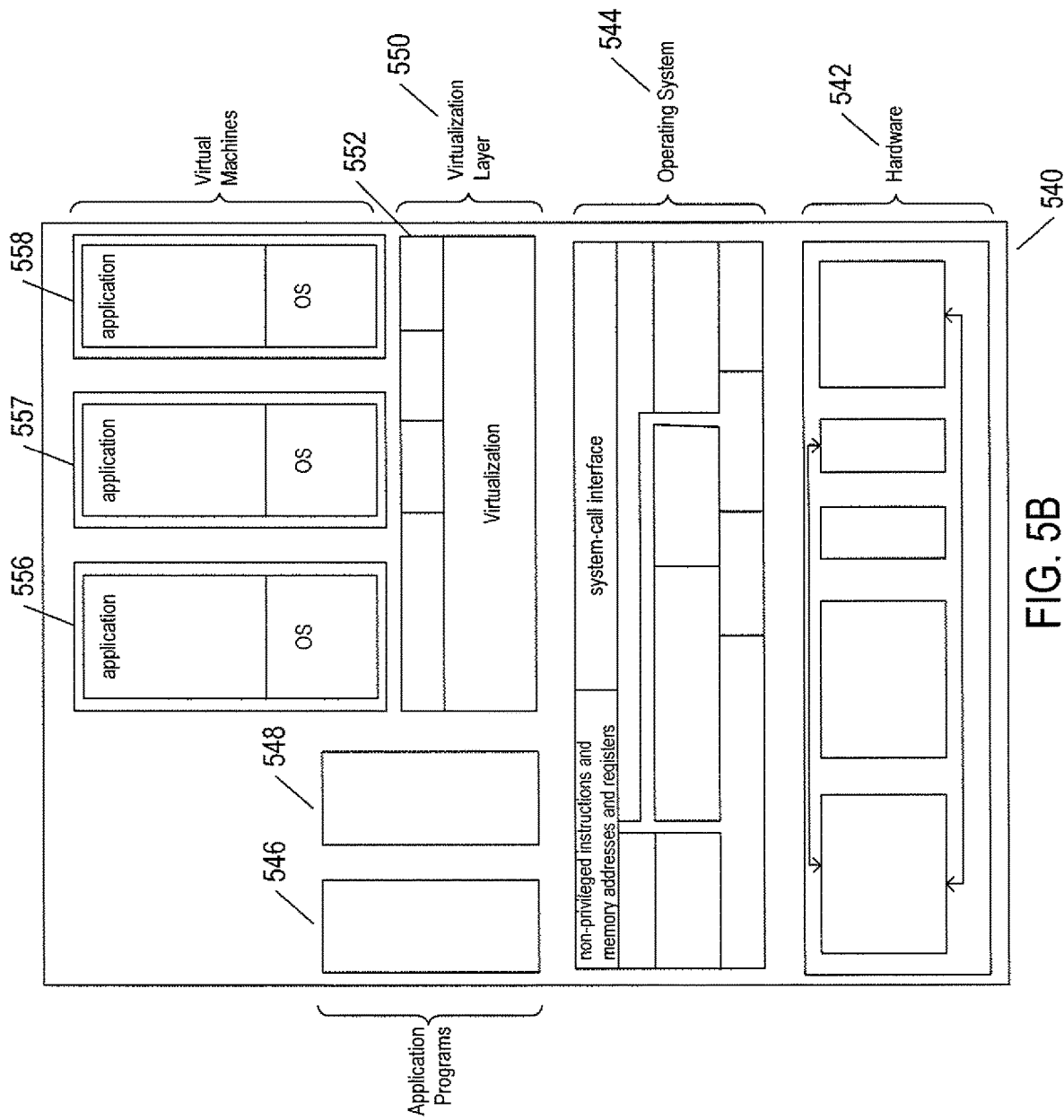

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
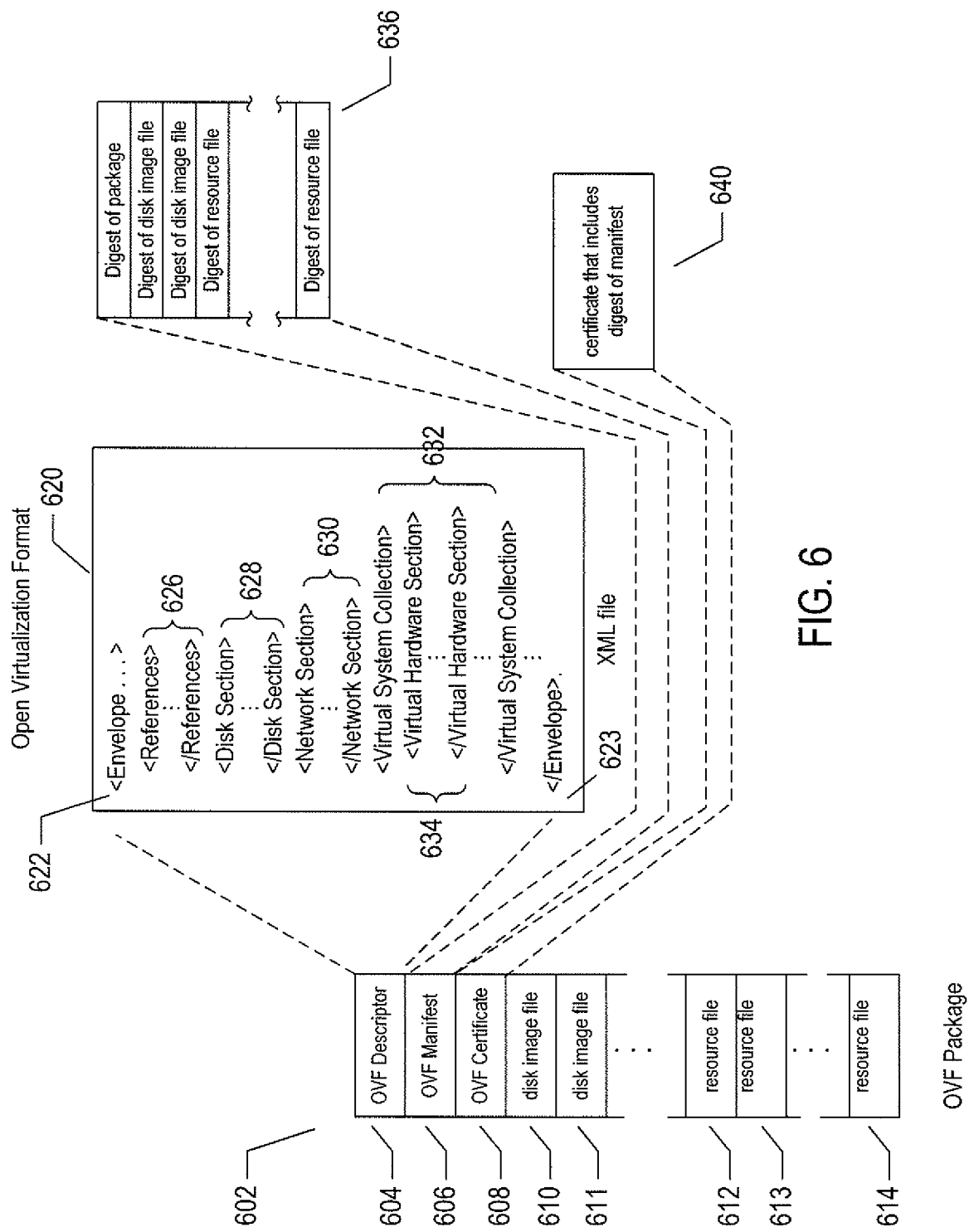
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
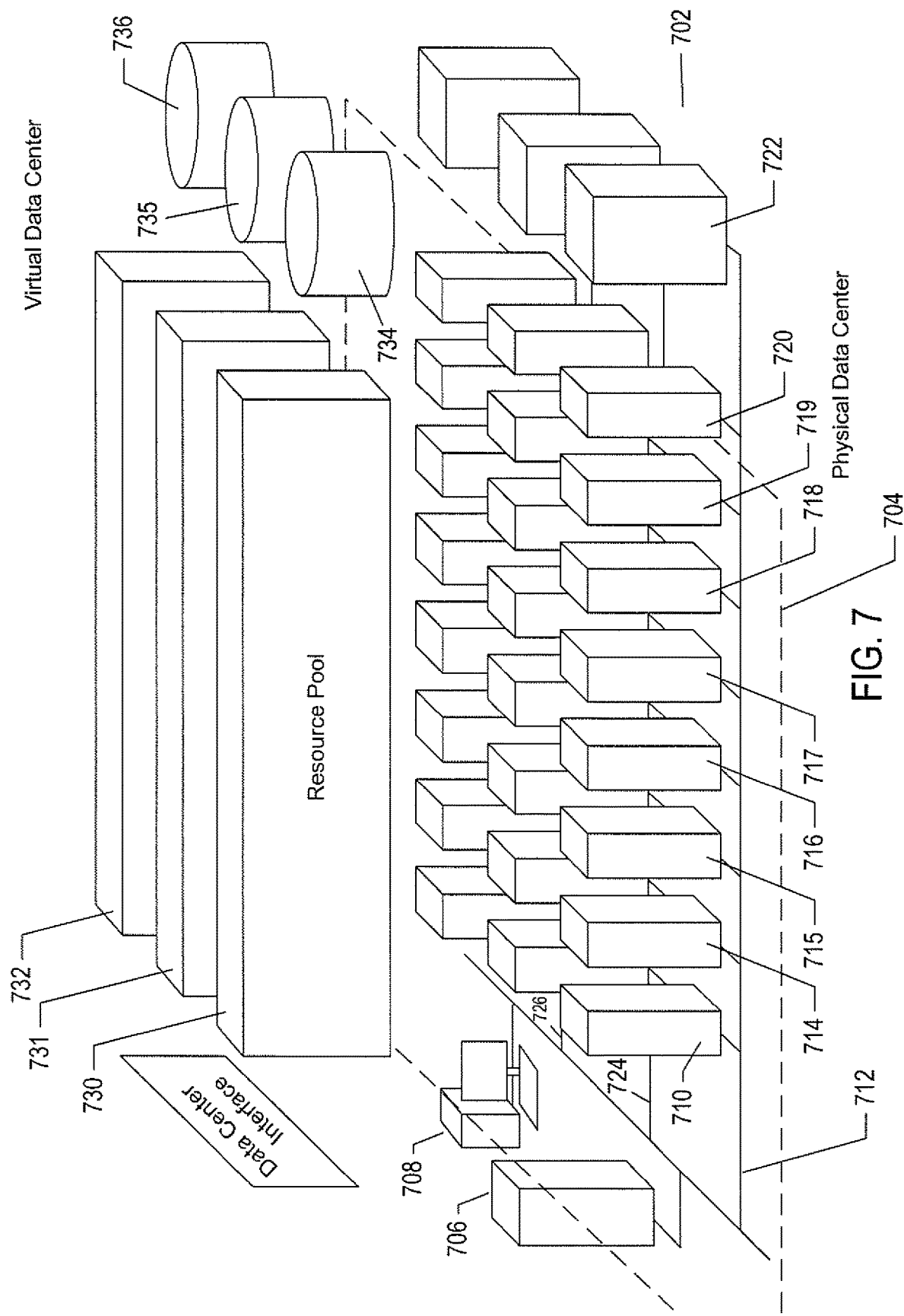
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
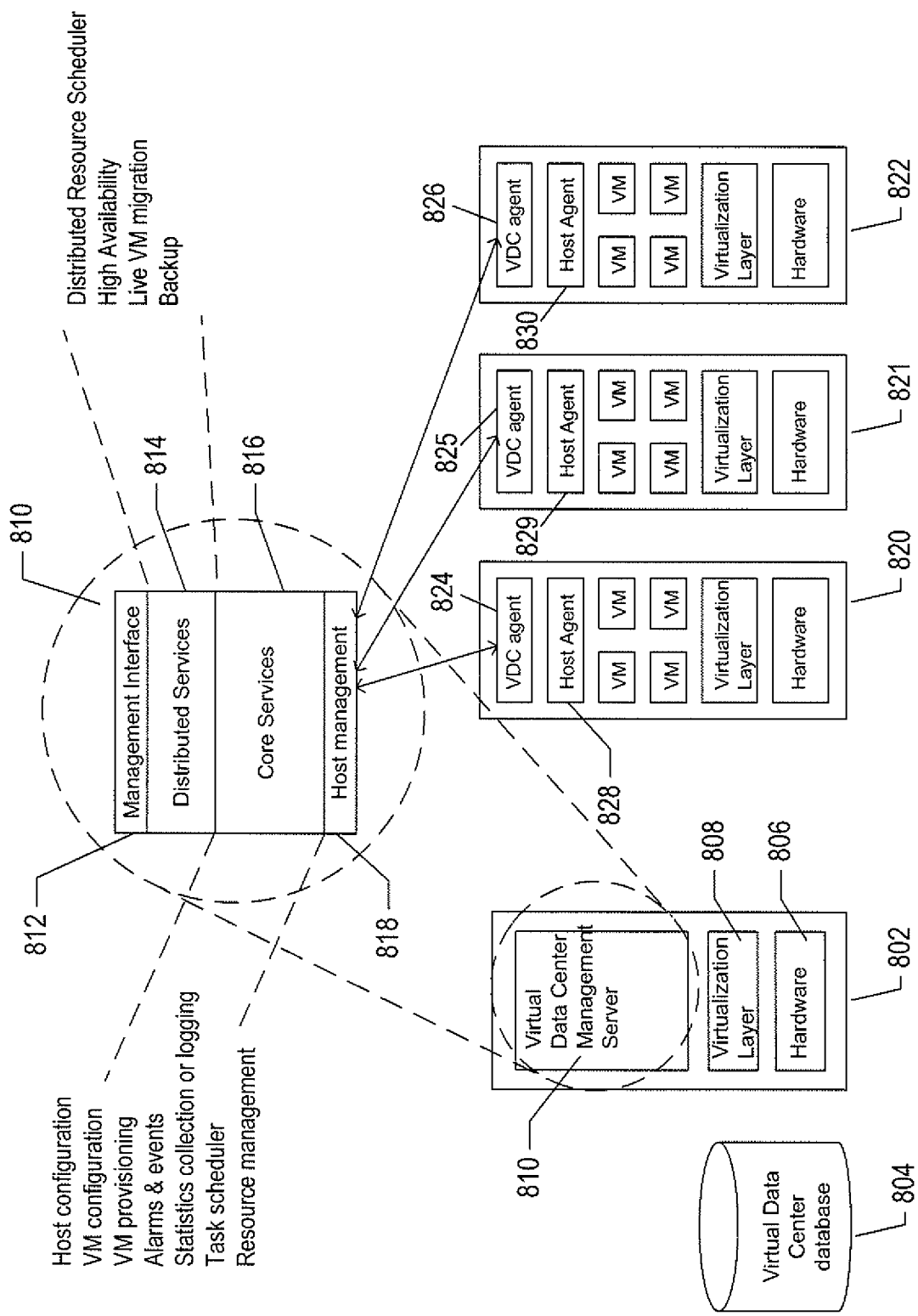
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alai is and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
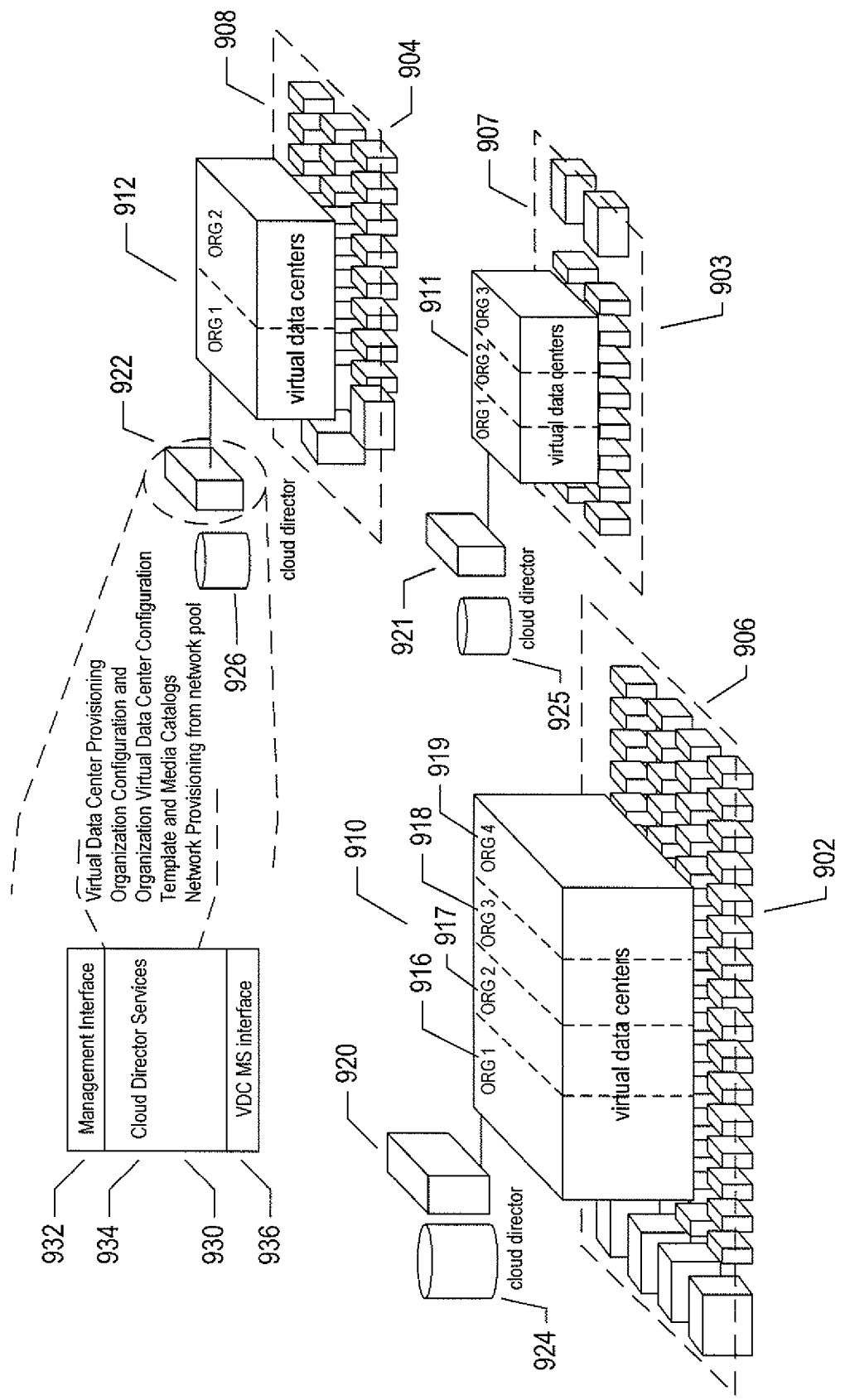
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
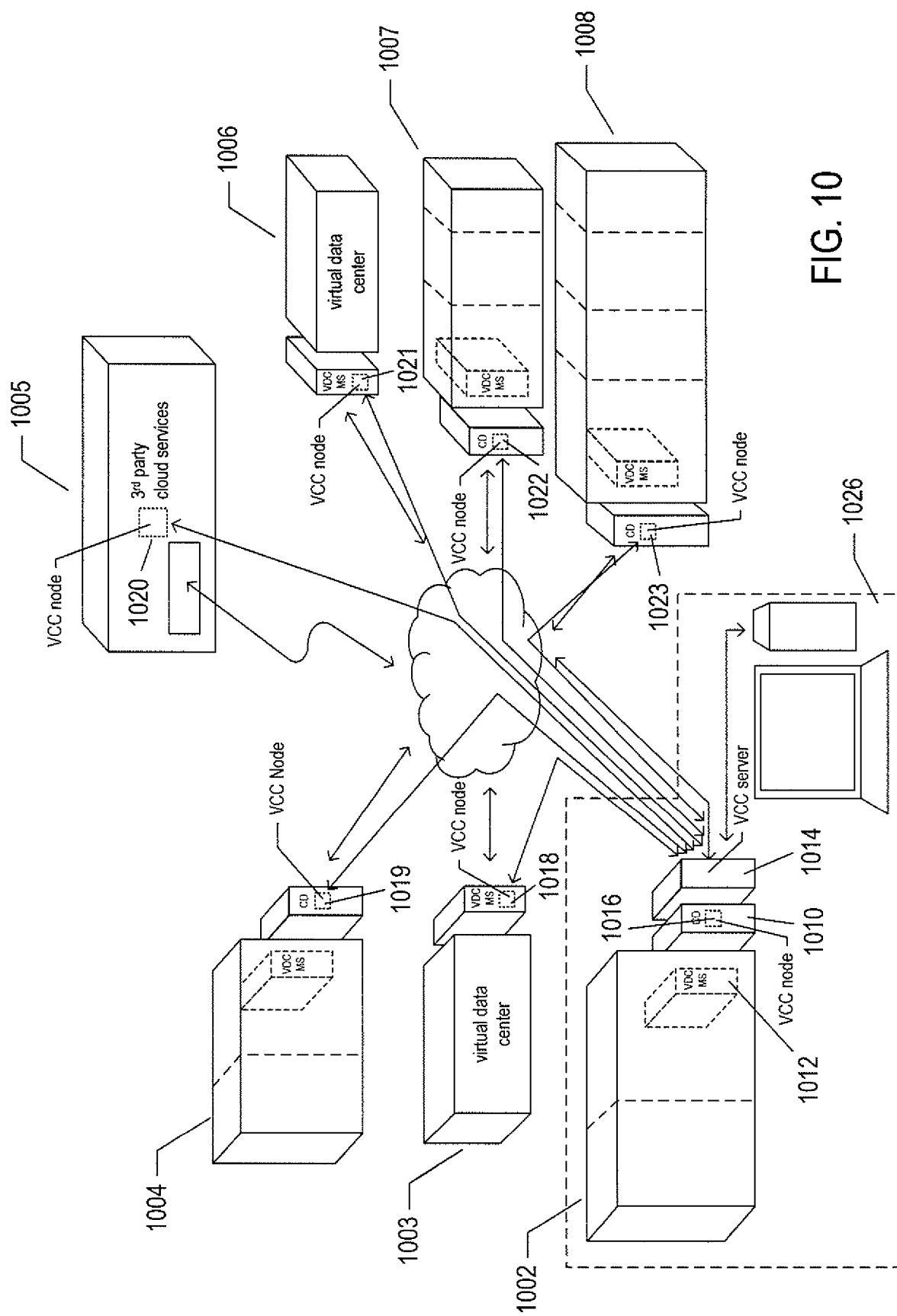
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Clustering Methods and Systems

Figure 11:
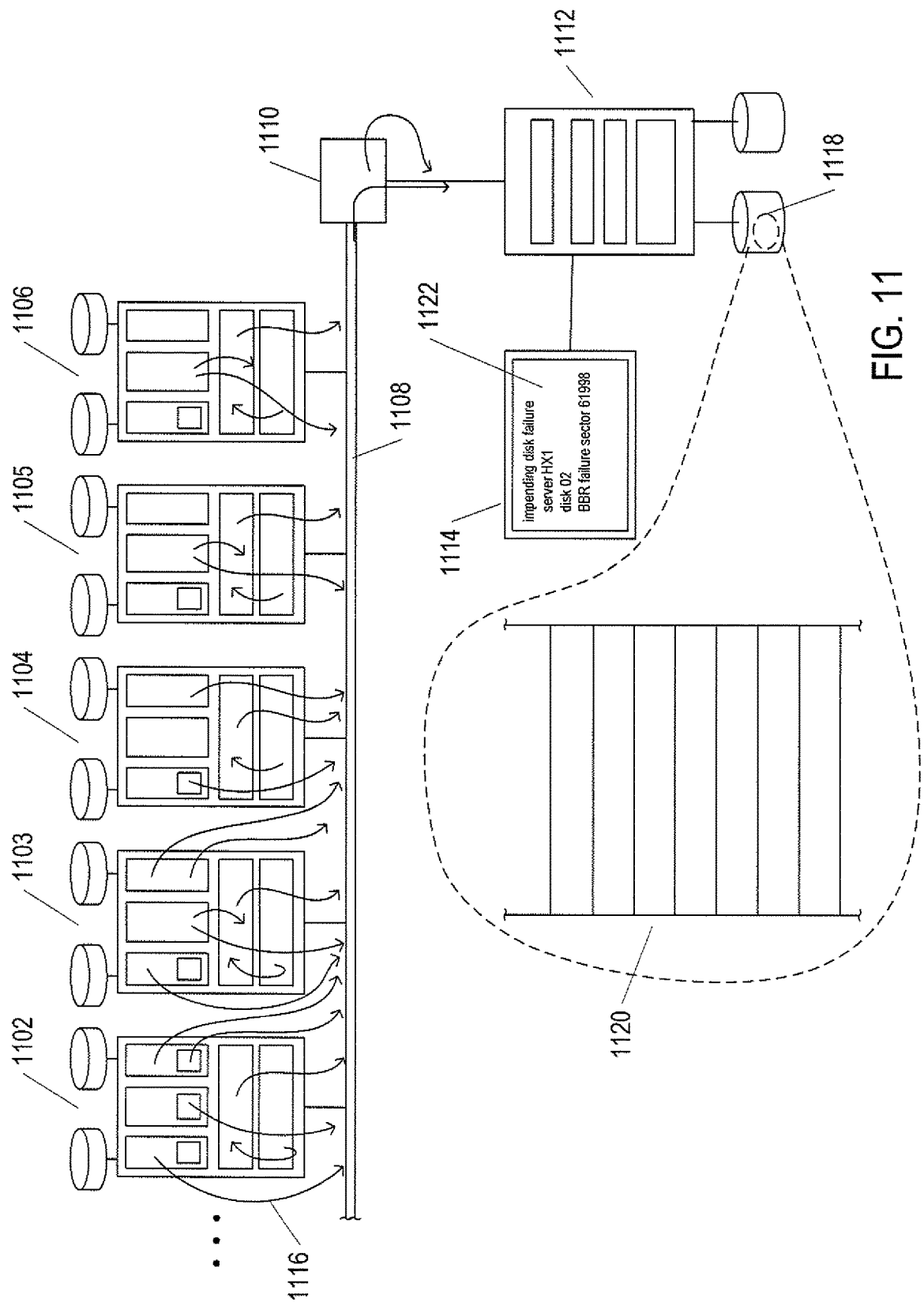
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise. A fourth problem associated with event messages in large, distributed computer systems is that storing and archiving event logs may itself represent a significant computational challenge. Given that many terabytes of event messages may be collected during the course of a single day of operation of a large, distributed computer system, collecting and storing the large volume of information represented by event messages may represent a significant processing-bandwidth, communications-subsystems bandwidth, and data-storage-capacity challenge, particularly when it may be necessary to reliably store event logs in ways that allow the event logs to be subsequently accessed for searching and analysis.

Figure 13:
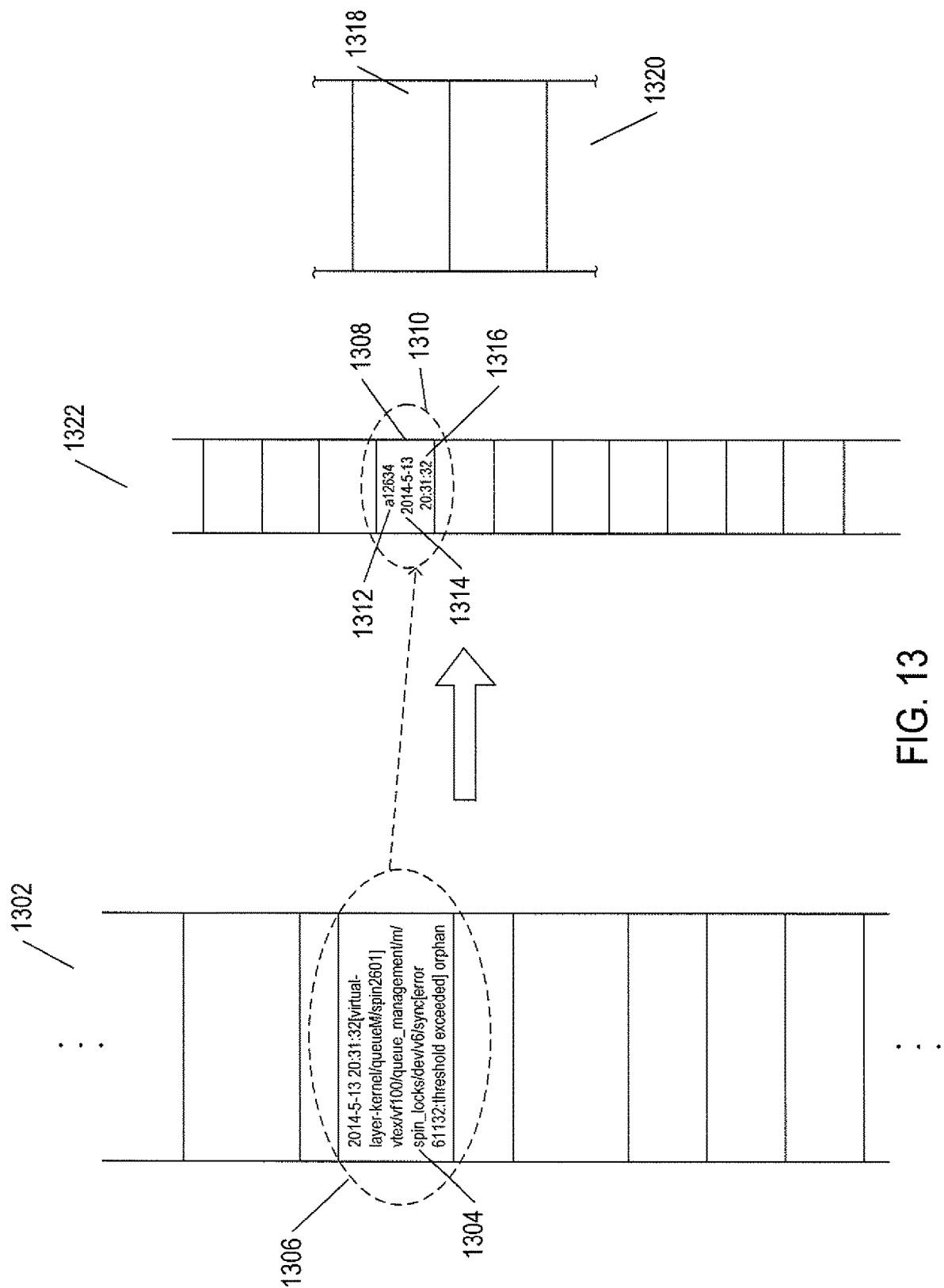
FIG. 13 illustrates the event-message-processing approach represented by certain of these methods and systems.

Methods and systems for processing, classifying, and efficiently storing event messages, collectively referred to as "event-clustering methods and systems," have been devised to address the above-mentioned challenges associated with event-message processing and analysis as well as additional deficiencies and problems associated with currently available event-message processing, analysis, and storage. FIG. 13 illustrates the event-message-processing approach represented by certain of these methods and systems. In FIG. 13, a traditional event log 1302 is shown as a column of event messages, including the event message 1304 shown within inset 1306. The methods and systems automatically process event messages, as they are received, in order to transform the received event messages into event records, such as event record 1308 shown within inset 1310. The event record 1308 includes a numeric event-message-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, the methods and systems have the effect of transforming traditional event logs, such as event log 1302, into stored event records, such as event-record log 1322, and a generally very small table 1320 with encoded non-parameter portions, or templates, for each different type of event message.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event-message type from an event record, without the need for parsing and typing a large variety of different types of event messages.

Returning briefly to FIG. 11, it should be noted that the simple example illustrated in FIG. 11 fails to illustrate the entire problem space addressed by the methods and systems. In large, distributed computing systems, for example, it would be impractical to funnel all event messages to a single administration computer. Instead, processing, analysis, and storage of event messages is typically carried out by multiple discrete computer systems and is therefore also distributed. As a result, methods and systems for processing, typing, and efficiently storing event messages need to be both scalable and distributable over multiple computer systems in order to be generally useful over a range of different types of distributed computing systems as well as over significant time frames during which distributed computing systems may increase in size due to continuous addition of new processing components. The distributed virtual-data-center and virtual-cloud management systems discussed in the first subsection of the current document are examples of systems in which event-message processing, typing, and storage may be distributed over multiple computational nodes.

In the current application, the phrase "event-message-clustering system" refers to any of various standalone systems as well as subsystems and components of standalone systems and systems within distributed computing systems that carry out event-message clustering by the event-message-clustering methods. The phrase "event message" refers to any of various types of information entities include parameters and non-parametric portions to which the currently described clustering-based typing methods can be applied.

Figure 14A:
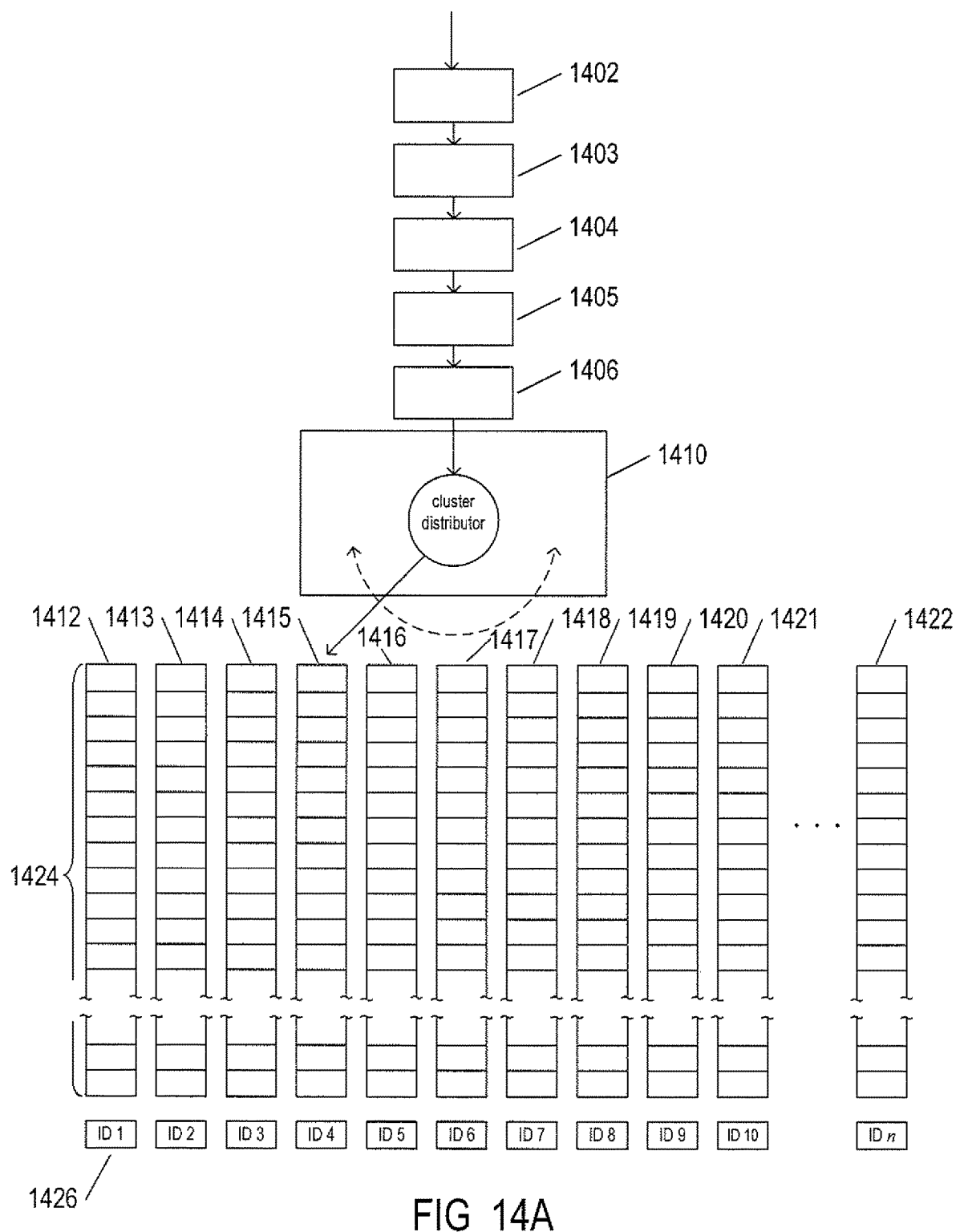
FIG. 14A illustrates one implementation of clustering methods and systems.

FIG. 14A illustrates one implementation of clustering methods and systems. Rectangles 1402-1406 represent incoming event messages to an event-message-clustering system. The event-message-clustering system includes an event-processing-and-distribution component 1410 and multiple clusters of event records 1412-1422. Each cluster includes stored event records, such as the stored event records 1424 of cluster 1412, and a cluster identifier, such as cluster identifier 1426 of cluster 1412. The event-message-clustering system 1410 processes each received event message to transform the received event message into an event record and determines to which cluster to assign the event record. The clusters represent a typing scheme for event messages. In other words, each cluster represents a message type. The event-message-clustering system 1410 operates in real time to transform event messages into event records and to type the event messages by assigning each event record corresponding to an event message to a particular cluster. The stored event records may be accessed by downstream event-analysis and event-interpretation systems. In certain implementations, the event records may be physically stored by separate systems. Event records may not only be accessed by other entities, but may be periodically flushed to event-record archives, copied to downstream event-record-processing components, and transferred to downstream event-record-processing components. Initially, when a cluster is first initialized and begins storing events, the cluster may store unprocessed event messages rather than event records for an initial period of time. Only when a sufficient number of event messages of a particular type have been accumulated can downstream analysis components provide tools to the event-message-clustering system that allow the event-message-clustering system 1410 to transform event messages into event records.

Figure 14B:
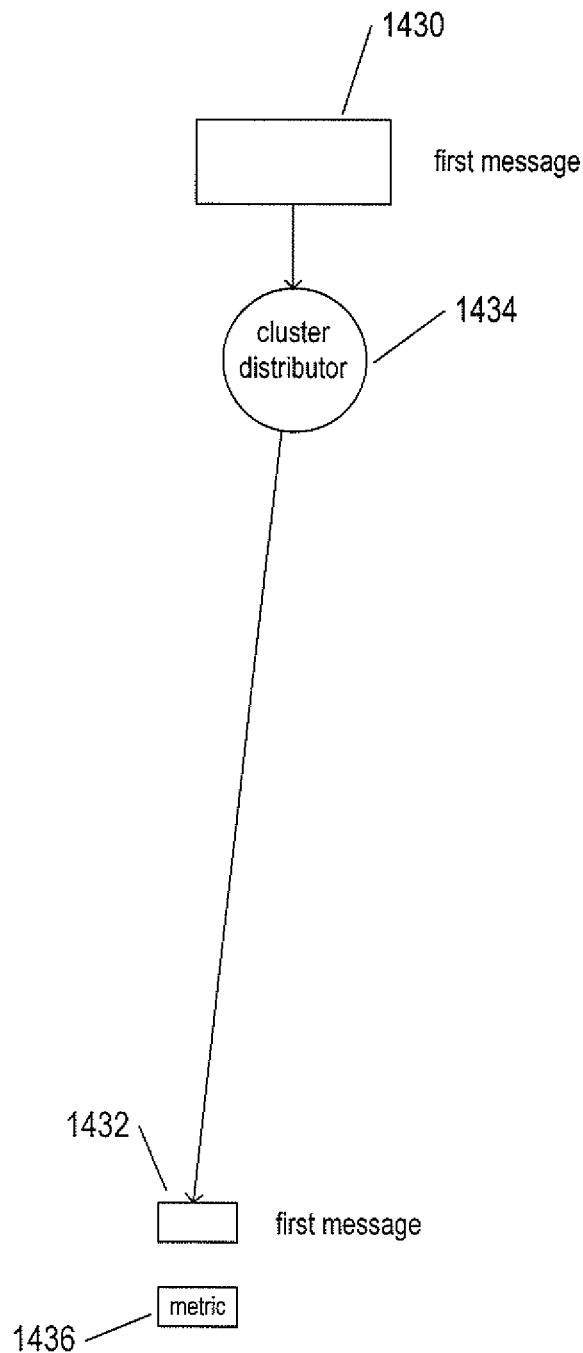
FIG. 14B illustrates processing of a first event message.

FIG. 14B illustrates processing of a first event message. Initially, there are no clusters. The first received event message 1430 initiates creation of a first cluster 1432 to which the cluster-distributor-component 1434 of the event-message-clustering system 1410 assigns the first event message. A temporary identifier 1436 is assigned to the first cluster.

Figure 14C:
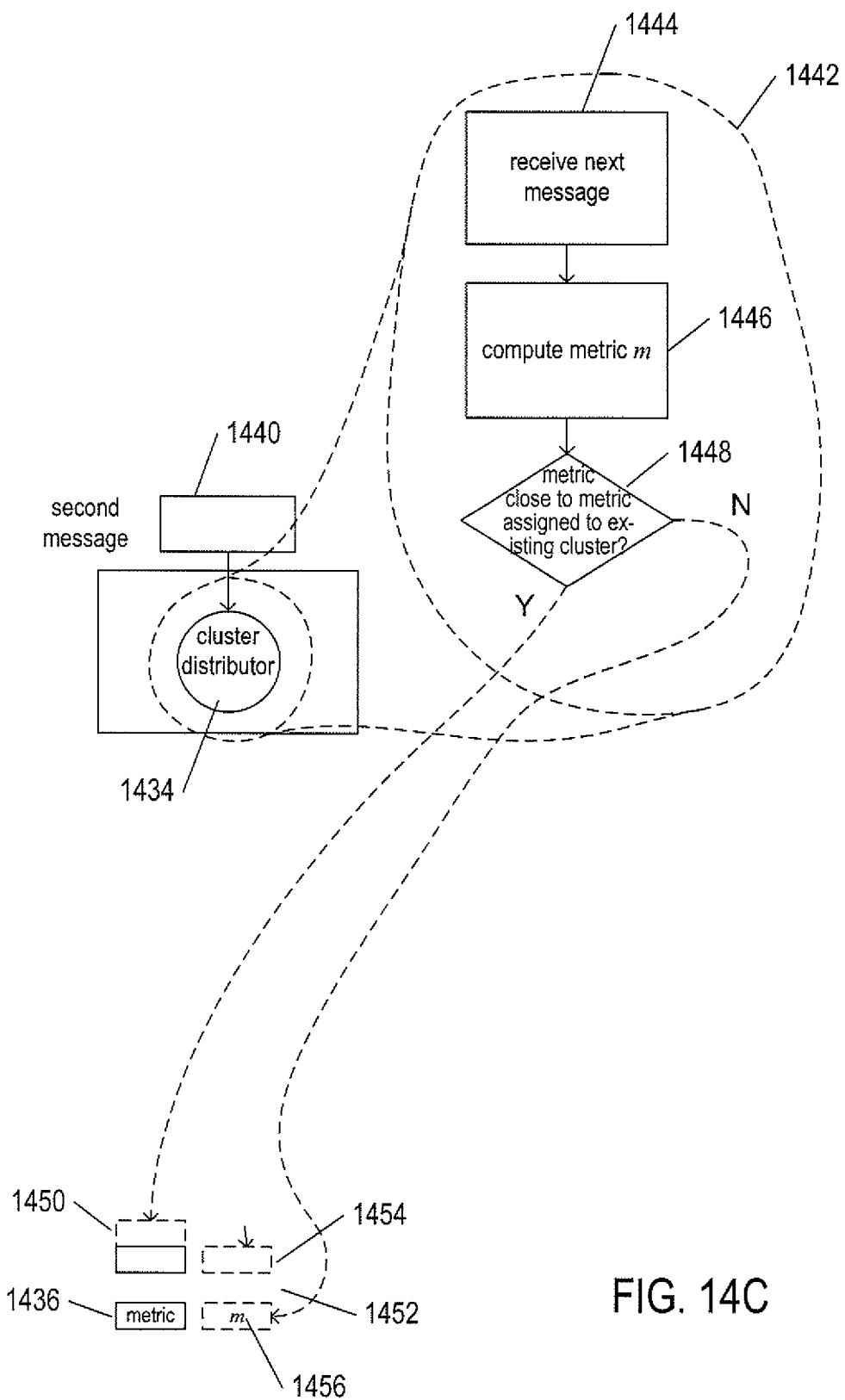
FIG. 14C illustrates processing of a second message.

FIG. 14C illustrates processing of a second message. The second event message 1440 is analyzed by the cluster distributor 1434 as represented by the logic shown in inset 1442. In step 1444, the cluster distributor receives the second message and, in step 1446, computes a numeric metric m for the received event message. In conditional step 1448, the cluster distributor determines whether the computed metric is close to the metric 1436 assigned to the first cluster. If the computed metric m for the second event message is sufficiently close to the metric 1436 assigned to the first cluster, then the second message is added to the first cluster 1450. Otherwise, a new cluster is created 1452 and the second event message is added to the new cluster 1454. The metric computed for the second event message m is assigned as the metric associated with the new, second cluster 1456. Subsequently received event messages are similarly processed. Either a subsequently received event message is assigned to an existing cluster, when a metric computed for the subsequently received event message is sufficiently close to a metric for an existing cluster, or a new cluster is created and the subsequently received event message becomes the first event message assigned to the new cluster. Thus, clusters are created dynamically as event messages are received and processed.

Figure 15:
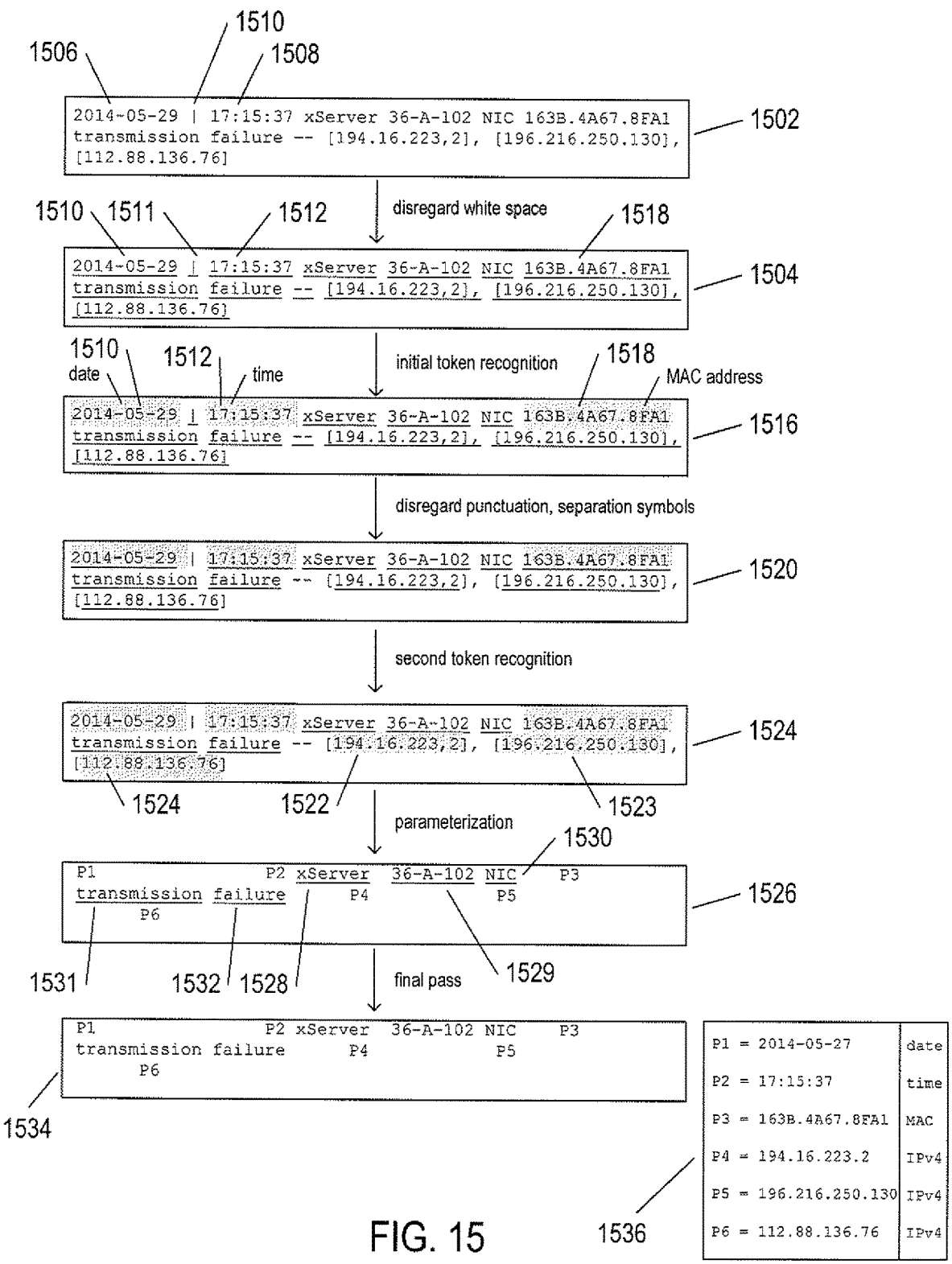

FIGS. 15-20 illustrate one implementation of the logic used by an event-message-clustering system to compute a metric for a received event message that allows the event message to be assigned to a particular existing cluster. FIG. 15 illustrates one implementation of an event-message-normalization procedure that is used to prepare an event message for computation of a metric. The received event message 1502 is first tokenized by considering the event message to consist of tokens separated by non-printing characters, referred to as "white space." In FIG. 15, this initial tokenization of the event message 1504 is illustrated by underlining of the printed or visible characters. For example, the date 1506, time 1508, and vertical bar 1510 at the beginning of the text contents of the event message 1502, following initial tokenization, become a first token 1510, a second token 1511, and a third token 1512, as indicated by underlining.

Next, an initial token-recognition pass is made to recognize any of the initial tokens as various types of parameter values. Parameter values are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of a type of event. By contrast, the phrase "transmission failure" in event message 1502 likely occurs within each of a large number of transmission-failure event messages. In FIG. 15, the recognized tokens in the event message following initial token recognition 1516 are indicated by shading. In the example shown in FIG. 15, initial token recognition determines that the first token 1510 is a date, the third token 1512 is a time, and the seventh token 1518 is a media access control address ("MAC address"). Various types of symbolically encoded values, including dates, times, machine addresses, network addresses, and other such parameter values can be recognized using regular expressions or programmatically. For example, there are numerous ways to represent dates. A relatively simple program or a simple set of regular expressions can be written to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter value. The currently described methods and systems do not depend on absolute precision and reliability of the event-message-normalization process. Occasional misinterpretations generally do not result in mistyping of event messages and, in the rare circumstances in which event messages may be mistyped, the mistyping is most often discovered during subsequent processing. Relatively computationally straightforward processing methods are adopted in the currently described methods and systems for normalization and typing of event messages, because event messages are generally continuously received at high rates, as a result of which the computational overhead associated with processing of each event message represents a significant constraint.

In certain implementations, normalization may terminate following initial token recognition. In the implementation illustrated in FIG. 15, the event message is subject to an additional token-recognition step after re-tokenizing the non-parameter portions of the event message by removing punctuation and separation symbols, such as brackets, commas, and dashes that occur as separate tokens or that occur at the leading and trailing extremities of previously recognized tokens, as shown by underlining in the event message 1520 in FIG. 15. After removal of the punctuation and separation symbols, an additional token-recognition pass in the example of FIG. 15 recognizes additional types of symbolically encoded parameter values, including the three version-4 Internet-protocol ("IPv4") addresses 1522-1524 in event message 1524.

Those tokens that have been recognized in the two token-recognition passes are considered to be parameters, denoted "P1," "P2," . . . "P6" in the parameterized event message 1526 in FIG. 15. The remaining tokens 1528-1532 represent the non-parameter tokens present within the event message. A final pass may involve promoting one or more of the non-parameter tokens to parameters based on certain criteria. For example, token 1529 in the parameterized event message 1526 might be considered to be a parameter value that represents the identifier of a server. In the example shown in FIG. 15, however, no additional tokens are promoted to the status of parameter values following the final pass 1534. The result of normalization is therefore a sequence of non-parameter tokens interspersed with parameter values 1534 and a table 1536 that shows the type and symbol encodings for the parameter values. There are many computational techniques for encoding a list of non-parameter tokens recognized within an event message including, as one example, a list of pointers and associated string lengths.

FIG. 16 illustrates the computation of the Adler cyclic redundancy check ("CRC") value from a token comprising a string of characters. As shown at the top of FIG. 16, the token can be thought of as an array of characters 1602 S. Two 16-bit values $A_n$ and $B_n$ are computed as indicated by the recursive expressions 1604 in FIG. 16. The high and low bytes of the two 16-bit values $A_n$ and $B_n$ are arranged 1606 into a 32-bit value that constitutes the Adler CRC for the token. The Adler CRC values are computed, in many cases, to recognize corruptions of a token following network transmission or other such operations. Small one-bit and two-bit transmission errors result in very different Adler CRC values computed for the original token and corrupted token received through an error-introducing communications medium. In one implementation of the currently described methods and systems, the Adler CRC is used for computing a metric m for an event message.

Figure 17:
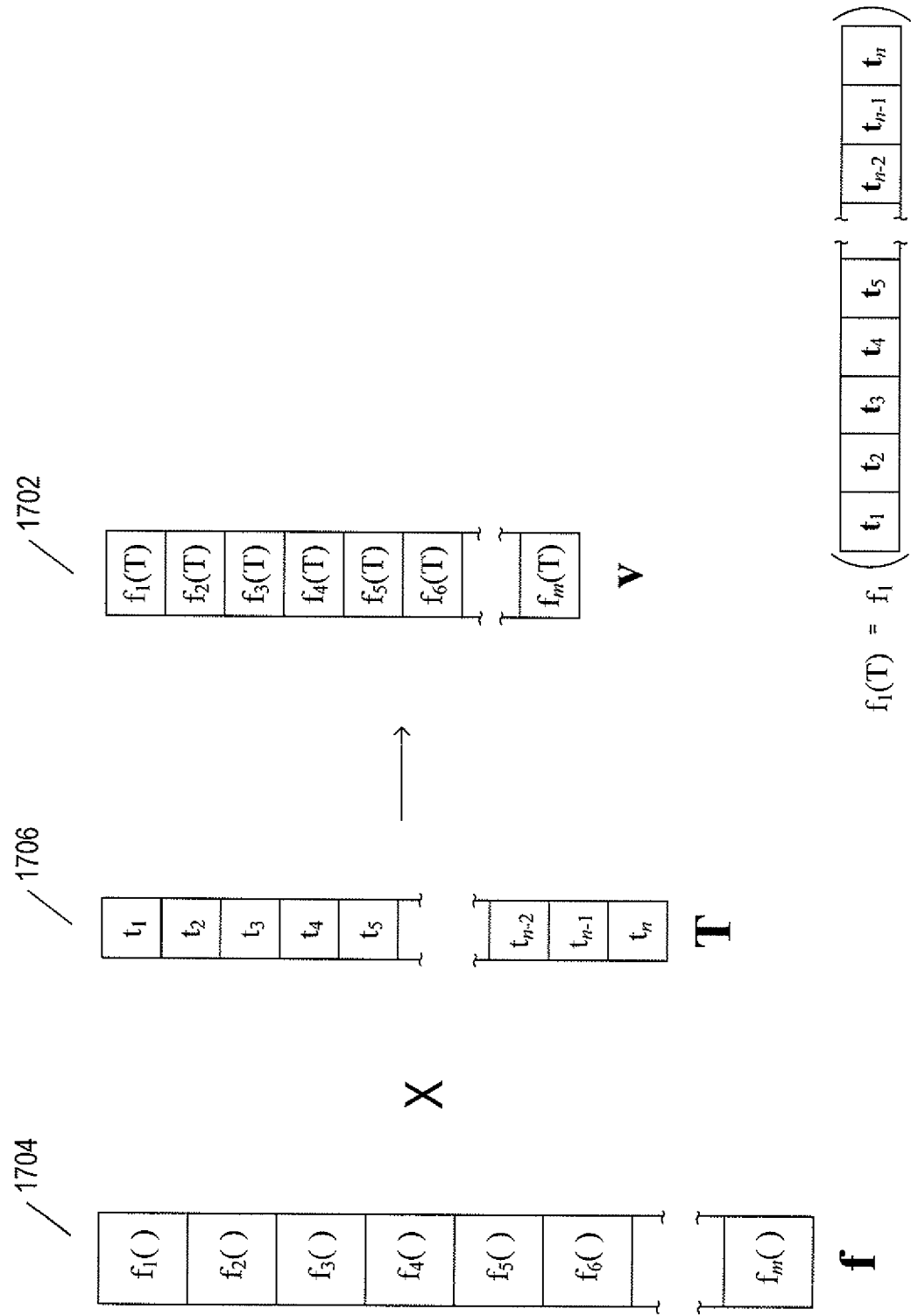

FIG. 17 illustrates computation of a metric m for an event message. In certain implementations of the currently described methods and systems, the metric m is a vector of integer values. This vector, referred to as a "feature vector," can be thought of as being computed by a matrix-multiplication-like operation. In FIG. 17, the feature vector v 1702 is produced by a matrix-multiplication-like operation in which a matrix-like vector of m functions 1704, each of which takes n arguments is multiplied by a vector of non-parameter tokens identified within an event message 1706 to produce the feature vector v 1702. The number of elements, or number of dimensions, of the feature vector v is equal to the number of functions in the matrix-like function vector f and the number of arguments supplied to each function n is equal to the number of non-parameter tokens n in the ordered set of non-parameter tokens T corresponding to an event message.

Figure 18C:
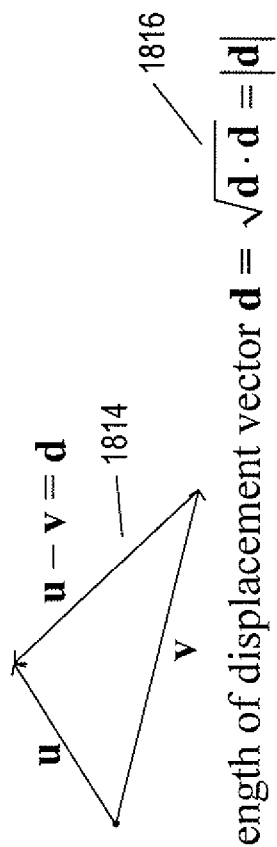

FIGS. 18A-C illustrate computation of the distance between two points represented by vectors. Vectors of dimension n can be thought of as directed distances in an n-dimensional space or as the coordinates for points in an n-dimensional space, where the ray between the origin and the point is equal to the directed distance represented by the vector. FIG. 18A illustrates vector subtraction, in which a vector v 1802 is subtracted from a vector u 1804 to produce the result vector u–v 1806. FIG. 18B shows the computation of the dot product u·v of two vectors u and v. The dot product 1808 can be viewed as a matrix multiplication between the transpose of the first vector 1810 and the second vector 1812. FIG. 18C illustrates computation of the distance between two points represented by two vectors u and v. First, a displacement vector d is computed as u–v 1814. Then, the length of the displacement vector is computed as the square root of the dot product of the displacement vector 1816. The distance between two event messages can be similarly calculated as the square root of the dot product of the difference, or displacement vector, computed from the two feature vectors corresponding to the two event messages. Thus, the metric m computed by one implementation of the event-message-clustering system, discussed in FIGS. 14A-C, is a feature vector and an event message is assigned to that cluster for which the distance between the event message and the first event message assigned to the cluster is minimal. In other words, the clusters represent regions in an m-dimensional space that contain similar event messages.

FIGS. 19 and 20 illustrate one particular implementation for computing feature vectors and the distance between event messages represented by feature vectors. As shown in FIG. 19, the function $f_i(\,)$ for computing the value of element i of a feature vector, in the described implementation, is:

$$f_i(T) = \underset{j}{\text{argmax}} \ ([P_i * \text{Adler}(t_j) + Q_i] \bmod 0x\textit{ffffffff}).$$

In essence, the function $f_i(\ )$ computes, for each non-parameter token $t_j$ in the event message T, the Adler CRC value, multiplies the Adler CRC value for $t_j$ by a first constant, and then adds a second constant to the product of the Adler CRC value for $t_j$ and the first constant. The result is truncated to a 32-bit value using a mod operation. The function $f_i(\ )$ returns the maximum of these computed values for each of the non-parameter tokens. FIG. 19 provides an example using the example tokenized event message 1534 of FIG. 15. The non-parameter tokens together comprise an ordered set of tokens T 1904. The function $f_i(\ )$ computes a 32-bit value $h_j$ for each non-parameter token $t_j$ as shown in the set of five expressions 1906. The function $f_i(\ )$ returns the maximum of these computed values 1908.

FIG. 20 illustrates computing the distance between two event messages represented by two feature vectors computed for the two event messages. FIG. 20 shows a first feature vector u 2002 corresponding to one event message and a second feature vector v 2004 corresponding to another event message. To compute the distance between the two event messages, a displacement feature vector d 2006 is first computed. Because the values of the feature-vector elements are computed based on Adler CRC values, differences between elements do not correspond to distances in particular dimensions, since CRC functions tend to produce very different values for different, but similar tokens. Therefore, when two corresponding elements of two feature vectors are identical, and their differences equal to zero, then the distance-metric for these element values is zero, but when the difference between two corresponding feature-vector element values is non-zero, it can only be concluded that the corresponding feature-vector element values are different and thus are separated by some distance in the corresponding dimension. In the described implementation, all non-zero element values in the displacement vector 2006 are replaced by the value "1" to produce a modified displacement vector d' 2008. The square root of the dot product of the modified displacement vector 2010 is equal to the number of non-matching feature-vector elements in the two feature vectors u and v or, equivalently, to the number of non-zero elements in the modified displacement vector d'. However, the square root of the dot product of the modified displacement vector is a type of displacement-based metric, just not the familiar Euclidean, or L2, distance metric. Were a similarity-preserving hash function used, rather than the Adler CRC, in computing the feature vector, a stepwise distance metric closer to the L2 distance metric would be computable from the feature vectors representing two event messages.

Figure 21:
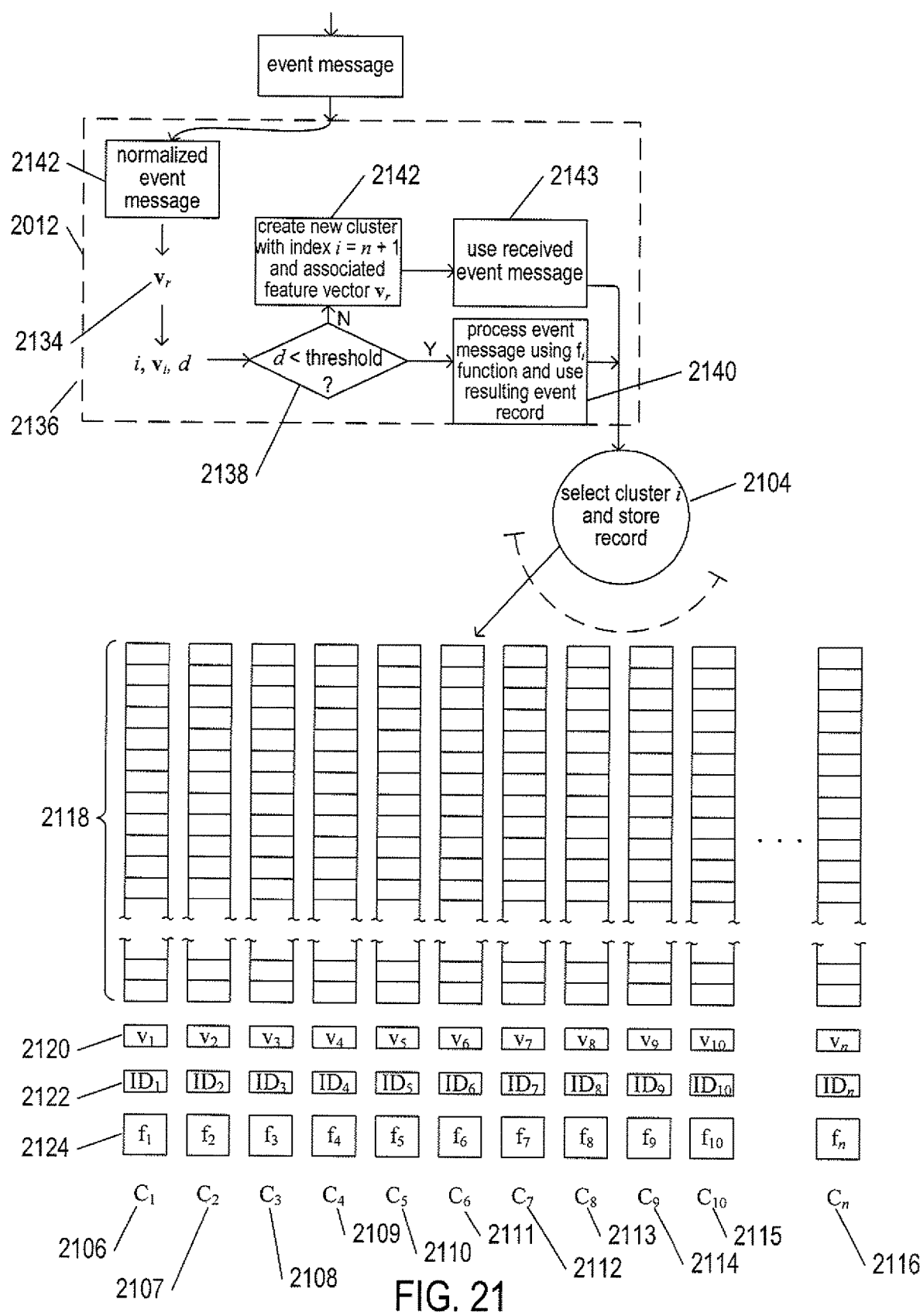
FIG. 21 illustrates an implementation of the event-message-clustering system at a greater level of detail than, but using the same illustration conventions as used in, FIG. 14A.

FIG. 21 illustrates an implementation of the event-message-clustering system at a greater level of detail than, but using the same illustration conventions as used in, FIG. 14A. In FIG. 21, the event-message-clustering system includes event-message-processing logic 2102, a distributor component 2104, and a set of n clusters 2106-2116. Each cluster includes a number of assigned event records, such as the assigned event records 2118 for cluster 2106, a feature vector for the cluster, such as feature-vector 2120 for cluster 2106, a cluster identifier, such as cluster identifier 2122 for cluster 2106, and a processing function, such as processing function 2124 for cluster 2106, that can be used by the event-message-clustering system to parse an event message in order to extract parameter values from the event message. As discussed above with reference to FIG. 14A, after a cluster is first created, the cluster temporarily stores event messages, rather than event records, and is associated with a temporary ID and no parsing function. However, once downstream analysis systems have analyzed an initial set of event messages associated with, or assigned to, the cluster, the downstream analysis systems provide a final identifier and parsing function for the cluster to the event-message-clustering system. When a next event message 2130 is received by the event-message-clustering system, the event message is normalized 2142, as discussed above with reference to FIG. 15, and a feature vector $v_r$ 2134 is computed for the normalized event message, as discussed above with reference to FIGS. 16-18. The computed feature vector $v_r$ is compared with all of the feature vectors for the n clusters to determine a cluster i associated with feature vector $v_i$ for which the distance d computed for $v_r$ and $v_i$ is minimal 2136. When d is less than a threshold value 2138, the event message is processed using function $f_i$ associated with cluster i to produce a corresponding event record which is output, along with the cluster index i, to the distributor subcomponent 2104. Otherwise, when d is not less than the threshold 2138, a new cluster is created with index i=n+1, the feature vector computed for the received event message $v_r$ is associated with this cluster 2142, and the received event message is passed, along with the cluster index, to the distributor subcomponent 2104. The distributor subcomponent 2104 then assigns the event message or event record to the cluster with index i. Again, the event messages and event records associated with clusters may be physically stored by the event-message-clustering system or may be stored by another component, with the event-message-clustering system either returning event messages and event records to requesting downstream components or references to event messages and event records stored in another component. Event records and event messages may be deleted form clusters, copied to other locations, and periodically archived.

The feature-vector-based typing of event messages provides a first estimate of event-message classification. However, downstream analytical components that analyze event messages may determine that two or more clusters represent a single event-message type and may therefore request that the clusters corresponding to these types be merged together. Similarly, downstream analytic components may determine that the event messages in a particular cluster actually have two or more different types and may therefore request the event-message-clustering system to split the cluster into two or more clusters. The merge and split operations thus allow a refinement or fine tuning of the initial feature-vector-based event-message typing carried out by the event-message-clustering system.

Figure 22:
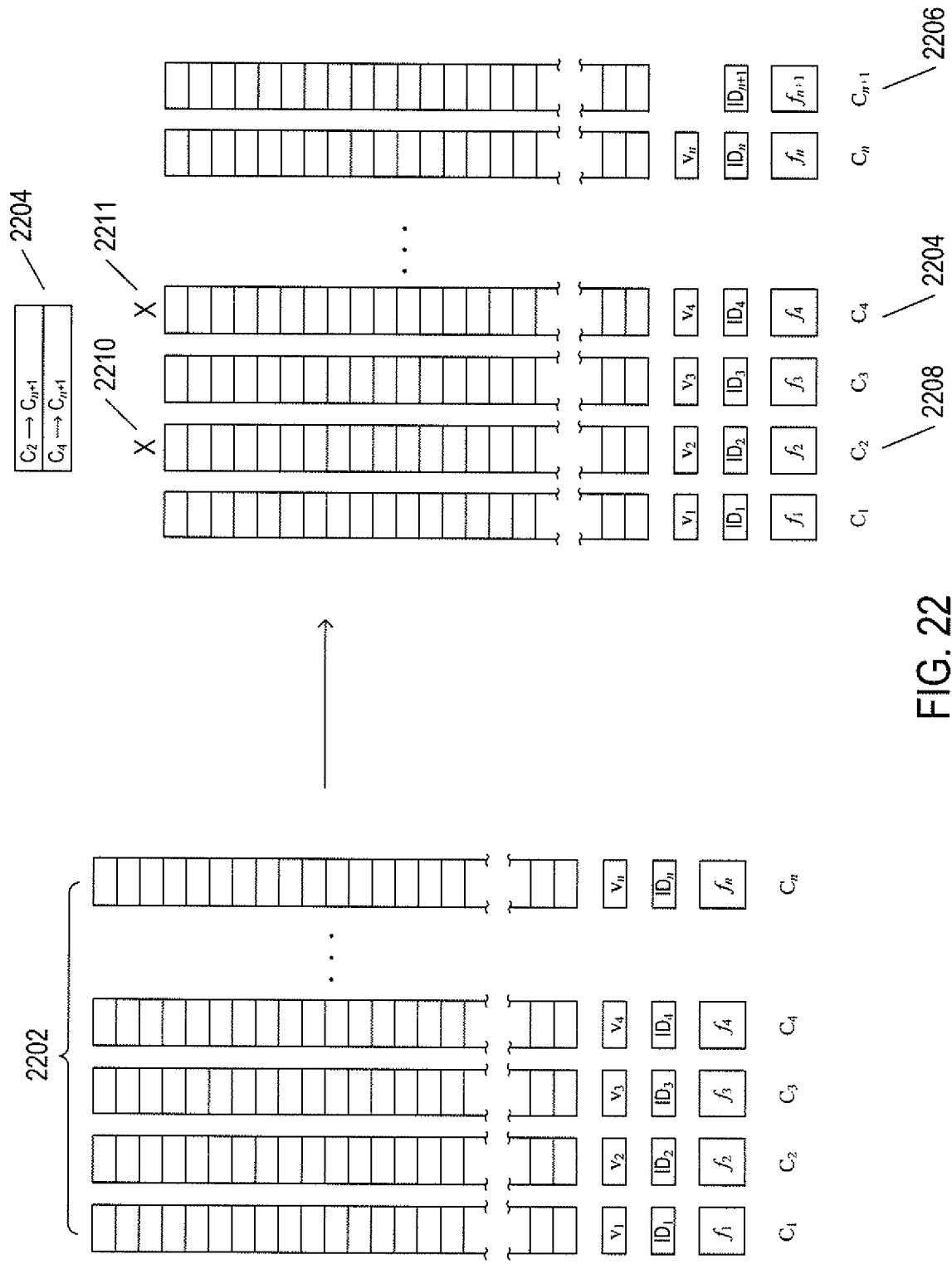
FIG. 22 illustrates a cluster-merge operation.

FIG. 22 illustrates a cluster-merge operation. The left portion of FIG. 22 shows n existing clusters 2202 within the event-message-clustering system. A downstream component requests that clusters $C_2$ and $C_4$ be merged together. As a result, the event-message-clustering system creates two rules 2204 that indicate that event messages initially typed to belong to $C_2$ and $C_4$ now belong to a new cluster $C_{n+1}$. The new cluster 2206 is created to store subsequently received event messages that were previously typed as belonging to clusters $C_2$ and $C_4$ and clusters $C_2$ and $C_4$ 2208-2209 are marked 2210 and 2211, respectively, to indicate that they will no longer be receiving event records and that, after a period of time, may be removed or returned to a pool for reallocation.

Figure 23:
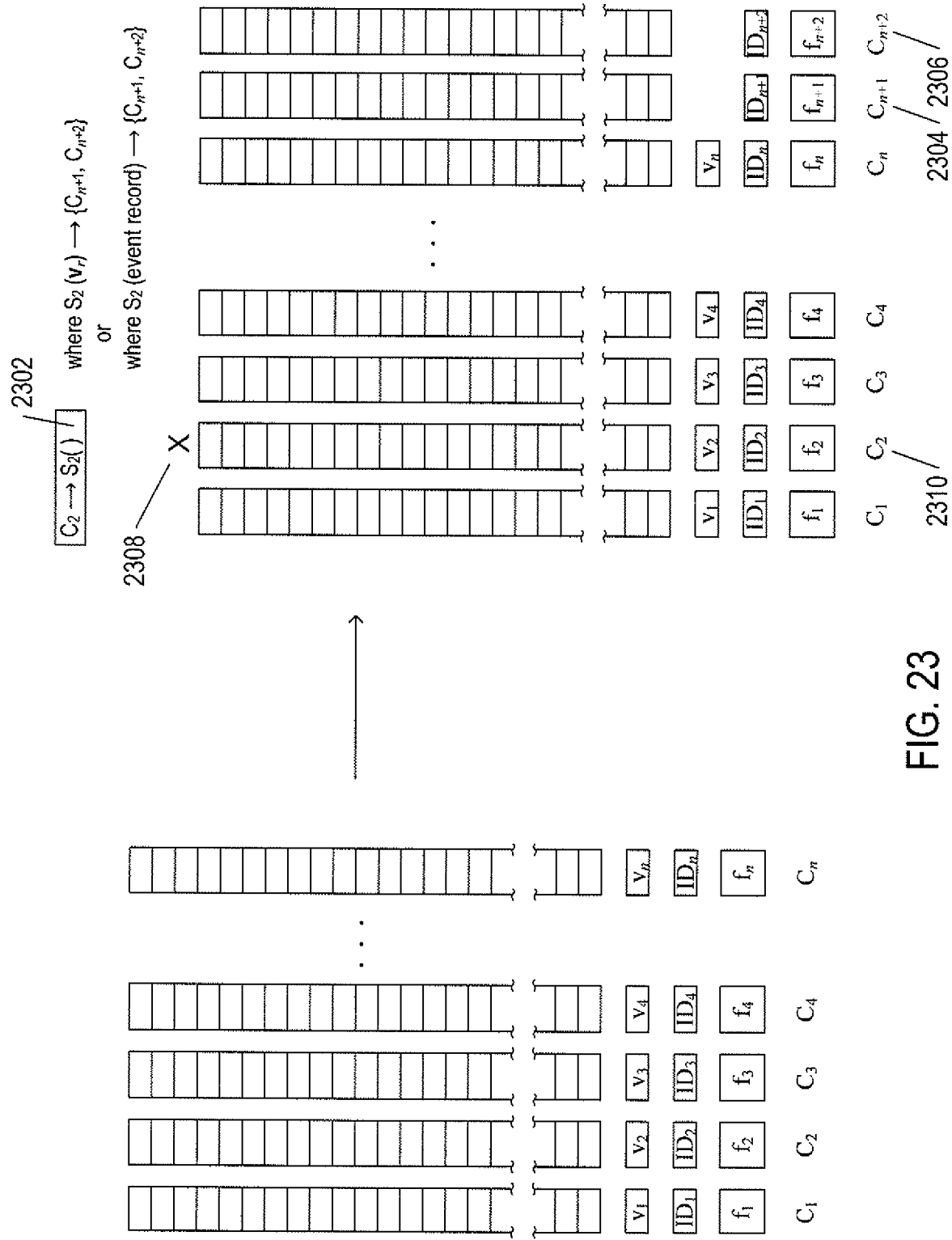
FIG. 23 illustrates a cluster-split operation.

FIG. 23 illustrates a cluster-split operation. In an example shown in FIG. 23, a downstream component requests that a cluster $C_2$ be split into two new clusters. The downstream component additionally provides a function $S_2(\ )$ that takes either a feature vector $v_r$ or an event record, as an argument, and returns an indication of which of two or more clusters to assign an event record. In response to the split request, an event-message-processing system adds a split rule 2302 to a set of stored rules that indicates that an event message assigned to cluster $C_2$ should now be assigned to the cluster returned by a call to the function $S_2(\ )$ where the function $S_2(\ )$ returns either $C_{n+1}$ or $C_{n+2}$. In addition, the event-message-clustering system creates the two new clusters $C_{n+1}$ and $C_{n+2}$ 2304 and 2306. Finally, the event-message-clustering system marks 2308 cluster $C_2$ 2310 as no longer receiving event records and as a candidate for removal or reallocation after some period of time. Note that, in the implementation described in FIGS. 22 and 23, new clusters created as a result of merge and split operations are not associated with feature vectors, since event records are directed to these clusters in two steps, the last of which involves applying a redirection rule, such as the redirection rules 2204 and 2302. In alternative implementations, rather than using CRC functions for computing feature vectors, similarity-preserving hash functions may instead be used, as a result of which distances computed as the magnitude of displacement computations on feature vectors may correspond to the degree of dissimilarity between event messages represented by the feature vectors. In this case, the event-message-clustering system may be able to use adjustable thresholding and newly computed feature vectors associated with merge and split clusters in order to direct event messages to appropriate clusters based on the computed feature vectors as in the logic 2102 discussed above with FIG. 21.

Figure 24:
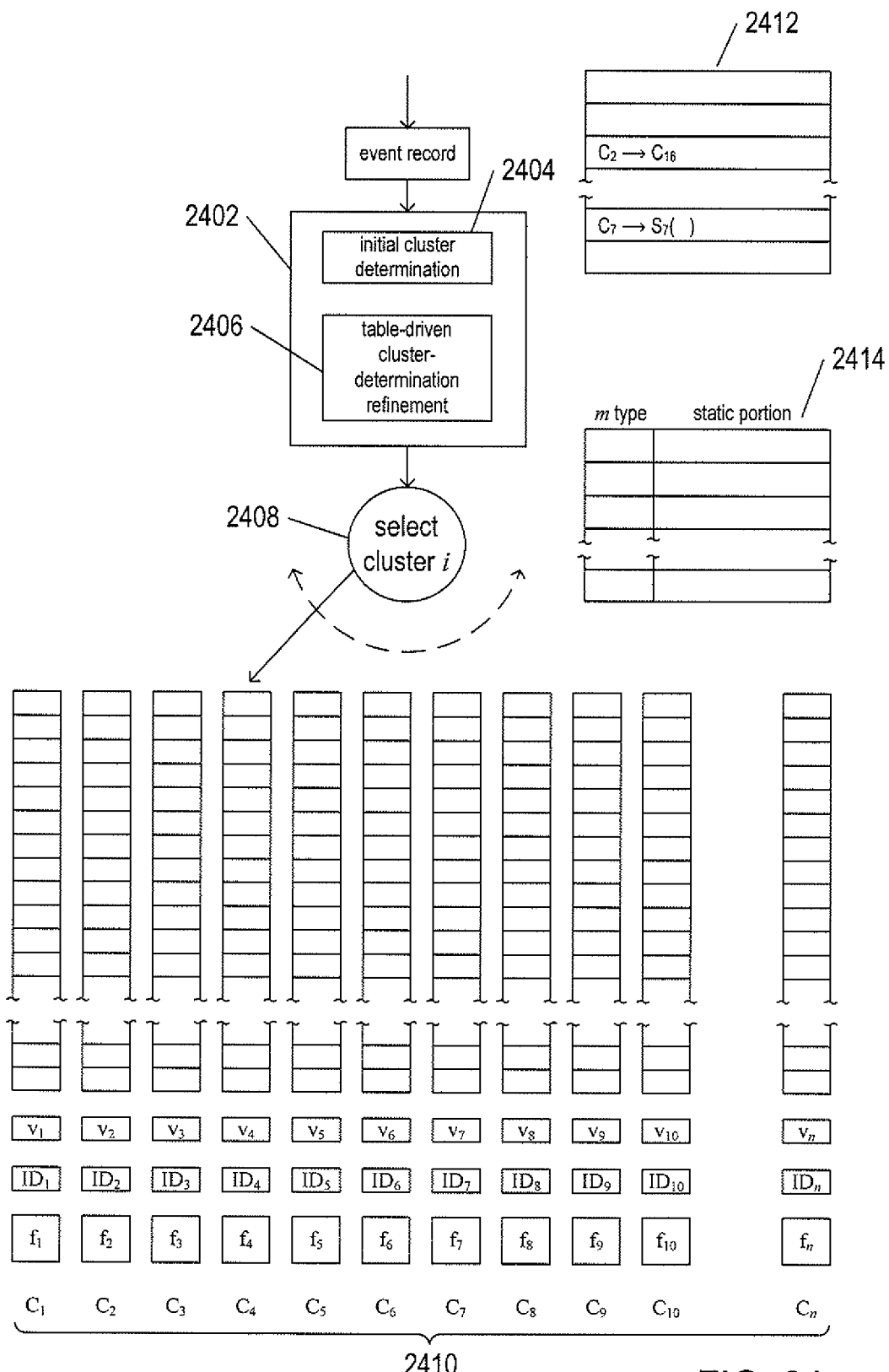
FIG. 24 provides a final illustration of one implementation of the event-message-clustering system.

FIG. 24 provides a final illustration of one implementation of the event-message-clustering system. FIG. 24 uses similar illustration conventions as used in FIGS. 21 and 14A. The event-message-clustering system includes event-message-processing logic 2402 which includes initial cluster determination logic 2104 and table-driven cluster-determination refinement logic 2406. The initial cluster determination logic 2404 normalizes an input event message, computes a feature vector from the non-parameter tokens within the normalized event message, and uses the feature vector to identify a cluster to which to assign the event message. The table-driven cluster-determination-refinement logic 2406 applies redirection rules in a table of redirection rules in order to carry out any specified redirection of the initial cluster determination that results from previous merge and split operations, as discussed above with reference to FIGS. 22 and 23. The distributor subcomponent 2408 and clusters 2410 are similar to those described with reference to FIG. 21. The event-message-clustering system additionally includes a table of redirection rules 2412 and a table of static portions for each message type 2414 that allow the event-message-clustering system to regenerate original event messages from event records should the original event messages be needed. The table of redirection rules 2412 includes at most one entry for each cluster identifier. A particular cluster may be associated with a single redirection rule or may not be associated with a redirection rule. As discussed above, the redirection rules either indicate to which cluster an event message initially designated as belonging to a first cluster should be forwarded or includes a rule that uses a function to determine to which cluster to forward an event message initially determined to belong to a cluster that was subsequently split. When a redirection rule is applied to a first cluster indication to generate a second cluster identification, the redirection-rule table is again accessed to determine whether there is another redirection rule that may be applied to the second cluster identification. In other words, redirection rules are iteratively applied until a cluster indication is obtained for which there is no redirection rule in the redirection-rule table.

Figure 25:
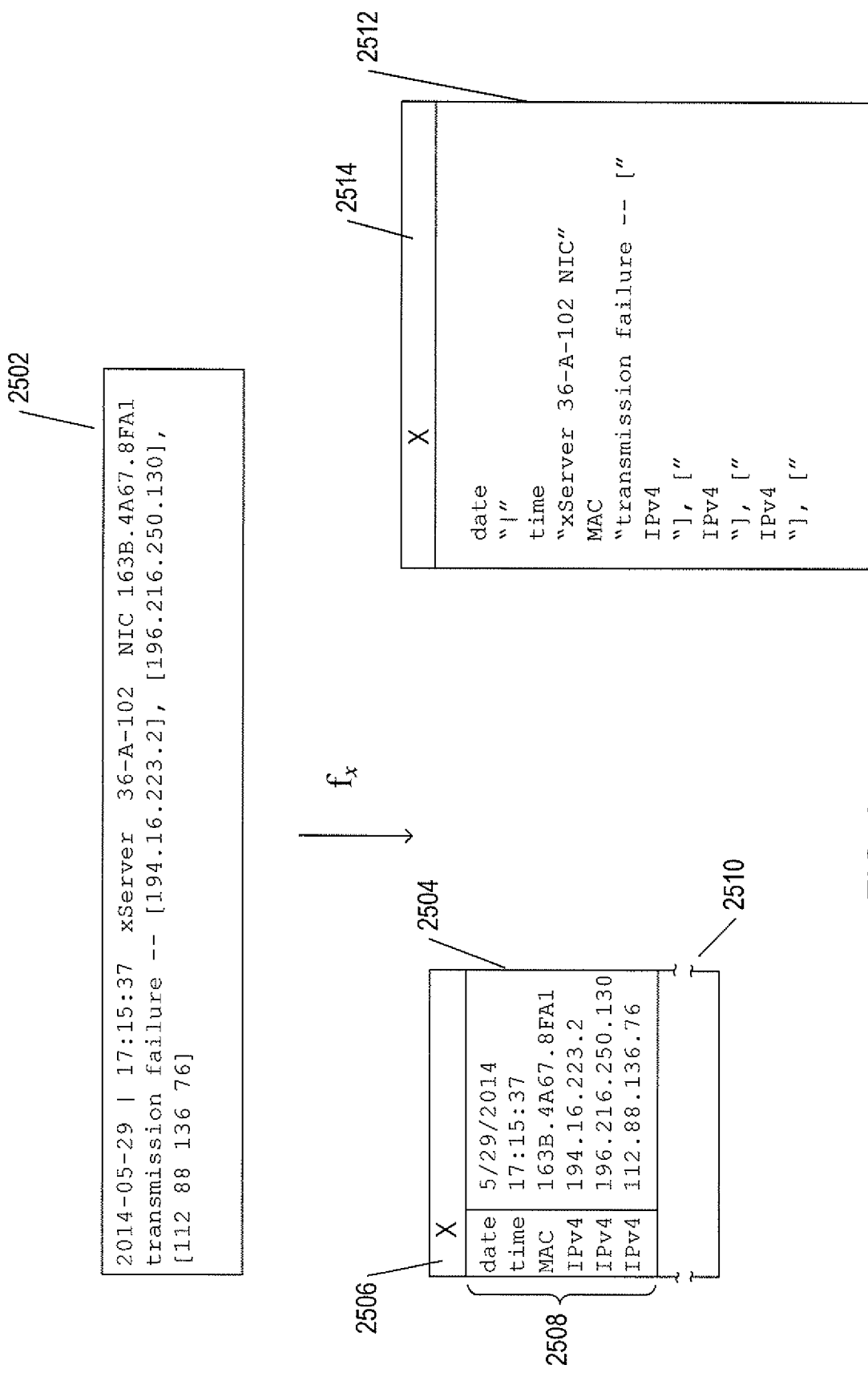
FIG. 25 illustrates a process that extracts parameter values from an event message.

FIG. 25 illustrates a process that extracts parameter values from an event message. As discussed above, each cluster is associated with a parsing function that allows the event-message-clustering system to extract parameter values from the event message. In the example shown in FIG. 25, the function $f_x$ associated with a cluster corresponding to event-message type x, when applied to a received event message of type x 2502, returns an ordered list of parameter values extracted from the message. The sorted list of parameter values can be assembled into an event record 2504 that describes the received event message. The event record may include a header with an indication of the event-message type 2506, a list of parameter values and associated parameter types 2508, and any additional information 2510 that an event-message-clustering system may choose to associate with event records, including details with regard to from where the event message was received. A representation of the static, non-parameter portion of the message 2512 along with an indication of the message type 2514 may be stored in the static-portion table (2414 in FIG. 24) to allow the original message 2502 to be reconstituted from the event record 2504 generated from the original event message.

Figure 26C:
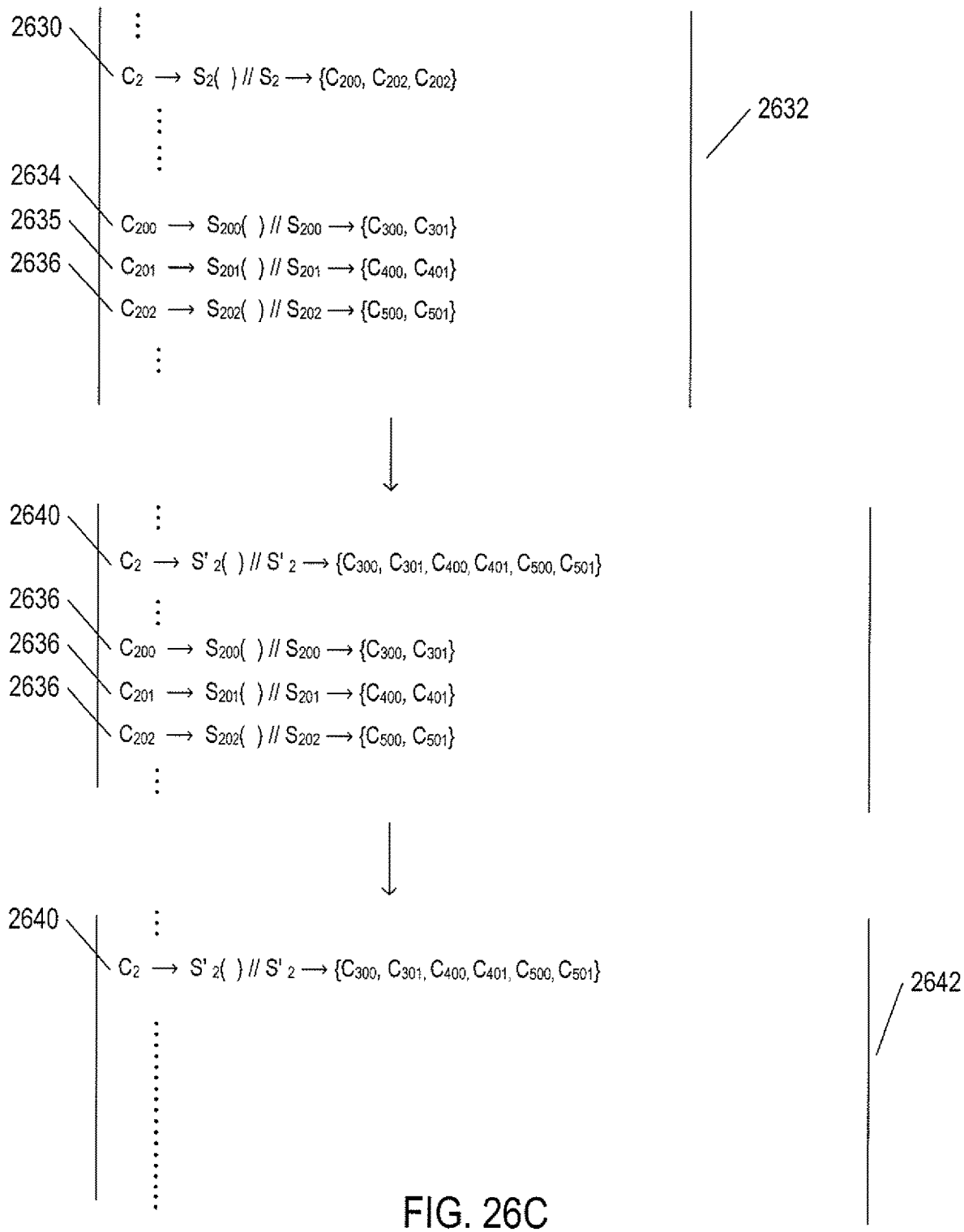

The redirection rules stored by the event-message-clustering system may be periodically analyzed in order to remove and archive unneeded redirection rules. In addition, this analysis may recognize situations in which some number of redirection rules can be replaced, often along with readjustments in the set of clusters managed by the event-message-clustering system. FIGS. 26A-C illustrate examples of editing of the redirection-rule table. In FIG. 26A, the redirection-rule table includes two merge redirection rules 2602 and 2604 and a subsequently added split redirection rule 2606. As it turns out, the split redirection rule 2606 essentially reverses the merge operation represented by the two merge redirection rules 2602 and 2604. In this case, the clusters $C_2$ and $C_{51}$ can be re-established and the two merge redirection rules 2602 and 2604 removed, temporarily leaving the split rule 2606 to allow event messages that were typed as belonging to cluster $C_{100}$ to be retyped during subsequent processing, as shown in the inteunediate redirection-rule table 2610. Ultimately, once all event records typed as belonging to cluster $C_{100}$ have been flushed or archived, the split rule 2606 can be removed to completely restore the redirection table with respect to clusters $C_2$ and $C_{51}$ 2612.

FIG. 26B shows another example of redirection-rule-table editing. In this example, cluster $C_2$ was split, as a result of which the split rule 2620 was added to the redirection-rule table. Subsequently, merge rules 2622 that reverse the split operation were added to the redirection-rule table. In this case, the split rule 2620 can be removed and the original cluster $C_2$ re-established, producing an intermediary redirection-rule table 2624. Once all the event records typed as belonging to events $C_{100}$, $C_{101}$, $C_{102}$, and $C_{200}$ have been removed and archived from the event-message-clustering system, the merge rules and redirection rule can be removed to restore the redirection-rule table to its initial condition with respect to cluster $C_2$ 2626.

FIG. 26C shows yet an additional example of redirection-rule table editing. In this example, the cluster $C_2$ was split three ways, resulting in the addition of redirection rule 2630 to the redirection-rule table 2632. Subsequently, each of the new clusters created as a result of the split operation were again split, resulting in the addition of split redirection rules 2634-2636. This set of split redirection rules can be modified by creating a comprehensive split rule 2640 to directly split cluster $C_2$ into the six clusters $C_{300}$, $C_{301}$, $C_{400}$, $C_{401}$, $C_{500}$, and $C_{501}$. The three split redirection rules 2634, 2635, and 2636 are maintained until all event records typed as belonging to clusters $C_{200}$, $C_{201}$, and $C_{202}$ are removed and archived. Then, they can be removed leaving only the comprehensive split redirection rule 2640 in the redirection-rule table 2642. FIGS. 26A-C illustrate a few simple examples of redirection-rule-table editing and associated cluster reorganization. There are many additional, more complex examples in which chains and cycles of redirection rules can be removed from the redirection table. In addition, clusters can be periodically re-indexed in order to compress the range of active cluster indexes.

One approach to identifying variables in event messages as well as to generating parsing functions for event-message clusters is to use regular expressions. FIG. 27A illustrates regular expressions corresponding to various types of formats in which dates may be encoded in event messages. In FIG. 27A, examples of numerous date formats are shown in a left column 2702 and corresponding regular expressions that can be used to identify substrings of symbols within a symbol string representing dates in the formats are provided in a right-hand column 2704. Regular expressions are generally symbolic encodings of search patterns that can be applied to text in order to identify substrings. The details regarding various regular-expression syntaxes can be found in numerous references. Regular expressions are widely used in text-processing programs and are included in many modern programming languages, including Perl, Ruby, Python, and C++11.

In one type of symbolic encoding of dates, a date 2706 can be expressed as a three-character indication of the month, followed by a space, followed by a one-digit or two-digit representation of the day of the month, followed by another space, and finally followed by a four-digit representation of the year. The regular expression 2708 represents a search pattern that can be used to find symbolic encodings of dates, in the format described with reference to date 2706 in FIG. 27A, in text and symbol strings. The parenthesized list of vertical-bar-delimited three-character month specifications 2710 indicates that any of these three-character month specifications may occur as the first part of the symbolic encoding of a date. The "/s" 2711 indicates a single white-space character, the bracketed digit range 2712 indicates that one of the digits 0, 1, 2, or 3 may next occur, but the question mark 2713 indicates that the digit may or may not be present, the "Id" 2714 indicates that a single digit next occurs, the substring "20" 2715 indicates that the digits 2 and 0 next follow, and the pair of "/d" substrings 2716 indicate that two additional digits next occur.

In general, there is not a unique one-to-one mapping between date formats and regular expressions. Many different regular expressions can be developed to represent a search pattern for any particular data-encoding symbol format. Furthermore, more complex regular expressions can be devised to more exactly specify the substrings that can represent a particular date format. For example, regular expression 2708 would identify "Feb. 31 2014" within a symbol string as a date, but, of course, February 31$^{st}$ is not a valid date. A more complicated regular expression can be devised to exclude such invalid dates.

FIG. 27B illustrates construction of generalized regular expressions that identify two or more types of date formats. For example, regular expression 2720 can be used to identify substrings representing dates encoded in either of the first and third date formats shown in the left-hand column 2702 of FIG. 27A. These two different types of date formats are similar, differing in that the month is fully spelled out in the third format 2722 in FIG. 27A, rather than abbreviated, as in the first format 2706 and the third format includes a comma following the day, while the first format does not. Regular expression 2724 can be used to identify dates encoded in any of the first three formats 2706, 2726, and 2722 illustrated by example in FIG. 27A. A generic regular expression can be developed to recognize dates encoded in any of a very large number of different possible date-encoding formats. However, in general, the more different formats recognized by a regular expression, the larger and more complex the regular expression. In many cases, it is more computationally efficient to develop a number of regular expressions to recognize a corresponding number of classes of date formats and to apply the number of regular expressions iteratively to text in order to identify all the possible dates within the text. The methods described below employ table-driven searching in which regular expressions are successively extracted from a table and applied to an event message in order to identify data encoded in particular formats associated with particular data types.

FIG. 27C illustrates an example of the use of regular expressions in text processing. First, as shown by expression 2730 in FIG. 27C, it is well known that a regular expression 2732 can be transformed into a non-deterministic finite automata 2734. A non-deterministic finite automata can, in turn, be transformed into a deterministic finite automata 2736, and deterministic finite automata 2736 can be implemented as a computer routine 2738. In other words, a computer routine can be developed to recognize substrings within text specified by any given regular expression. These computer routines can be embedded within text-processing routines, many examples of which can be found in text-processing applications and included in programming languages. One example is a routine "find" that returns the indices of substrings within an input string identified by an input regular expression. FIG. 27C shows a declaration for the function "find" 2740. The function returns the number of substrings 2742 identified within an input string 2744 that correspond to an input regular expression 2746 and additionally returns, in an array of indices 2748, the indices of the starting positions within the string of each identified substring corresponding to the input regular expression. For example, when the input regular expression indicates a succession of three digits 2750, input of the string 2752 to the function "find" returns the number 2 (2754 in FIG. 27C) and the indices 2756 of two three-digit substrings. The initial symbols, or digits, of the two three-digit substrings are shown by arrows 2758-2759 in FIG. 27C.

FIG. 27D shows a representation of the deterministic finite automata 2760 corresponding to the regular expression 2750 in the example shown in FIG. 27C. The deterministic finite automata is a state-transition diagram that includes an initial state 2762, a non-digit state 2764, and three digit states, the last 2766 of which represents identification of a three-digit substring. Arrows represent transitions between states that occur on input or consideration of a next symbol of a symbol string. The identification of a three-digit substring can be recorded upon reaching the final digit state 2766.

Regular expressions can be used, in one implementation of the currently described event-message-clustering subsystem, to identify variables within an event message. FIGS. 28A-B illustrate implementation of a regular-expression-based variable-finding subsystem. FIG. 28A shows a table of data-type/regular-expression pairs 2802 that provides a basis for variable identification. For each format or class of formats for each different data type of variables in event messages, a regular expression is stored in the table. In general, the table is ordered, with more specific data types occurring before, or higher in the table than, more generic encoded data. For example, date and time formats are generally readily recognized in text and are not ambiguous with respect to formats for other data types, and therefore occur higher in the table than more generic data types, such as integers. FIG. 28B shows a results table in which results of the variable-identifying subsystem are stored for a particular processed event message. Each row in the results table 2804, such as row 2806, represents an identified variable within an event message. The variable is characterized by an index of the starting symbol of the variable 2808, the length of the symbol string corresponding to the variable 2809, the row of the data-type table (2802 in FIG. 28A) corresponding to the data type of the variable 2810, and the substring that encodes the variable within the event message 2812.

Figures 29A, 29B:
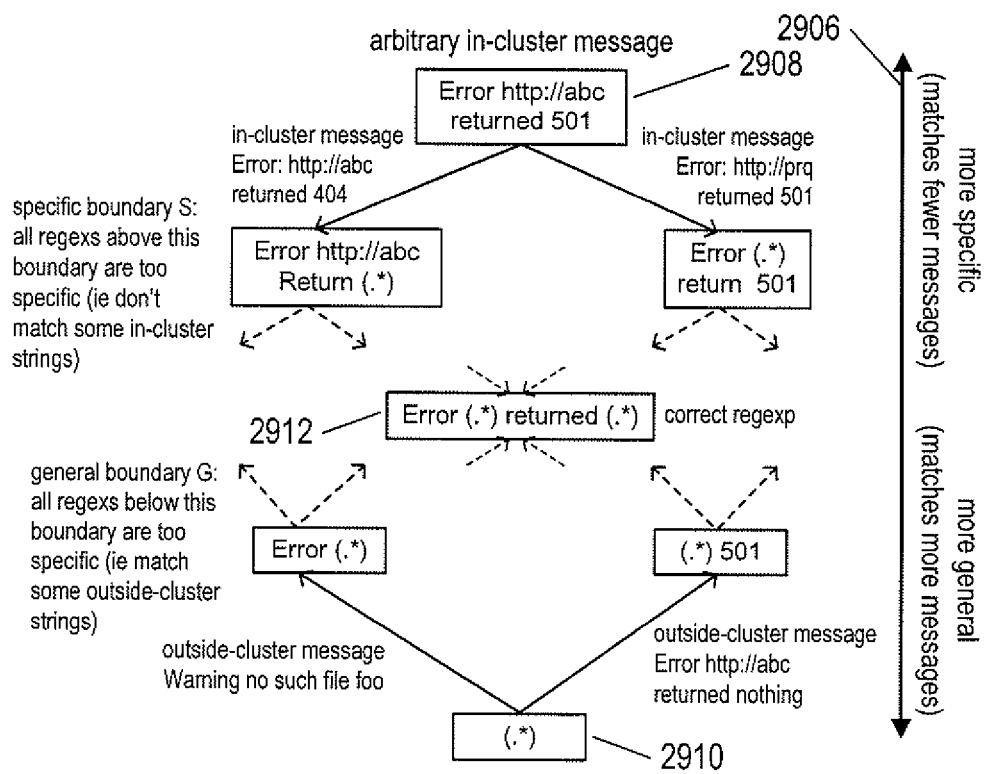
FIGS. 29A-B illustrate a general approach to generating a parsing function for an event-message cluster.

FIGS. 29A-B illustrates a general approach to generating a parsing function for an event-message cluster. FIG. 29A shows four very short event messages of a particular event-message cluster 2902-2905. FIG. 29B illustrates a variety of different regular-expression-based parsing functions for the event-message cluster positioned along a vertical dimension of specificity 2906. The most specific parsing function 2908 is the literal string corresponding to the first event message 2902. This parsing function would be very effective for recognizing the first event message, but would fail to recognize any of the other event messages in the cluster. Thus, parsing function 2908 is far too specific to be used as the parsing function for a cluster containing the four event messages. By contrast, the most generalized parsing function 2920 would return success for all four of the event messages 2902-2905 in the cluster. However, this generic parsing function would return success when applied to any event message. A useful parsing function for the cluster 2912 represents a balance, in specificity, between the most general parsing function 2910 and the most specific parsing function 2908. In the useful parsing function 2912, a regular expression that can be applied to event messages, the common static portions of the event messages within the cluster are represented by literals, including the substring "Error" and the substring "returned." The variable substrings within the event messages are represented, in the regular expression 2912, by the regular sub-expression "(.*)," which matches any substring, including an empty substring. Finding an appropriate regular-expression-based parsing function for a cluster of event messages thus involves generating a regular expression that represents a specificity balance and that can be used to extract the variable portions of the event messages of a cluster.

Figure 30:
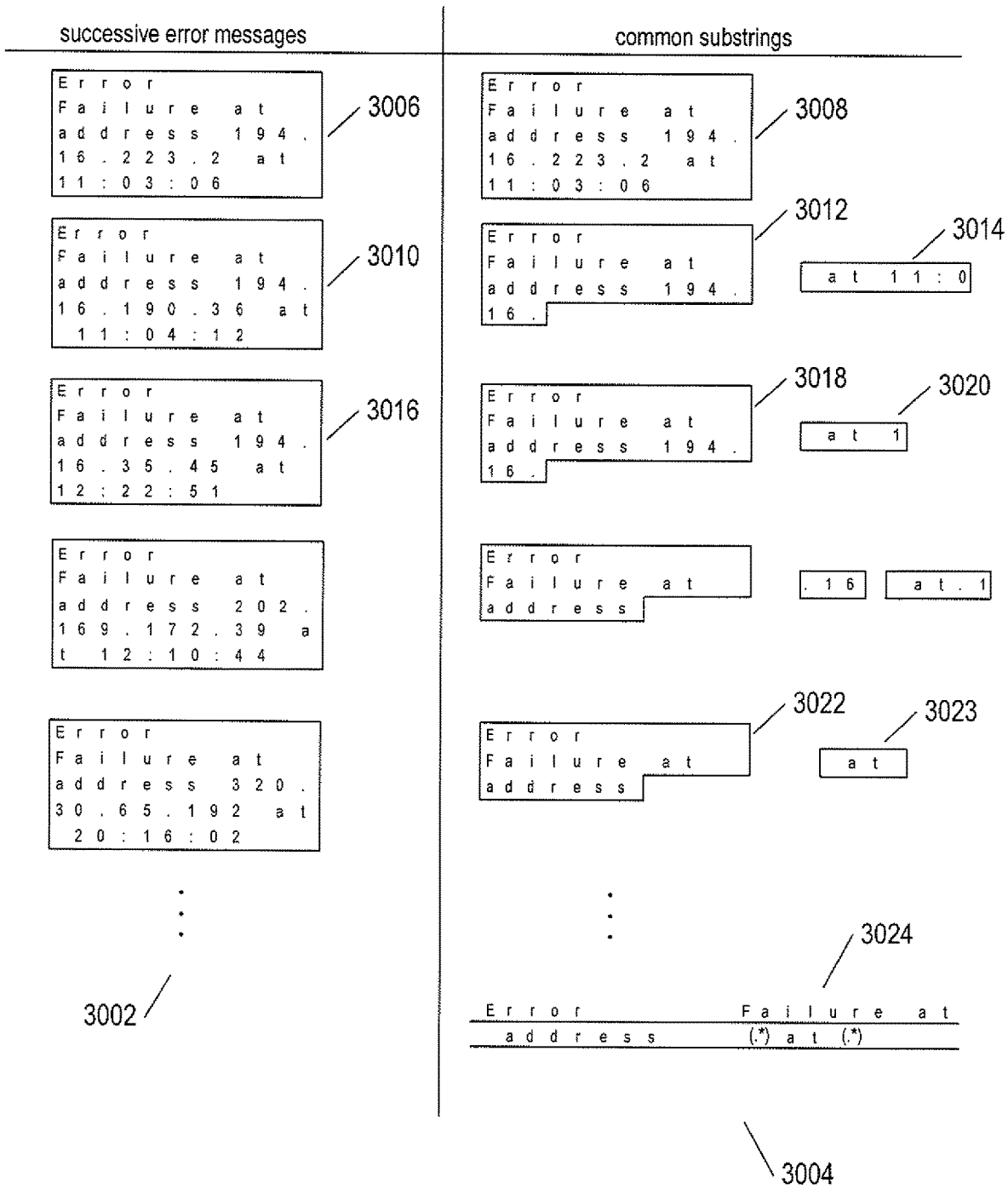
FIG. 30 illustrates a computational method for identifying the static or conserved substrings within a cluster of event messages.

Next, one approach to generating useful parsing functions for event-message clusters is described. FIG. 30 illustrates a computational method for identifying the static or conserved substrings within a cluster of event messages. FIG. 30 provides an illustrated example of the common-substring-recognizing method. In a left column 3002 of FIG. 30, successive event messages within an event-message cluster are shown. A right-hand column 3004 of FIG. 30 shows a currently recognized common substring for the cluster as the method considers, in turn, each successive event message within the cluster. Following consideration of the first event message 3006, the common substring is the entire first event message 3008. This common substring 3008 is next considered with respect to the second event message 3010. Comparison of the common substring 3008 to the second event message 3010 reveals that, following consideration of the first two event messages in the cluster, there are two common substrings 3012 and 3014. These two common substrings 3012 and 3014 represent the common portions of previous common substring 3008 and the second event message 3010. Next, the common substrings 3012 and 3014 are compared to the third event message 3016. As a result of this comparison, two new common substrings 3018 and 3020 are produced. This process continues with consideration of subsequent event messages to produce common substrings 3022 and 3023 which, should the remaining event messages in the cluster follow the same pattern followed by the initial five event messages in the cluster, represent the common or static portions of all of the event messages within the cluster. These two common substrings 3022-3023 can then be used to create an initial regular expression 3024 as the basis for a parsing function for the event messages of the cluster. This initial regular expression includes the literal strings for the two common substrings and regular-expression sub-expressions "(.*)" for the variable portions of the event messages.

Figure 31A:
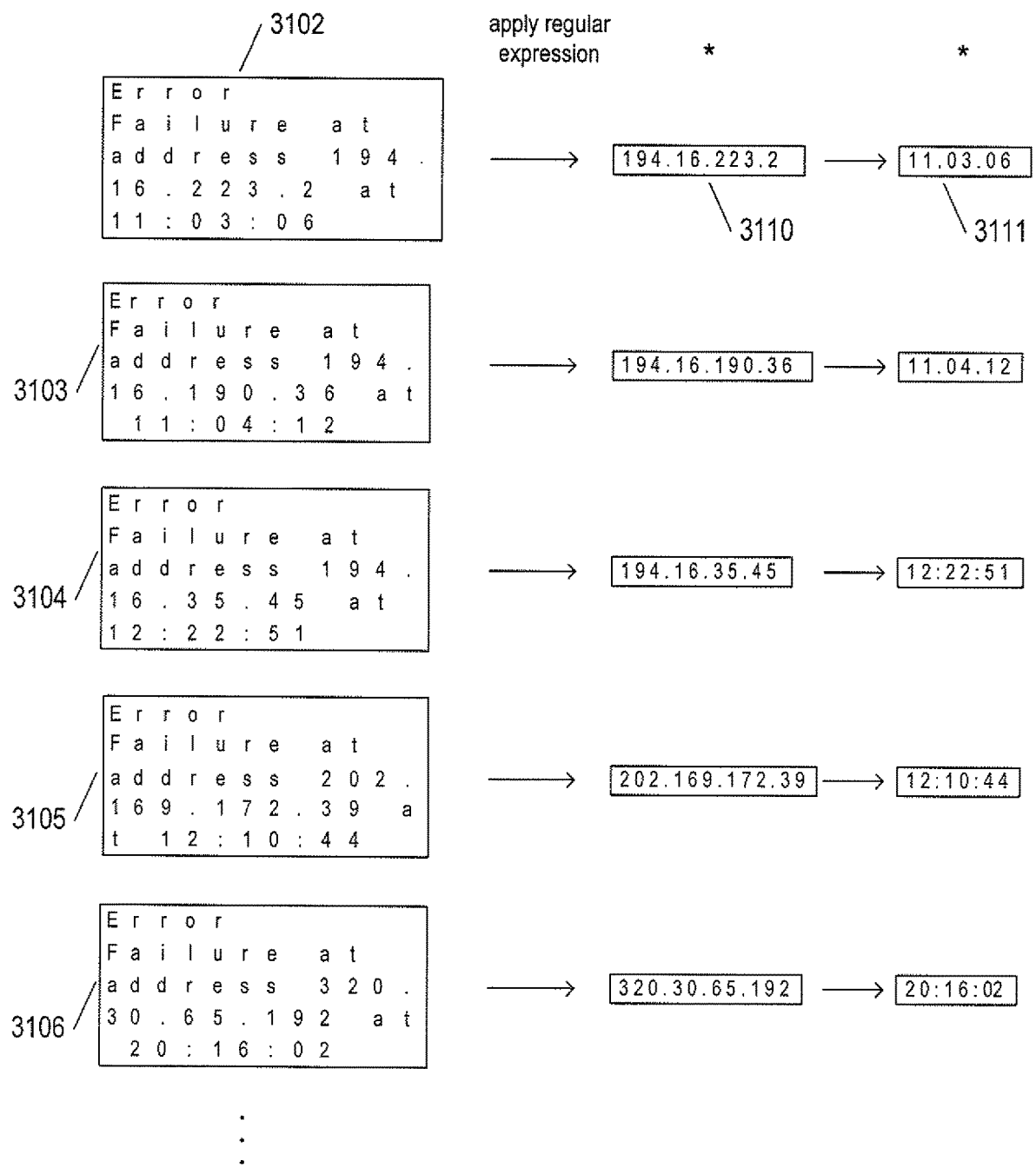
FIGS. 31A-B illustrate the process of obtaining a more specific regular expression by identifying encoded data within the variable portions of the event messages.
Figure 31B:
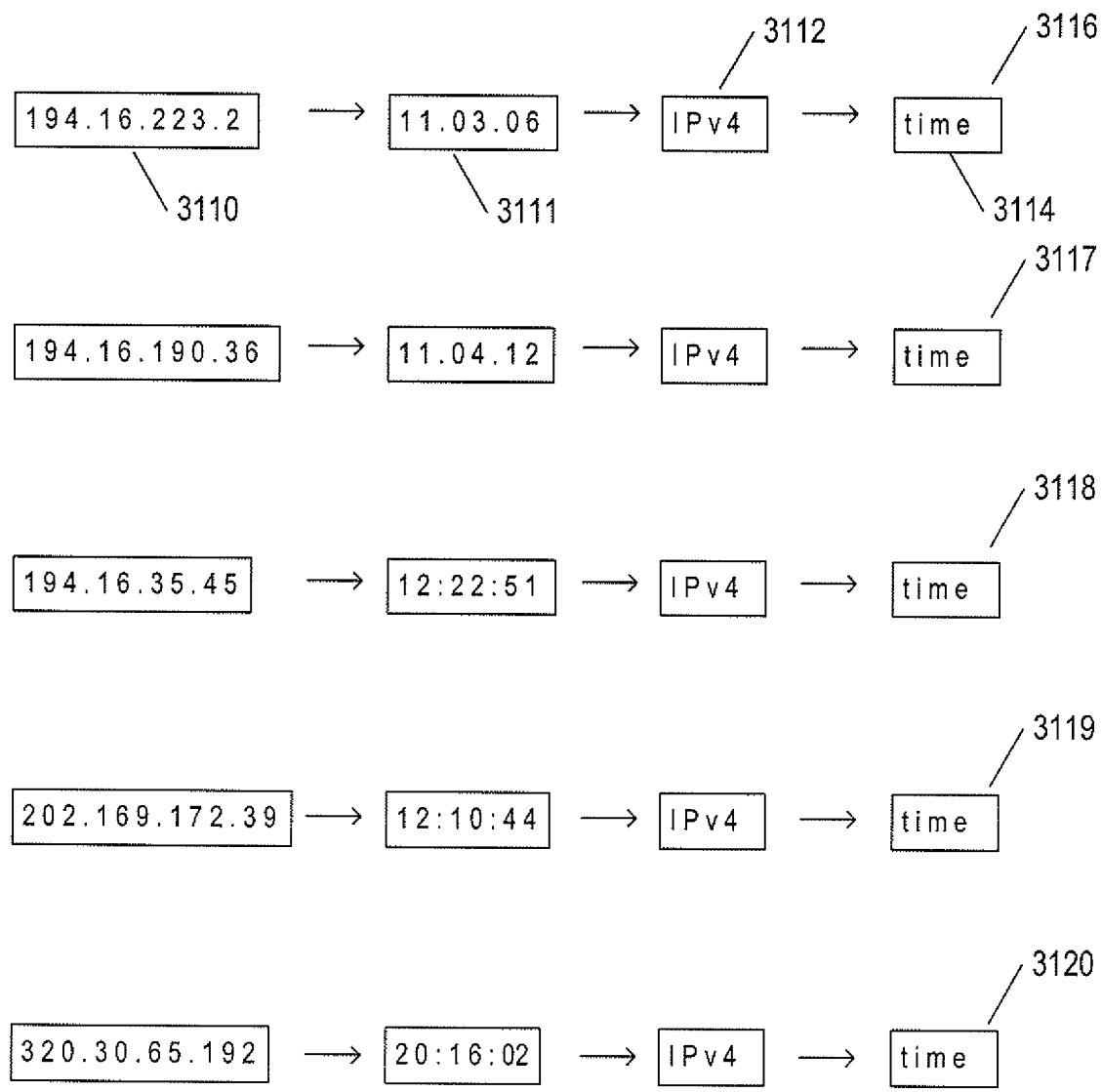

Following generation of an initial regular expression, as discussed above, a more specific regular expression can be obtained by identifying encoded data within the variable portions of the event messages. FIGS. 31A-B illustrate this process. In FIG. 31A, the same event messages 3102-3106 used in the example of FIG. 30 are again shown. The initial regular expression can be applied to each event message, using a function similar to the previously described "find" function, to identify substrings corresponding to sub-regular expressions within the initial regular expression. In the example shown in FIG. 31A, the find-like function is used to identify those substrings within each event message corresponding to the variable portions specified by the sub-regular expressions "(.*)" in the initial regular expression. These substrings are linked together as a list. For example, applying the initial regular expression to the first event message 3102 produces the list of two substrings 3110-3111 that contain the variable portions of the first event message.

FIG. 31B illustrates a next step in the process of creating a more specific regular expression. In FIG. 31B, the lists of substrings representing variable portions of event messages, such as the list that includes substrings 3110 and 3111, are converted into lists of data types contained within the variable portions. In the current example, substring 3110 is recognized as an IP address 3112 and substring 3111 is recognized as a time 3114. In this case, there are no remaining non-data-type-encoding symbols in the substrings. As shown in FIG. 31B, all of the lists of substrings corresponding to variable regions of the five event messages 3102-3106 are converted into corresponding lists of data types 3116-3120. Thus, the variable portions of the event messages have been transformed into lists of data types, allowing the initial regular expression to be transformed into a more specific regular expression that can serve as the basis for a parsing function that can be used to extract variable data from each event message of a cluster.

Figure 32A:
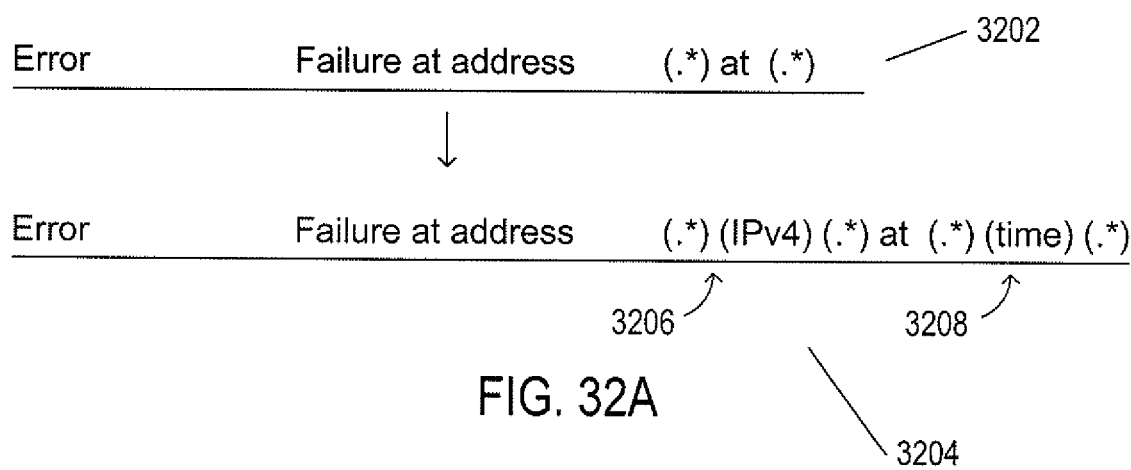
FIGS. 32A-B illustrate a final regular expression and data-table template.
Figure 32B:
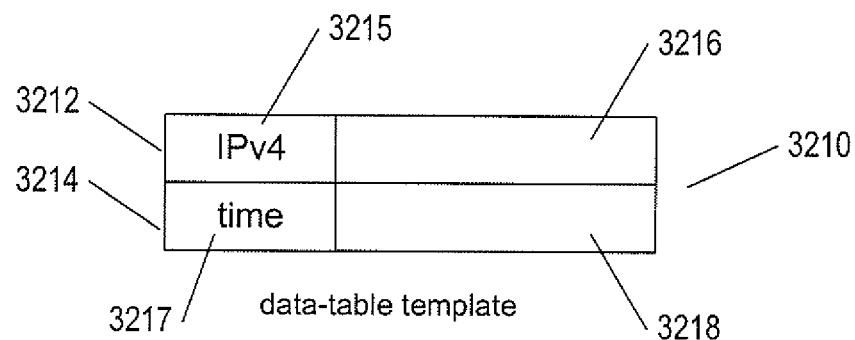

FIGS. 32A-B illustrate a final regular expression and data-table template. The initial regular expression 3202 for the example is transformed, as indicated in FIG. 32A, into a final expression 3204 by adding sub-regular expressions 3206 and 3208 for the IP-address and time encoded data, bracketed by sub-regular expressions "(.*)," for each of the variable portions represented in the initial regular expression 3202 by the sub-regular expression "(.*)." Note that the actual sub-regular expressions for IP addresses and times are not shown in FIG. 32A, but instead are symbolically represented by "(IPv4)" and "(time)," respectively. In general, the event messages of a cluster consistently use the same data-type formatting for each variable data value included in the event messages of the cluster, so that only a single sub-regular expression for each variable is needed in the final regular expression for the cluster. The data-table template 3210 consists of two rows 3212 and 3214. The first row 3212 includes an indication that the row represents an IP address, in a first column, and includes a field 3216, in a second column, to hold the encoding of an IP address extracted from an event message. Similarly, the second row 3214 includes an indication that the row is a time value 3217 and a field 3218 to contain a time value extracted from an event message. The final regular expression combined with the data table obtained by applying the final regular expression to an event message together represent the same information as represented by the data structures shown in, and discussed with reference to, FIG. 25. Thus, a final regular expression prepared by the above-discussed methods and data-table template, together, can be used as the parsing function for a cluster.

Figure 33A:
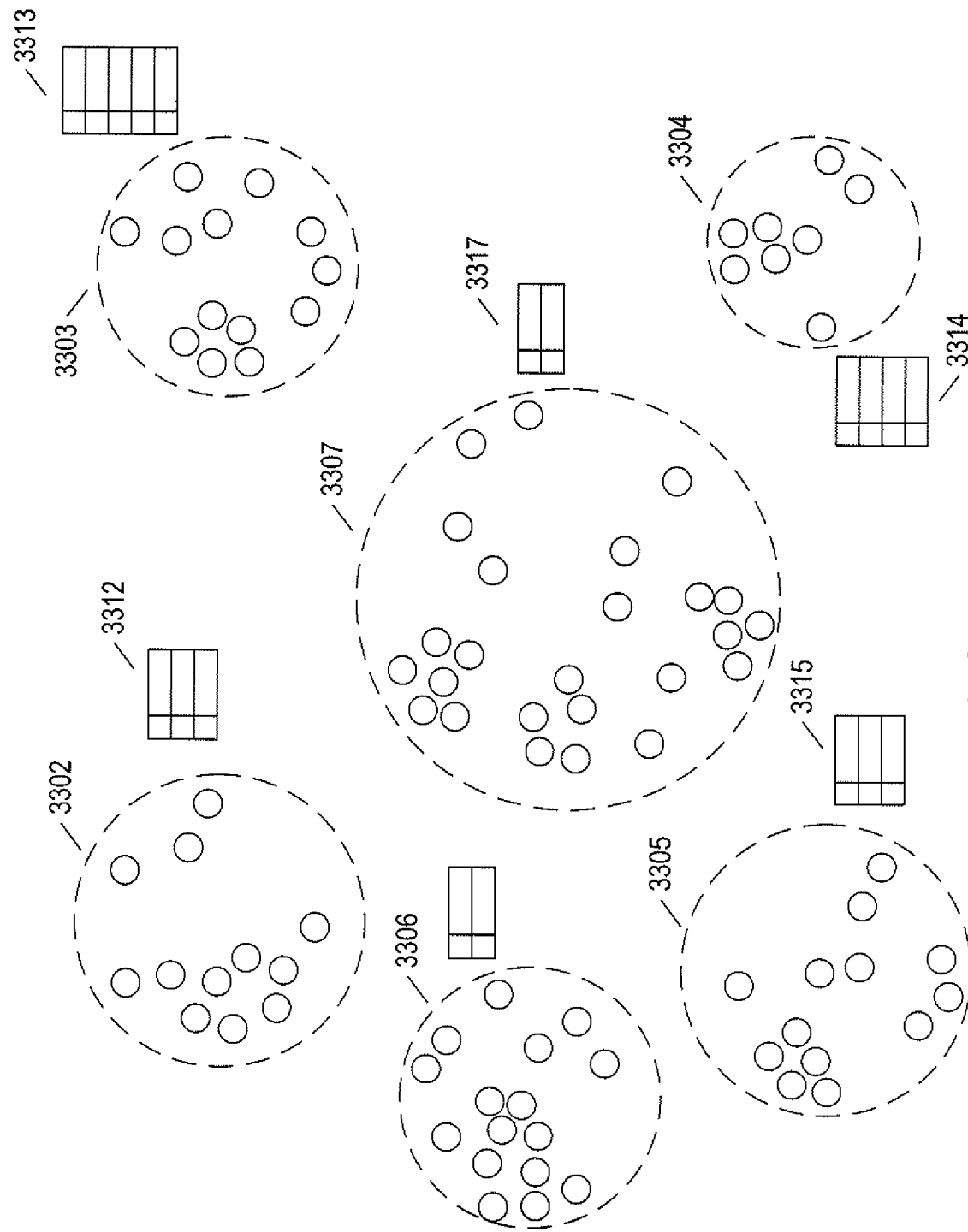
FIGS. 33A-B illustrate the information provided by the clustering subsystem about event messages that can be used to assign significance values to event messages which, in turn, can be employed for various types of event-message prioritization.
Figure 33B:
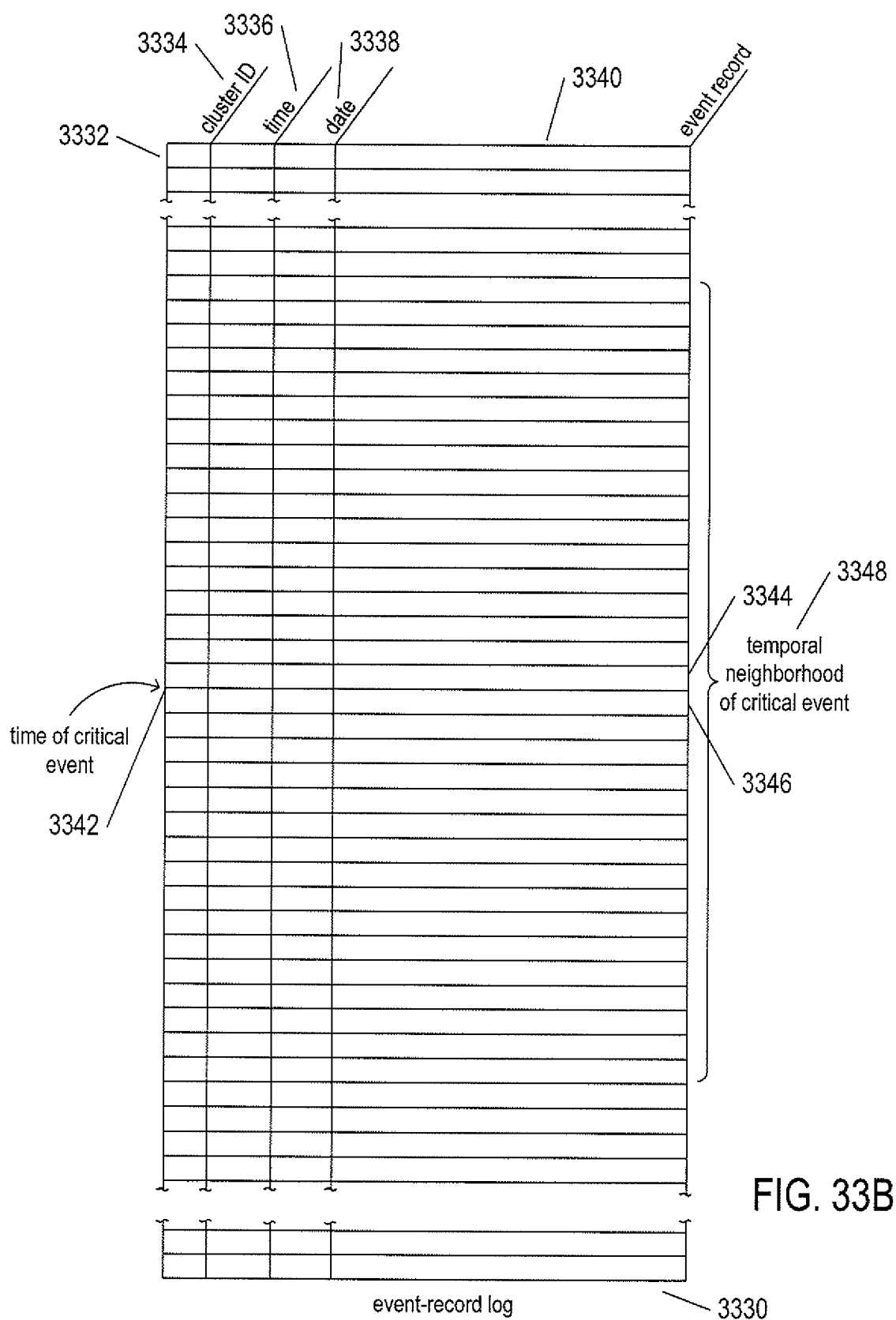

FIGS. 33A-B illustrate the information provided by the clustering subsystem about event messages. As shown in FIG. 33A, and as discussed, in detail, in the preceding subsection, the clustering subsystem organizes event messages into clusters, illustrated in FIG. 33A by dashed circles 3302-3307. Within these clusters, the various types of event messages within the cluster are represented by small disks, such as disk 3310 within cluster 3302. Each event-message type is associated with a feature vector as are the clusters. In general, the event-message types are not evenly or uniformly distributed within a hyper-dimensional sphere about the cluster position represented by the feature vector associated with the cluster. Thus, in FIG. 33A, the event-message types are shown as non-uniformly distributed within the disks of the clusters. Of course, the feature vector space is a generally high-dimensional space rather than a two-dimensional disk, but the non-uniform distribution of positions corresponding to feature vectors associated with event-message types is analogously non-uniformly populated with positions corresponding to event-message feature vectors. The clustering subsystem additionally provides data-table templates 3312-3317 for each cluster for storing the values of encoded data extracted from event messages via the parsing function associated with a cluster. The data-table templates include indications of the data types of the encoded data.

In addition to the clustering-subsystem-provided information shown in FIG. 33A, the event records generated from event messages are stored in event logs. The event log 3330 can be considered to be a very long table or file that contains a series of time-ordered event records. In FIG. 33A, each event record is represented by a row in the event log 3330, such as the event record corresponding to the first row 3332 of the event log. The event records may, as shown in FIG. 33B, include a cluster-ID field 3334, a time field 3336, a date field 3338, and a field that contains the event record prepared from a corresponding event message by the clustering subsystem 3340.

As shown in FIG. 33B, the distributed computing system may independently keep track of the time of various critical system events that occur. It may be possible to determine the position of these critical events within the timeline represented by the event log. As shown in FIG. 33B, for example, a critical event occurred at a time 3342 that falls between the times associated with event record 3344 and event record 3346. Because the event records are time ordered in the event log, a temporal neighborhood 3348 may be defined to extend, in time, above, below, or both above and below the time point 3342 of the critical event. In certain cases, the critical events may, in fact, themselves be identified event-log entries. In other cases, the critical events may be identified, manually, by system administrators, or by other types of data stored by the distributed computing system.

Event-Message Transactions

As discussed in preceding subsections, event-message typing and transformation of event messages or log messages into event records provides a foundation for managing and maintaining event log files and processing event messages in order to make sense of voluminous quantities of event-message data collected within distributed-computing systems. The current document is directed to a next-hierarchical level in event-message processing that facilitates extraction of meaningful indications of problems, anomalies, and state-changes from large quantities of processed event messages by system administrators, automated maintenance and management subsystems, and other consumers of event messages and log-file data.

Figure 34A:
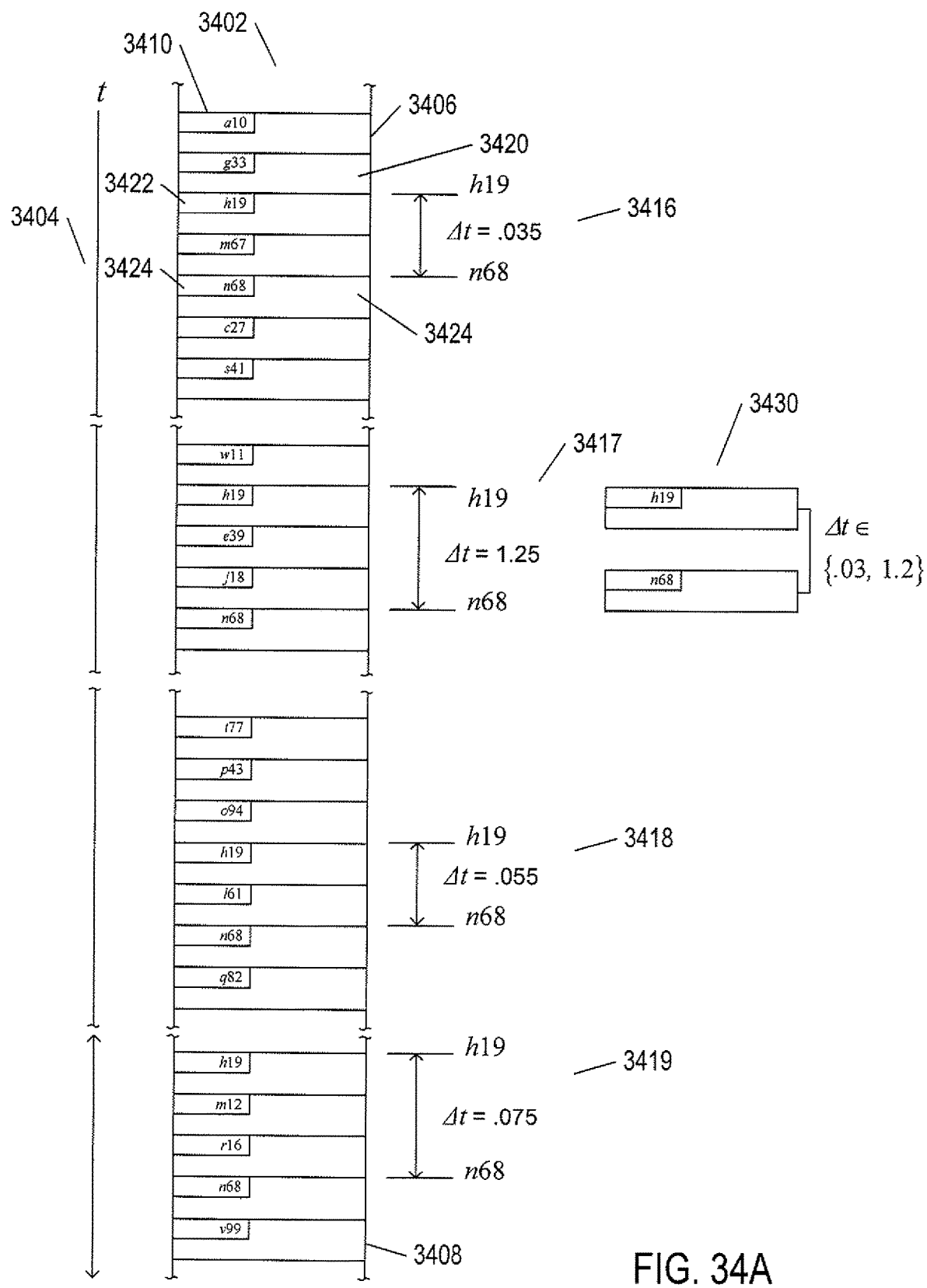
FIGS. 34A-B introduce the notion of event-message transactions.
Figure 34B:
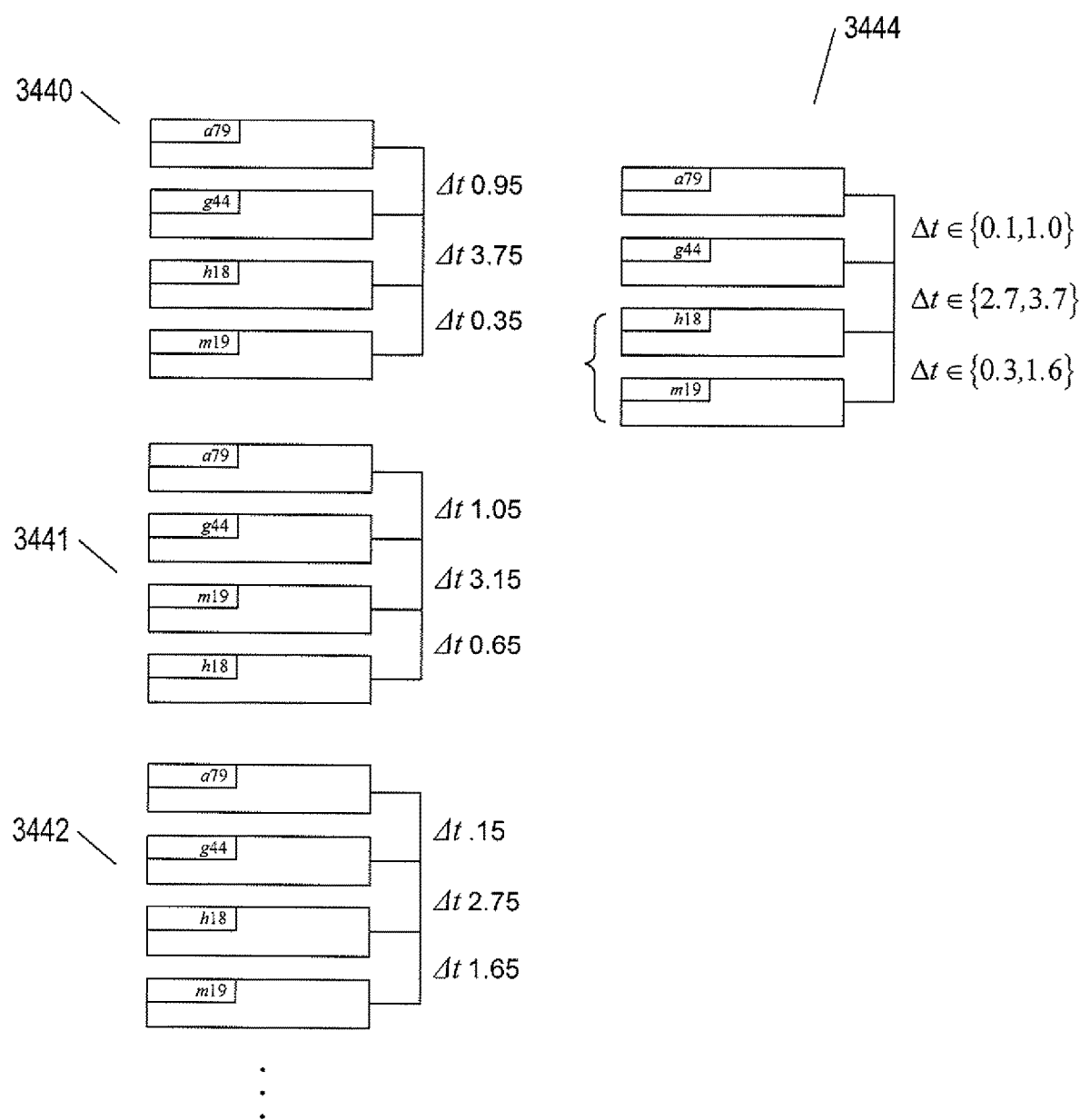

FIGS. 34A-B introduce the notion of event-message transactions. In this discussion, and in following discussions, it is assumed that event messages have been processed, as described in preceding subsections, to transform the event messages into event records associated with event-message types. The approaches and processes described in this and following discussions may be alternatively applied to unprocessed log files containing event messages, but, for conciseness and clarity of illustration, it is assumed that the currently described methods and systems are applied to event records that contain event-message types and typed and identified fields, such as the event record 2504 shown in FIG. 25.

In FIG. 34A, a column of event records 3402 represents stored event records ordered in time, as indicated by the downward-pointing time axis 3404. It can be assumed that each event record is time-stamped or otherwise associated with a time value and that the time axis does not necessarily represent a uniform, linear decrease in time in the downward direction but only the direction of decreasing time values. The most-recently received event record 3406 is shown at the top of the column and the least-recently received and processed event record 3408 of the displayed event records is shown at the bottom of the column. In subsequent figures, similar illustration conventions are used for memory buffers storing event records. Each event record contains an event-message type, such as the type "a10" 3410 within event record 3406. Examination of the event-message types within event records in column 3402 reveals that in four instances 3416-3419, an event of type "h19" occurs soon after an occurrence of an event of type "n68." For example, in instance 3416, the event record 3420 of type "h19" 3422 occurs 0.03 seconds following an occurrence of the event 3424 of type "n68" 3424. For each instance 3416-3419, the time difference $\Delta t$ for the occurrence of an event of type "h19" following an occurrence of an event of type "n68" is indicated in seconds. Based on the instances 3416-3419, one may conclude that the occurrence of an event of type "h19" from 0.03 to 1.2 seconds following the occurrence of an event of type "n68," as indicated by diagram 3430 to the right of the column of event records, may represent a regular pattern of time-correlated event-message-type occurrences. Such patterns of time-correlated event-message-type occurrences are referred to as "transactions" in the current document. A transaction representing time-correlated occurrences of two or more event-message types within a stream or sequence of event records may correspond to significant multi-event-record events, or state changes, that can provide more useful information to automated maintenance and management subsystems, system administrators, or other consumers of event messages and log files than a stream or sequence of event records containing unrecognized and unidentified transactions. In essence, a transaction is a higher-order type of information that can be extracted from streams, sequences, or stored event records. Transactions are recurring patterns of event-message-type occurrences.

FIG. 34B illustrates, using diagrams similar to diagram 3430 in FIG. 34A, another transaction. Diagrams 3440-3442 indicate that events of the four event-message types "a79," "g44," "h18," and "m19" appear to co-occur within short time windows in an event-record stream or sequence. Analysis of the patterns of event-message-type occurrences represented by diagrams 3440-3442 might result in the conclusion, represented by diagram 3444, that an event of type "h18" occurs within 0.3 to 1.6 seconds of an event of type "m19," in either time order, followed by the occurrence of an event of type "g44" after 2.7 to 3 seconds and then an occurrence of an event of type "a79" following an additional 0.1 to 1.0 seconds. Thus, it appears that the co-occurrence of the event-message types "m19," "h18," "g44," and "a79," in time, may represent a recurring pattern of event-message-type of occurrence, or transaction. In the transaction represented by diagram 3430 in FIG. 34A, an event of type "h19" appears to occur following the occurrence of an event of type "n68." However, in the transaction represented by diagram 3444 in FIG. 34B, occurrence of events of type "m19" and "h18" are not ordered in time. Patterns of event-message-type occurrences that comprise transactions may therefore be strictly time ordered, partially time ordered, or unordered with respect to time. In the following discussion, methods and systems for identifying transactions within streams or sequences of event records are discussed that identify unordered transactions. In other words, these methods and systems identify transactions as regular recurring patterns of event-message-type occurrences within time windows without regard to the time ordering of the event-message types within the time windows. These methods and subsystems may be altered or enhanced to detect and discriminate between unordered, partially ordered, or strictly ordered transactions.

Figure 35A:
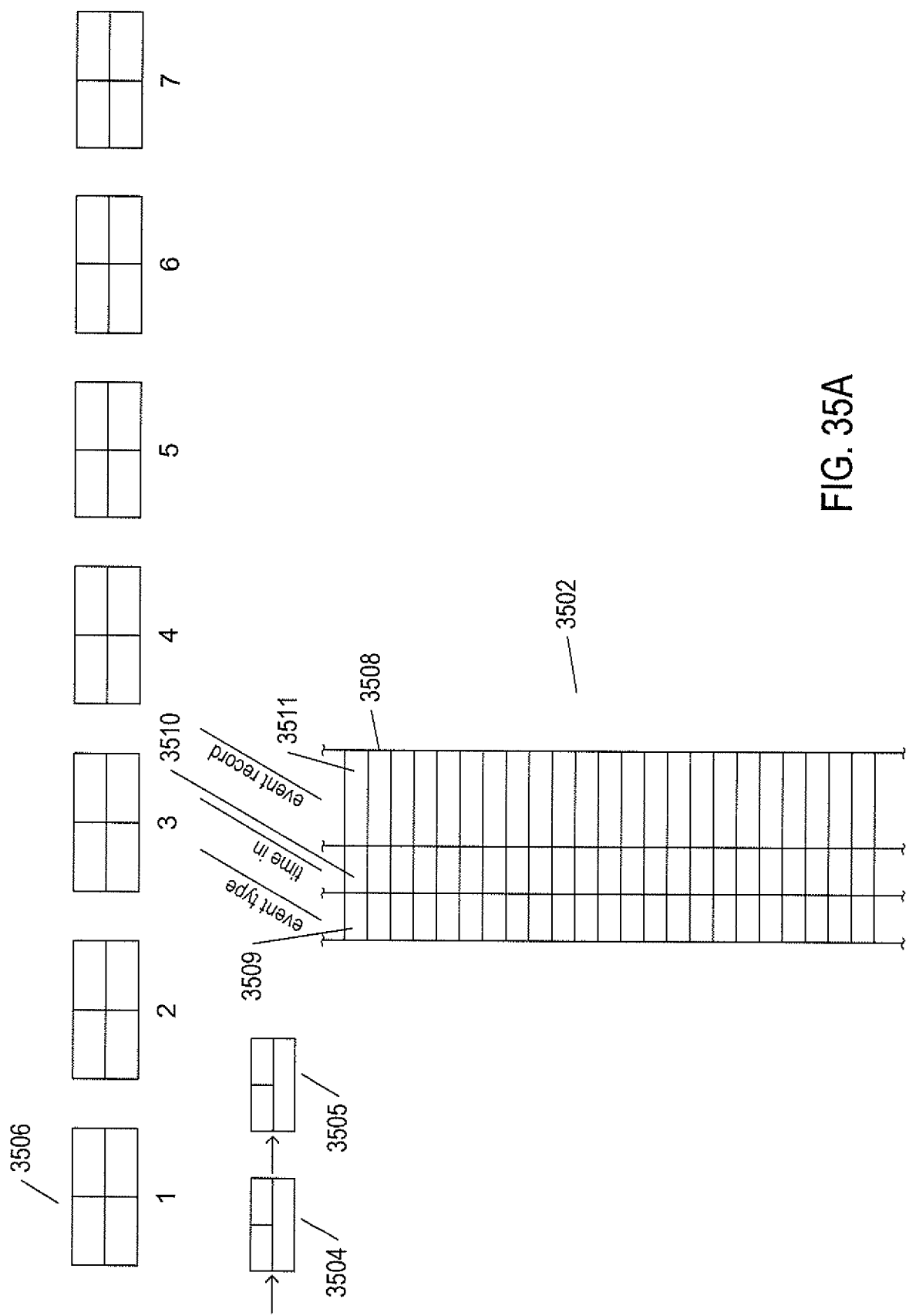

FIGS. 35A-H illustrate a counter-based method, incorporated into various event-record-processing subsystems, that monitors event-message-type co-occurrences, with respect to time, in order to establish event-message-type time correlations, from which certain types of transactions can be inferred. FIGS. 35A-H all use the same illustration conventions, next described with reference to FIG. 35A. FIG. 35A shows components of an event-record-processing subsystem. These include a memory buffer 3502 in which event records are stored in association with an indication of the time in which each event was received. Event records 3504-3505 continuously stream into the event-record processing subsystem for temporary buffering within memory buffer 3502. As the buffer 3502 fills, buffered event records are periodically removed and transferred to downstream event-record processing, including long-term event-record storage, in order to make room in the buffer 3502 for newly arriving event records. A set of counters, including counter 3506, are used to monitor event-message-type co-occurrence in time. In general, there are a fixed number of counters. In the example shown in FIGS. 35A-H, there are seven counters, in total. In an actual event-record-processing subsystem within a distributed computer system, there may be many thousands of counters for monitoring event-message-type time co-occurrences in a system that generates tens of thousands of different event-message types. The memory buffer is shown, in FIGS. 35A-H, to include rows, each corresponding to an event record. For example, the first row 3508 corresponds to a memory location in which an event record can be stored. Each event record includes an event-message type 3509, an indication of the time at which the event record was received 3510, and the remaining fields of the event record 3511. Of course, many different event-record storage schemes may be used.

FIGS. 35B-H illustrate reception and processing of six event records by the event-record-processing subsystem, components of which are illustrated in FIG. 35A. The incoming stream of event records includes a next event record to process 3512 as well as a more recently received event record 3513. Each event record includes a type, such as the type "T1" 3514 of event record 3512 as well as the remaining event-record fields, the values of which are represented by a capital letter, such as the capital letter "X" 3515 representing the remaining field values within event record 3512. The contents of received event record 3512 are placed into the last slot of the memory buffer 3516, as indicated by curved arrow 3517 in FIG. 35B.

Figure 35C:
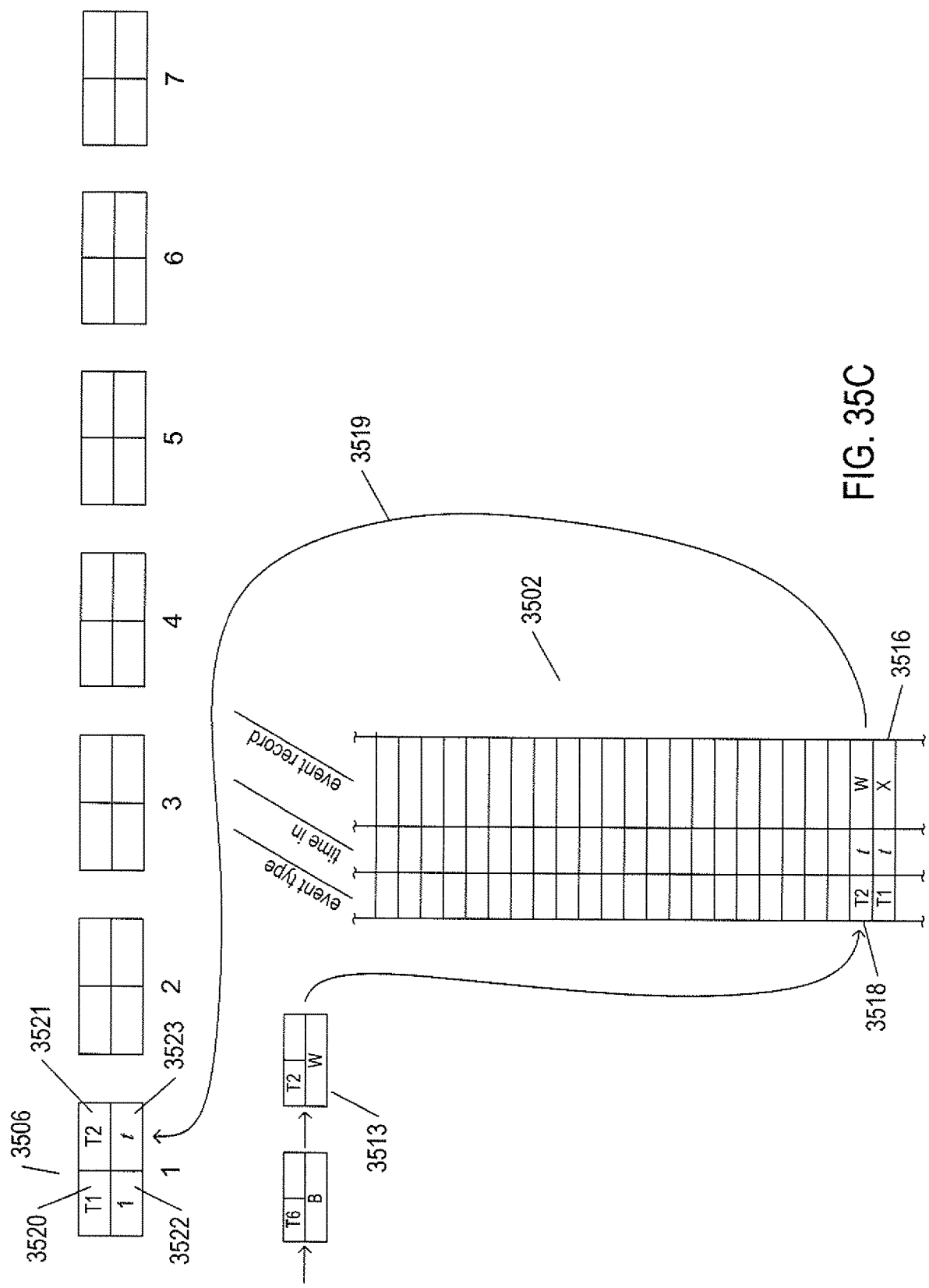

In FIG. 35C, the next event record 3513 is processed. The contents of this event record are placed into slot 3518 in the memory buffer 3502. At this point, because both event record 3513 and previously processed event record 3512 have been entered into the memory buffer and are both associated with the same reception time t, a co-occurrence in time of the event-message types "T1" and "T2" have occurred. Therefore, as indicated by curved arrow 3519, an unused counter 3506 is initialized to count co-occurrences of the event-message types "T1" and "T2." The event-message types for which the counter counts co-occurrences in time are entered in the top-row entries 3520 and 3521 of counter 3506. An initial count of "1" is entered in the counter 3522 and the most recent time for which a count has been entered into the counter 3523 is initialized to the time t at which the last of the two event records stored in slots 3516 and 3518 was received.

Figure 35D:
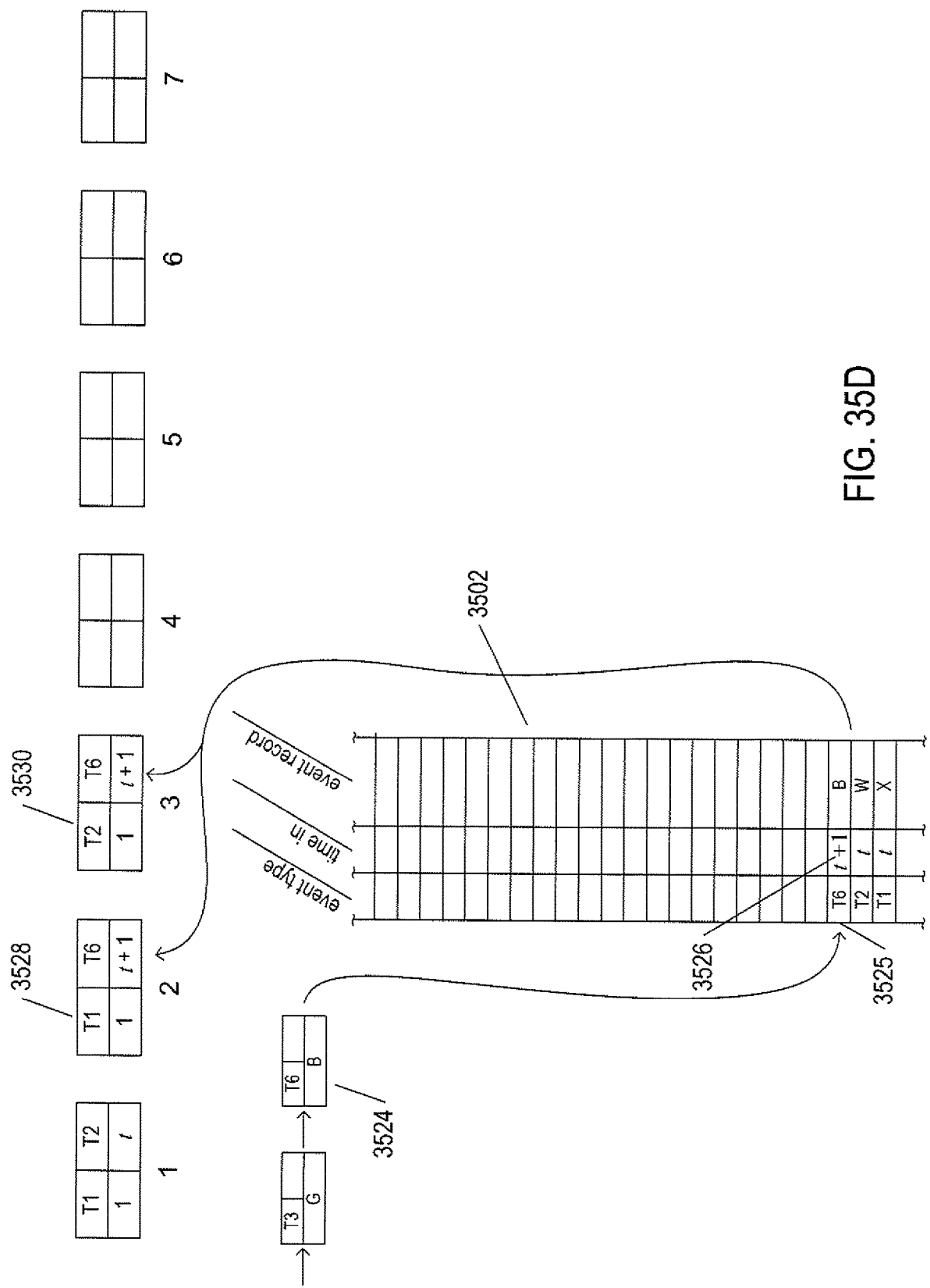

In FIG. 35D, a next-received event record 3524 is processed. This event record is stored in slot 3525 of the memory buffer 3502 in association with the time t+1 3526 at which the event record 3524 was received. Because the time span [t, t+1] is within a time window for co-occurrence, two additional counters 3528 and 3530 are initialized to count co-occurrences of events "T1" and "T6" and co-occurrences of the event-message types "T2" and "T6."

Figure 35E:
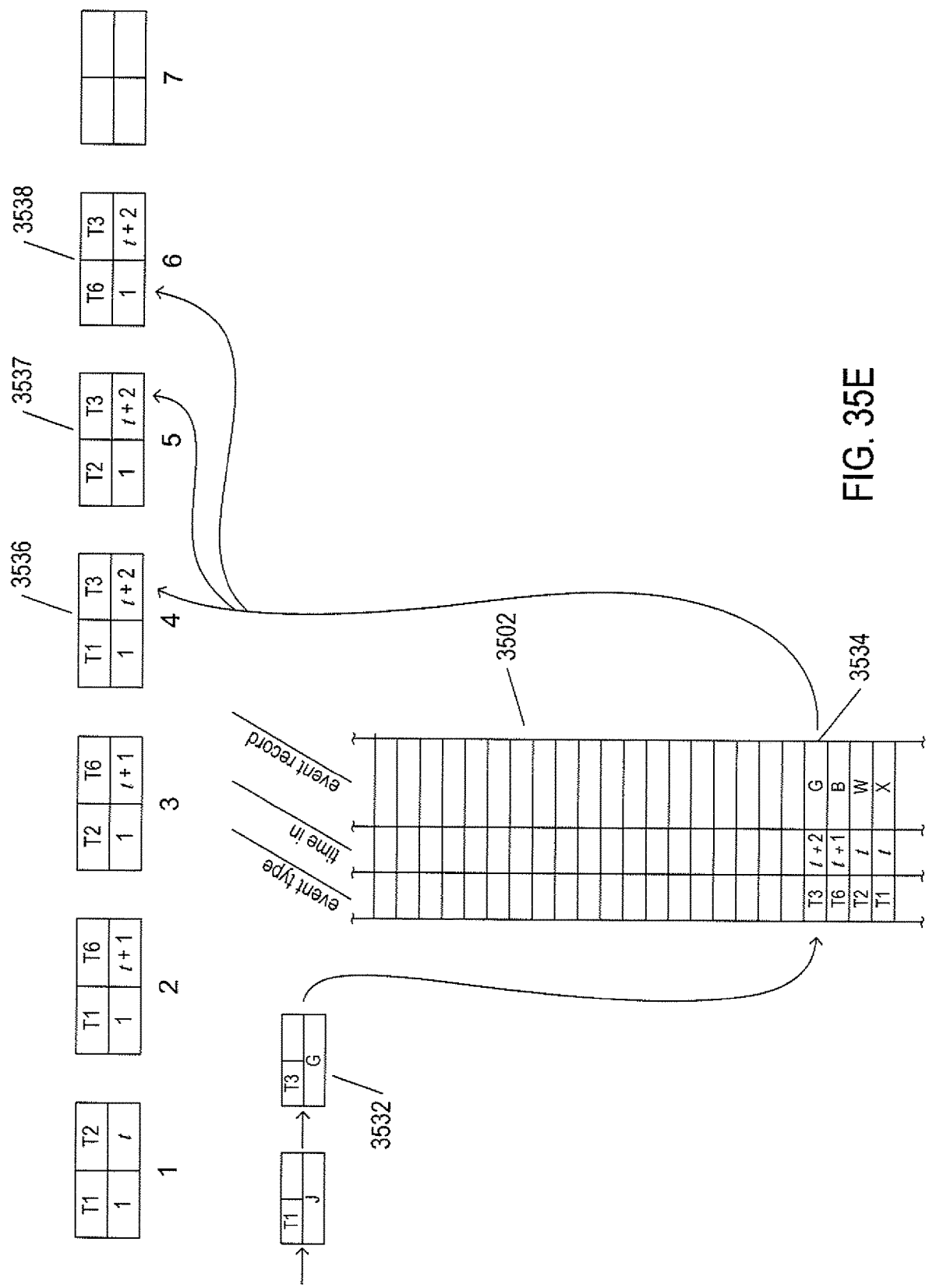

FIG. 35E illustrates processing of yet another event record received in the event-record stream. This next event record 3532 is stored in slot 3534 of the memory buffer 3502. Because the time span [t, t+2] is within a window of time designated for event-message-type co-occurrences, three additional counters 3536-3538 are initialized to count co-occurrences of the event-message types "T1" and "T3," "T2" and "T3," and "T6" and "T3."

Figure 35F:
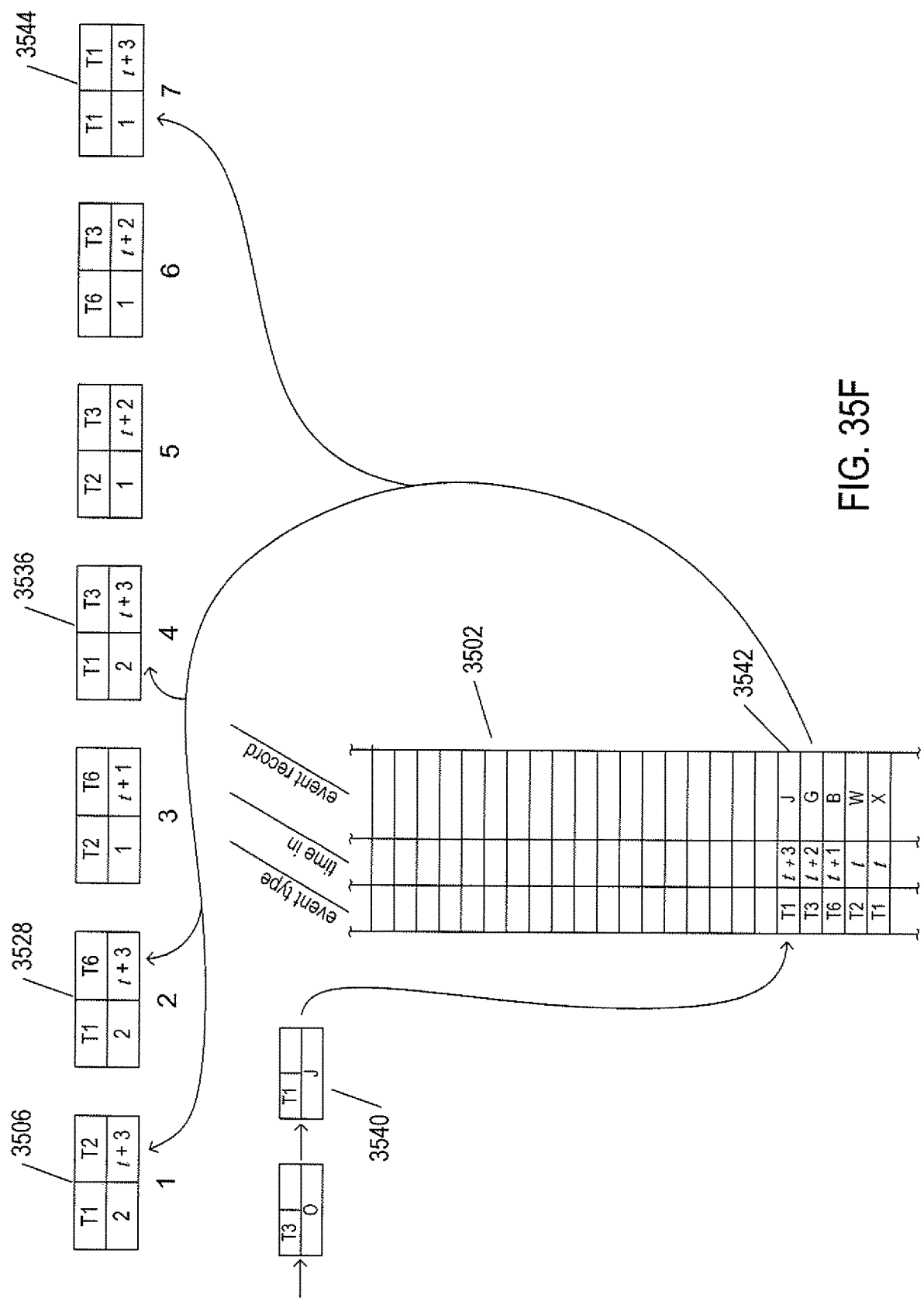

In FIG. 35F, yet another event record 3540 is received and processed. This event record is stored in slot 3542 in memory buffer 3502. The time span [t, t+3] is within a specified time window for event-message-type co-occurrence, and therefore, since event record 3540 has type "T1," counters 3506, 3528, and 3536 are updated and an additional counter 3544 is initialized to count co-occurrences of event records with type "T1." Note that the update operations have updated the most-recent access times of counters 3506, 3528, and 3536 to t+3. Counter 3506 thus reflects the fact that two co-occurrences of event-message types "T1" and "T2" have now occurred, the most recent at time t+3.

Figure 35G:
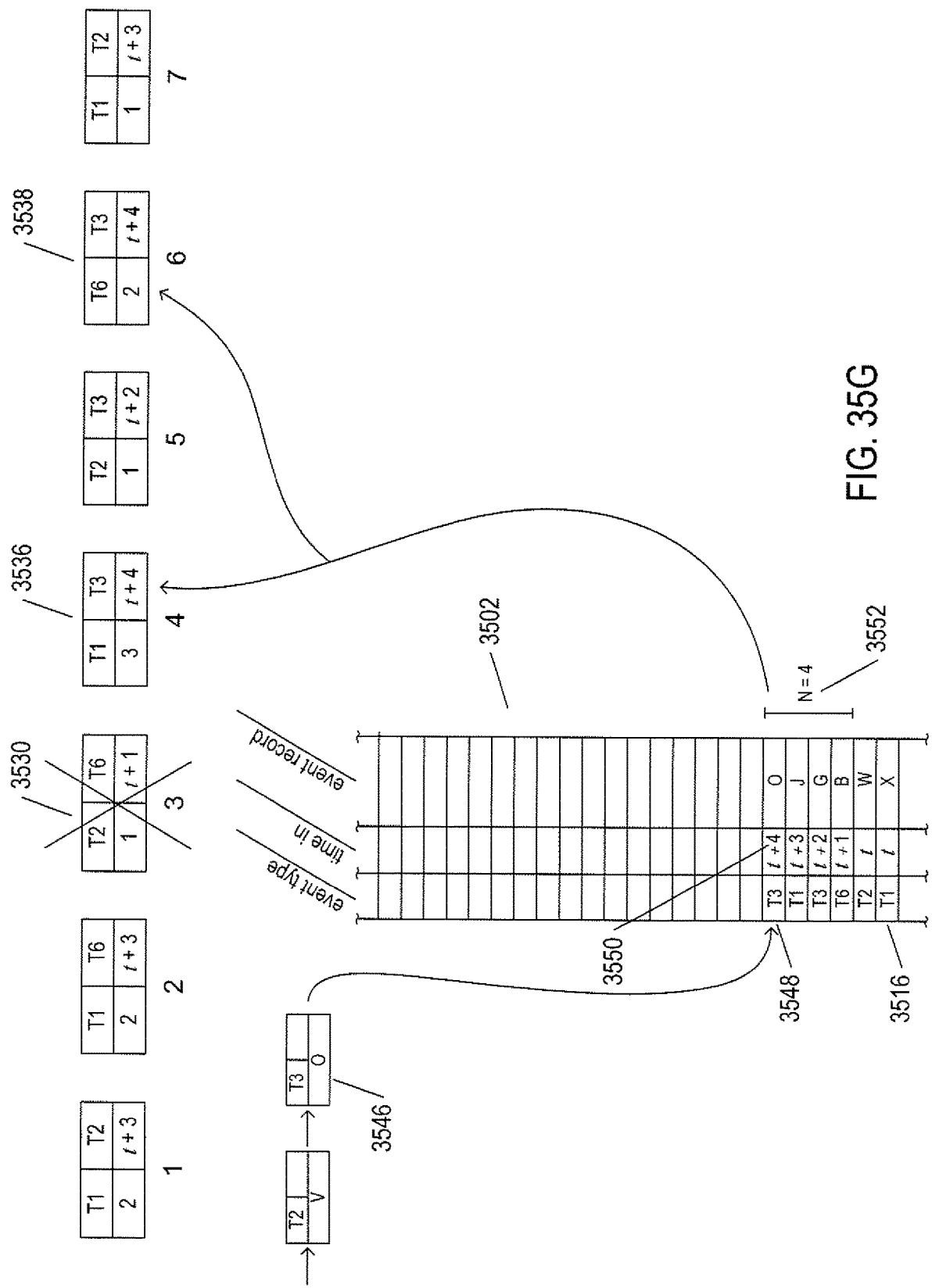
Figure 35H:
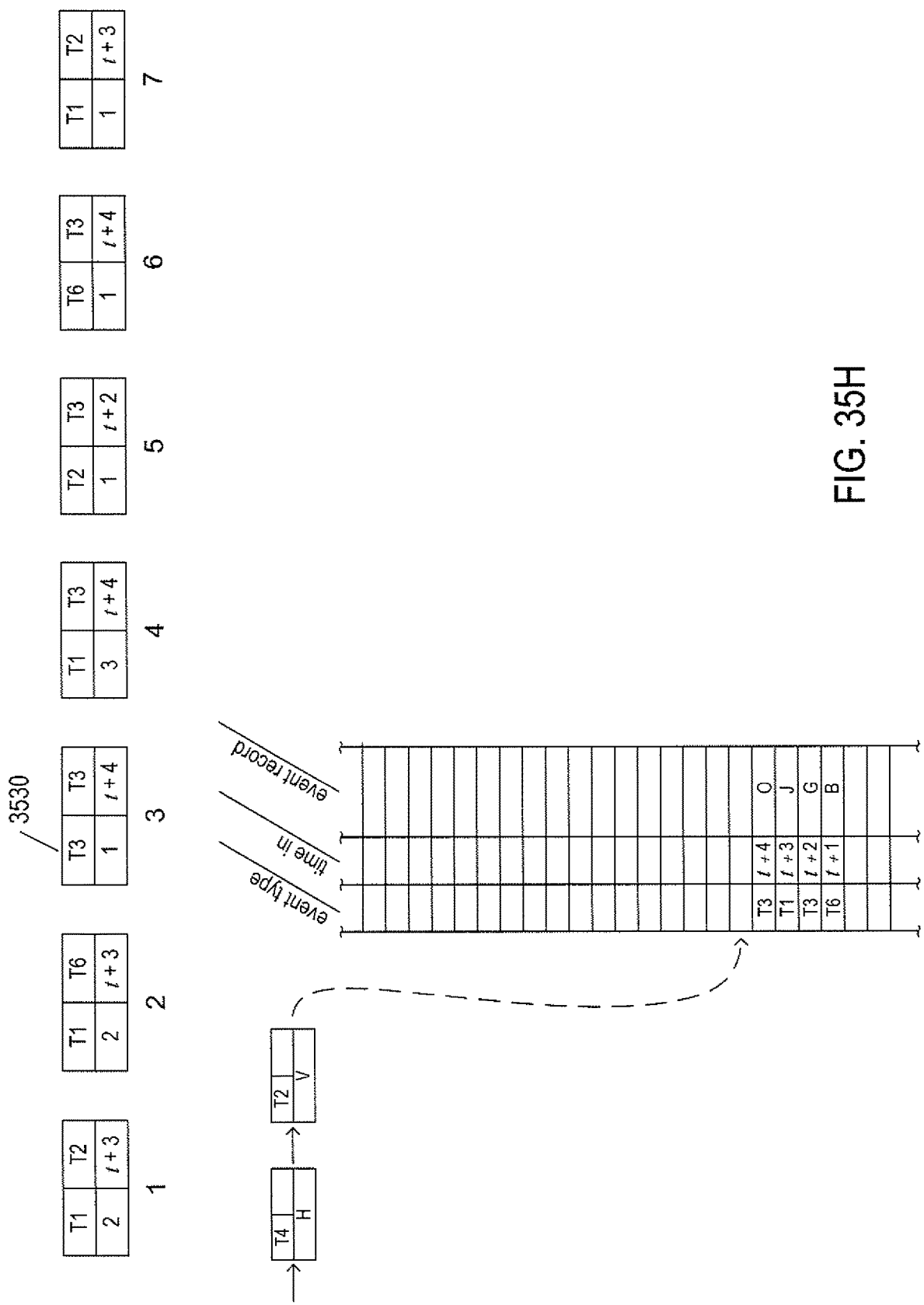

FIG. 35G illustrates processing of an additional event record. The newly arrived event record 3546 is stored in slot 3548 of the memory buffer 3502. The newly arrived event record has type "T3," and thus counters 3536 and 3538 are updated. However, the time of arrival of the new event record 3546 is t+4 3550, and the time span [t, t+4] exceeds the window of occurrence 3552. Thus, counter 3536 is incremented only by one, to reflect the co-occurrence of the newly arrived event record with the preceding event record, but not twice to include the co-occurrence with the event record stored in slot 3516, since it is outside the co-occurrence time window 3552. This time window spans only four time units. Note that the time window can be thought of as sliding upward as new event records are placed into memory buffer 3502, with the time window extending downward from the most-recently stored event. Because there are two occurrences of event-message type "T3" within the time window 3552 in the memory buffer 3502, a counter that counts co-occurrence of event-message type "T3" with itself needs to be incremented. However, there is no such counter and there are no free counters to initialize. Therefore, the contents of the least recently accessed counter 3530 are discarded and, as shown in FIG. 35H, counter 3530 is reinitialized to count co-occurrence of the event "T3" with itself.

To summarize FIGS. 35A-H, as event records are produced by event-message processing, described in previous subsections, they are temporarily stored in a memory buffer that allows each event record to be considered with respect to preceding and following event records to count co-occurrences of event-message types. A sliding time window for co-occurrence is used, as discussed above with reference to time window 3552 in FIG. 35G. A number of counters are employed to count event-message-type co-occurrences, but the number of counters is generally less than the number of possible event-message-type pairs. Therefore, counters that have not been accessed for long periods of time are discarded and reinitialized to count newly detected event-message-type co-occurrences.

FIGS. 36A-J illustrate use of counters, as described above with reference to FIGS. 35A-H, by an event-message processing system, to record indications of event-message-type co-occurrences in time and to use the indications of co-occurrences to discover related event-message types and candidate transactions.

Figure 36A:
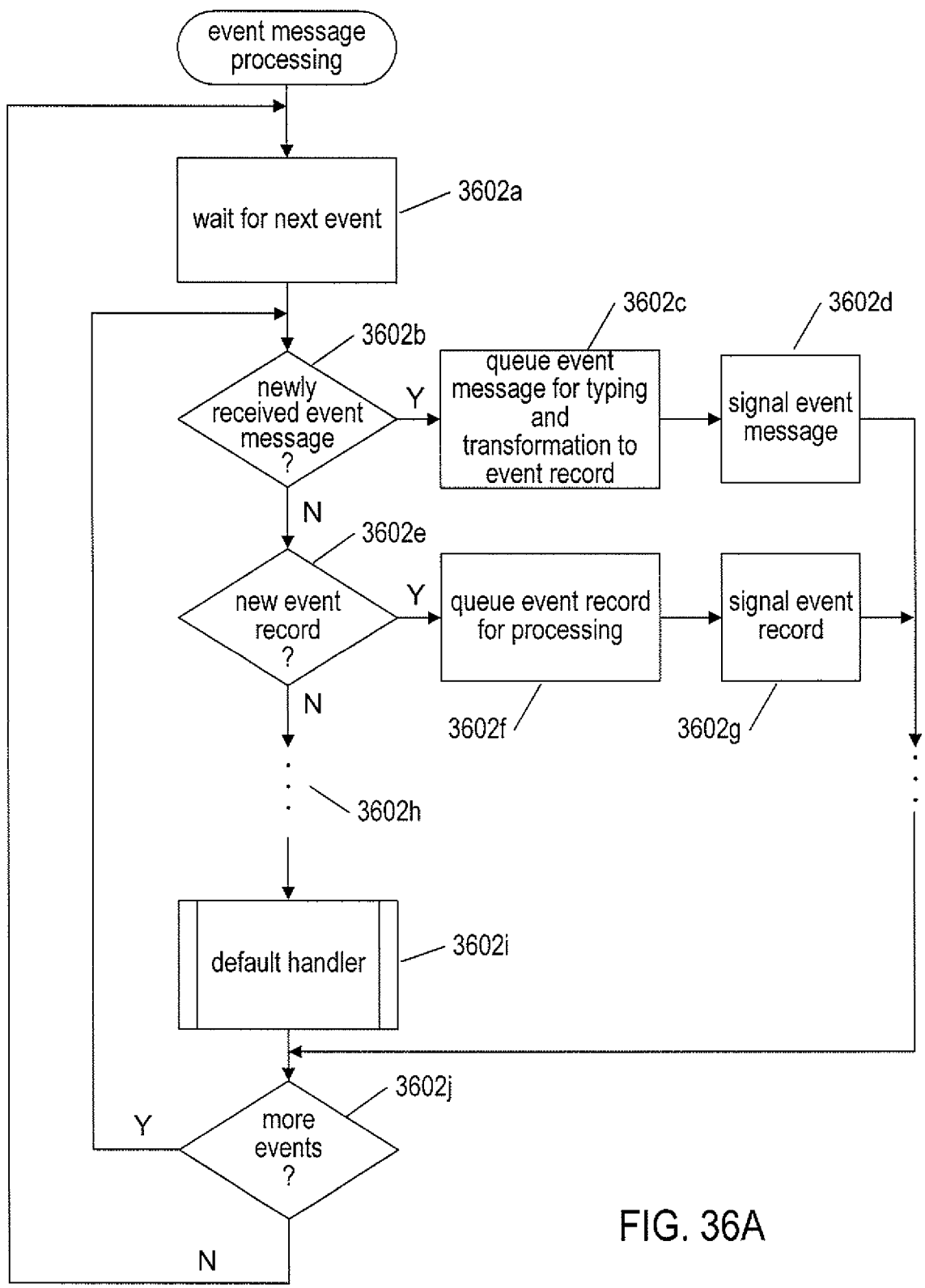
FIGS. 36A-J illustrate use of counters, as described above with reference to FIGS. 35A-H, by an event-message processing system, to record indications of event-message-type co-occurrences in time and to use the indications of co-occurrences to discover related event-message types and candidate transactions.

FIG. 36A provides a control-flow diagram for an event-message-processing system. The event-message-processing system executes a continuous event loop illustrated in FIG. 36A. In step 3602a, the event-messaging-processing subsystem waits for a next event to occur. When the next-occurring event is a reception of an event message, as determined in step 3602b, the received event message is queued for typing and transformation to an event record, in step 3602c, and an event-message signal is generated, in step 3602d, to alert an asynchronous event-message-processing subsystem to process the newly received event message. When the next-occurring event is generation of a new event record, as determined in step 3602e, where the newly generated event record is generated by the event-message-processing subsystem signaled in step 3602d, the event record is queued for event-record processing in step 3602f and an event-record processing subsystem is signaled, in step 3602g, to again begin processing event records. Ellipses 3602h indicate that other types of events are processed in the event loop. A default event handler 3602i handles any events not handled by specific event detection and handling, as shown for newly received event messages and new event records. When there are more events queued for handling, as determined in step 3602j, control returns to step 3602b. Otherwise, control returns to step 3602a, where the event-message-processing subsystem waits for a next event to occur.

Figure 36B:
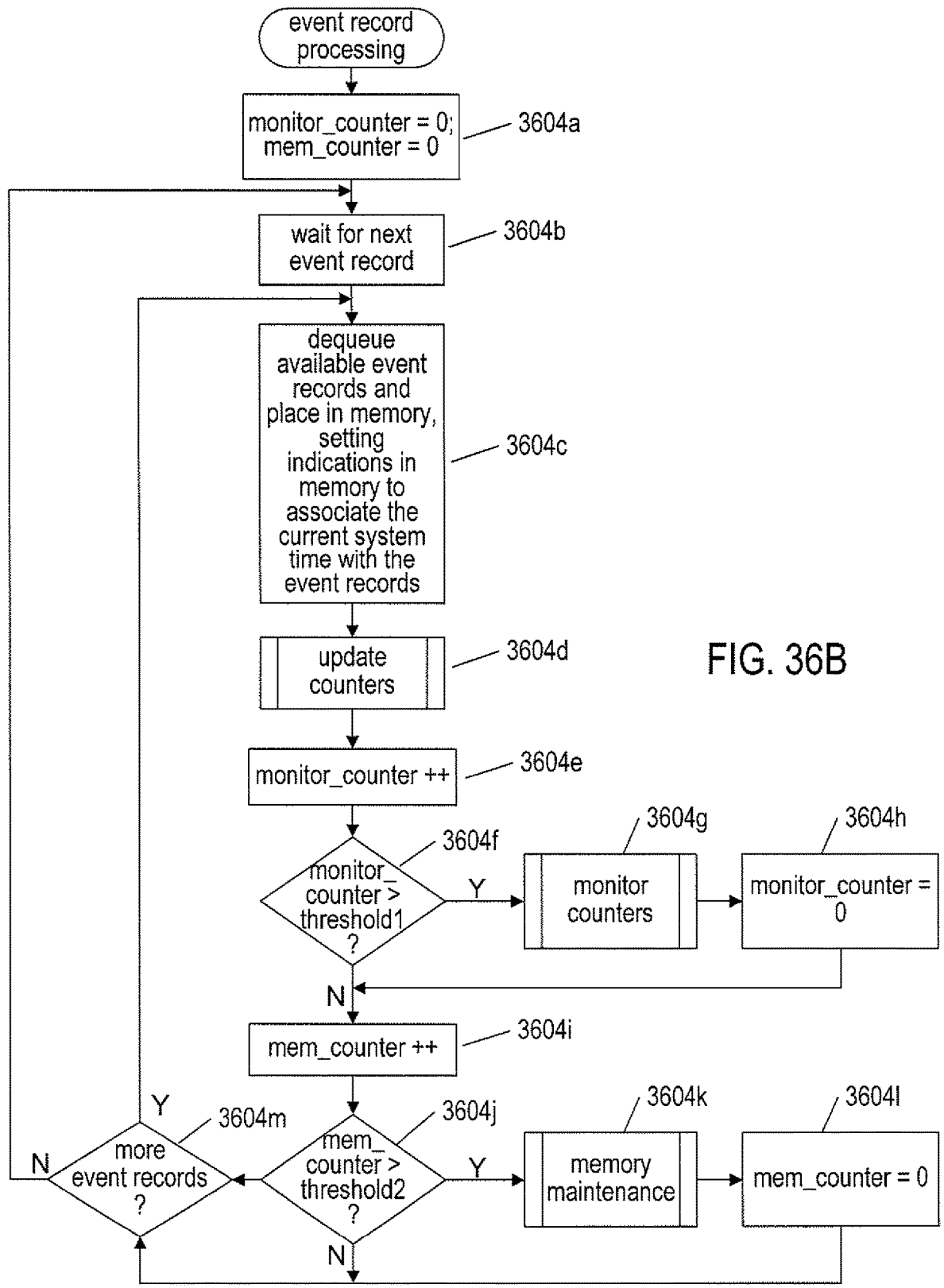

FIG. 36B provides a control-flow diagram for an event loop that implements the event-record-processing subsystem signaled in step 3602g in FIG. 36A. In step 3604a, two local variables monitor_counter and mem_counter are initialized to 0. In step 3604b, the event-record-processing-subsystem event loop waits for a next event-record-generation event. When a next event record has been generated, the event-record-processing subsystem dequeues, in step 3604c, all event records from an input queue and places the events in a memory buffer, such as the memory buffer 3502 shown in FIG. 35A. Each event record placed in memory is associated with an indication of the time at which the event record was received. In step 3606d, a routine "update counters" is called to update any event-message-type-co-occurrence counters, as discussed above with reference to FIGS. 36A-H. In step 3604e, the local variable monitor_counter is incremented. When the contents of the variable monitor_counter exceed the value threshold1, as determined in step 3604f, a routine "monitor counters" is called. in step 3604g, after which the local variable monitor_counter is reset to 0, in step 3604h. In step 3604i, the local variable mem_counter is incremented. When the value stored in the local variable mem_counter exceeds the value threshold2, as determined in step 3604j, the routine "memory maintenance" is called, in step 3604k, following which the local variable mem_counter is reinitialized to 0 in step 3604l. When there are more event records available for dequeuing and processing, as determined in step 3604m, control returns to step 3604c. Otherwise, control returns to step 3604b, where the event-record-processing subsystem waits for a next event-record-generation event.

Figure 36C:
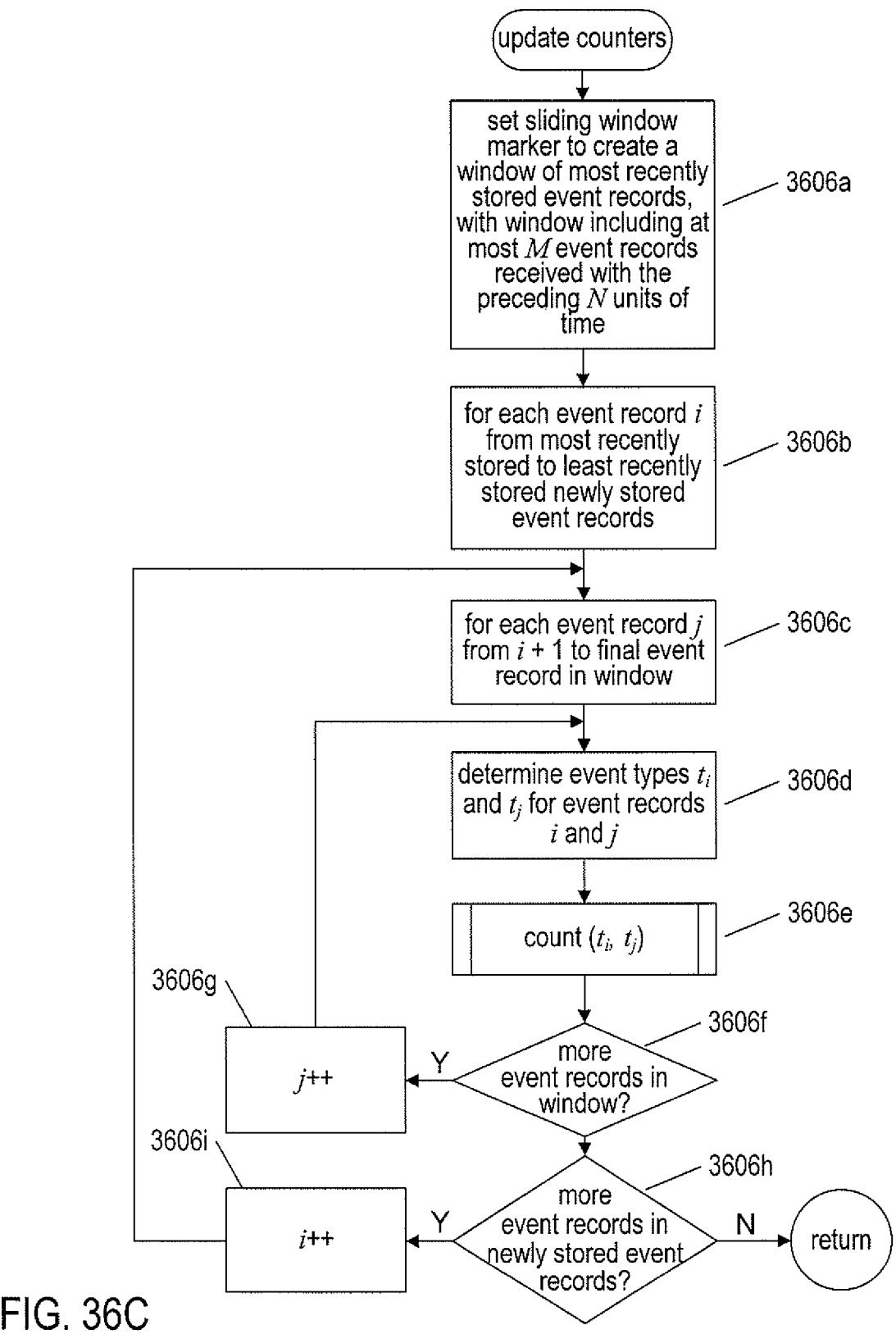

FIG. 36C provides a control-flow diagram for the routine "update counters," called in step 3606c in FIG. 36B. In step 3606a, the sliding window spanning the most-recently stored event record downward through less-recently stored event records is set to include at most M event records within a time window of N time units. Thus, the window within which a stored event record is compared to previously stored event records includes no more than M event records and includes only event records associated with times within a time span of N time units stretching back from the time associated with the most-recently stored event record. The total number of event records that are considered for co-occurrence with any particular event record is thus 2M−2 and the total time span within which event records may co-occur with the particular event record is 2N. Then, in the nested for-loop of steps 3606b-3606i, event-message-type co-occurrences are detected and counted. The outer for-loop of steps 3606b-3606i considers each of the newly received and stored event records dequeued from the input queue in step 3604c of FIG. 36B. The inner for-loop of steps 3606c-3606g considers all the event records within the sliding time window below the event record currently considered by the outer for-loop of steps 3606b-3606i. Each detected co-occurrence of event-message types is counted by a call to the routine "count," in step 3606e. In this implementation, it is assumed that event messages are received frequently, so that a single sliding window can be established in step 3606a for all of the event records dequeued in step 3604c of FIG. 36B. Were that not the case, then step 3606a would follow step 3606b to establish a sliding window for each considered newly stored event record.

Figure 36D:
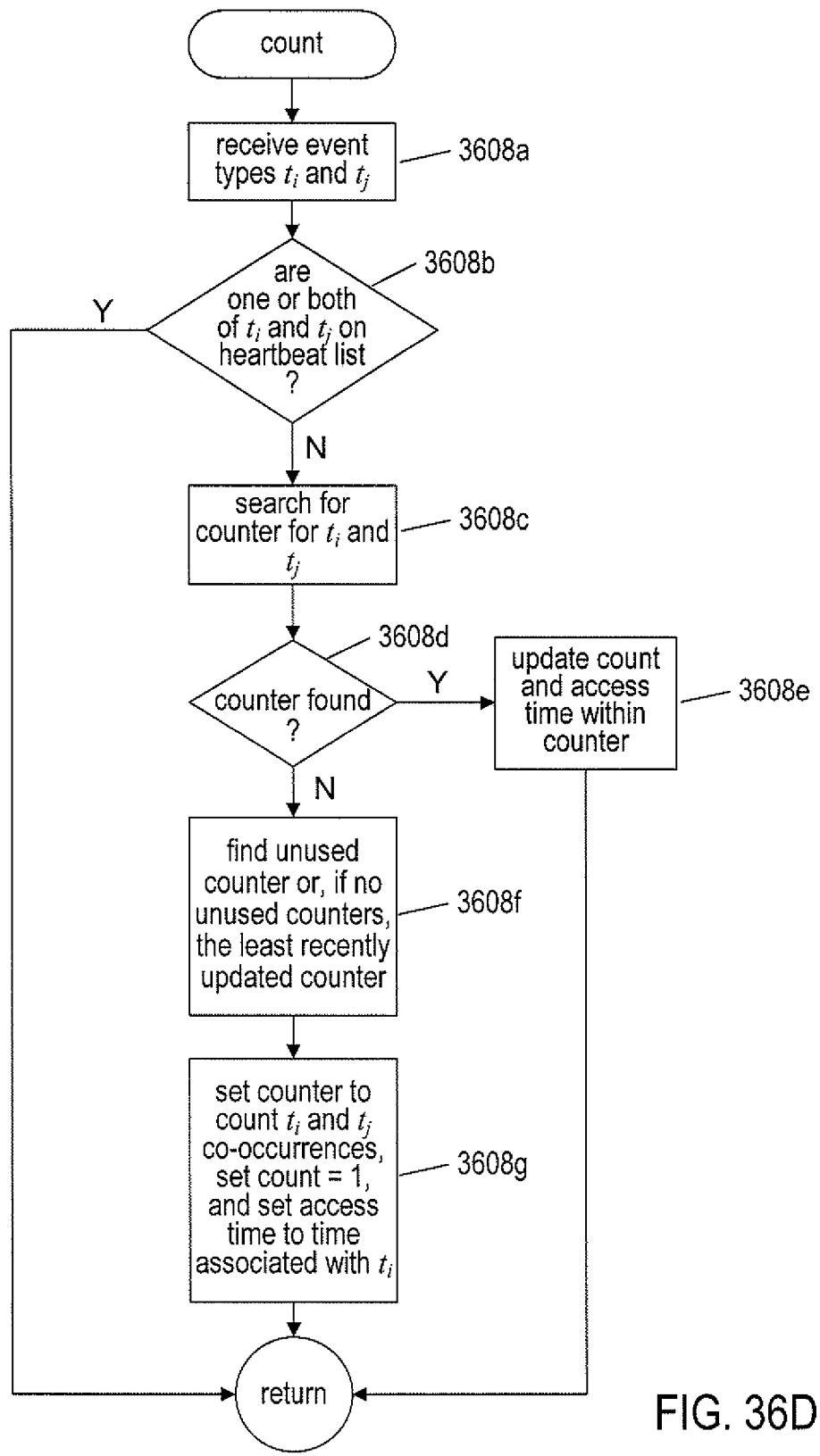

FIG. 36D provides a control-flow diagram for the routine "count," called in step 3606e of FIG. 36C. In step 3608a, the routine "count" receives two event-message types $t_i$ and $t_j$. When one or both of $t_i$ and $t_j$ are on a heartbeat list, as determined in step 3608b, then no further action is taken by the routine "count." The heartbeat list is a global list containing event-message types that are deemed to be types of heartbeat event records that are periodically generated and received by the event-record-processing subsystem. Because their co-occurrence with other event-message types is generally coincidental, they are not considered candidates for inclusion in transactions. Otherwise, in step 3608c, the routine "count" searches for a counter that counts co-occurrences of the event-message types $t_i$ and $t_j$. When such a counter is found, as determined in step 3608d, the count and access time within the counter are updated, in step 3608e, as discussed above with reference to FIGS. 35A-H. Otherwise, an unused counter or, if there are no unused counters, the least-recently accessed counter is selected, in step 3608f and then initialized, in step 3608g, to count co-occurrences of events $t_i$ and $t_j$, as also discussed above with reference to FIGS. 35A-H.

Figure 36E:
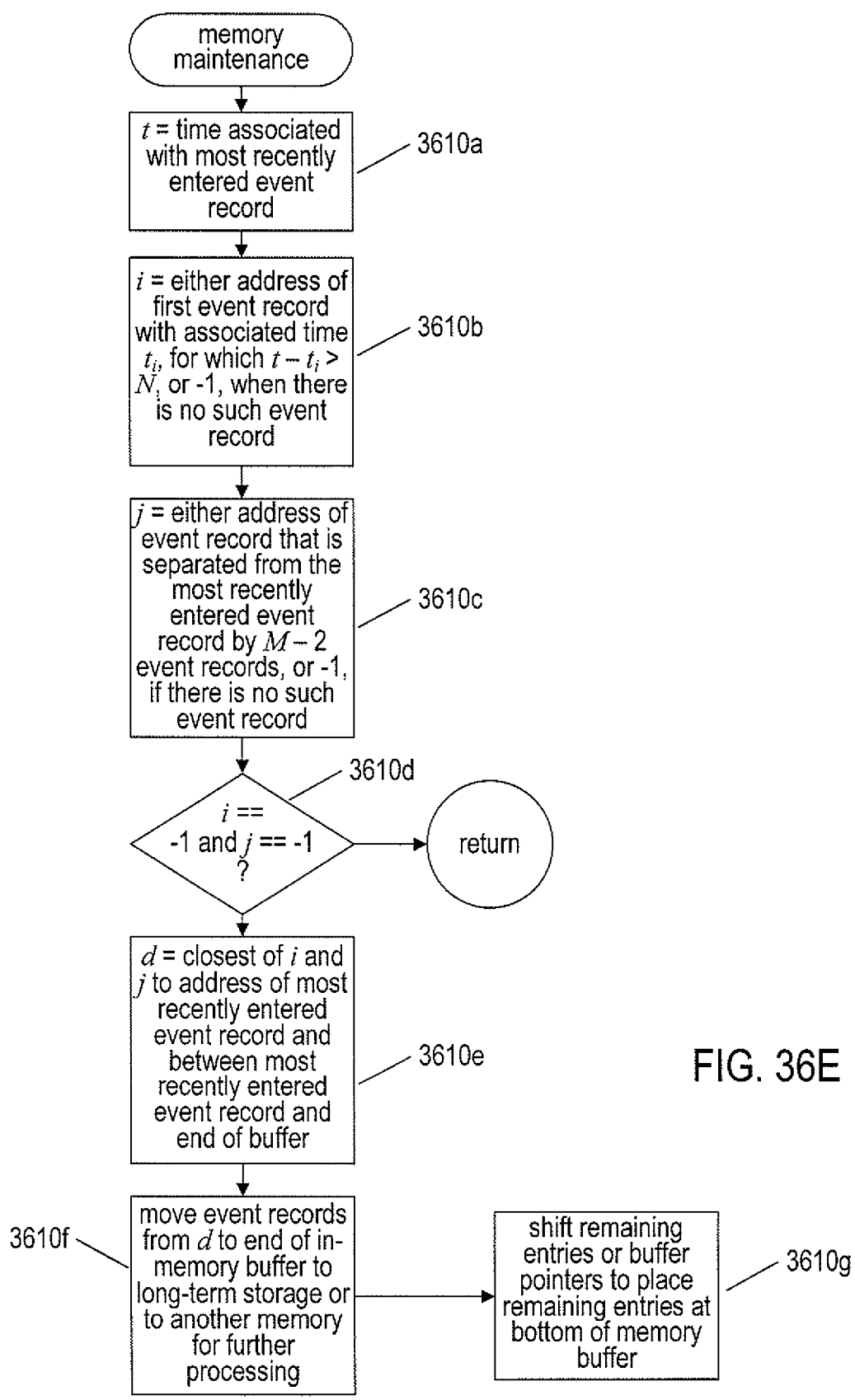

FIG. 36E provides a control-flow diagram for the routine "memory maintenance," called in step 3604k of FIG. 36B. In step 3610a, the variable t is set to the time associated with the event record most recently entered into the memory buffer. In step 3610b, the local variable i is set to be the address of, or reference, the first event record that is associated with a time $t_i$ that is outside the time window of N time events, or set to −1 when there is no such event record. In step 3610c, the local variable j is set to the address of the event record, or to reference the event record, that is separated from the most-recently received event record by M−2 event records, or set to −1 when there is no such event record. When both i and j have the value −1, as determined in step 3610d, then the memory-maintenance routine returns. Otherwise, the local variable d is set to either i or j, in step 3610e, to mark the first event record below the time window that descends from the most-recently stored event record. The event records that include d and previously stored event records are then moved to long-storage memory or queued for further processing, in step 3610f, and the event records remaining in the memory buffer are shifted downward to the bottom of the memory buffer in order to provide space for newly received event records, in step 3610g.

Figure 36F:
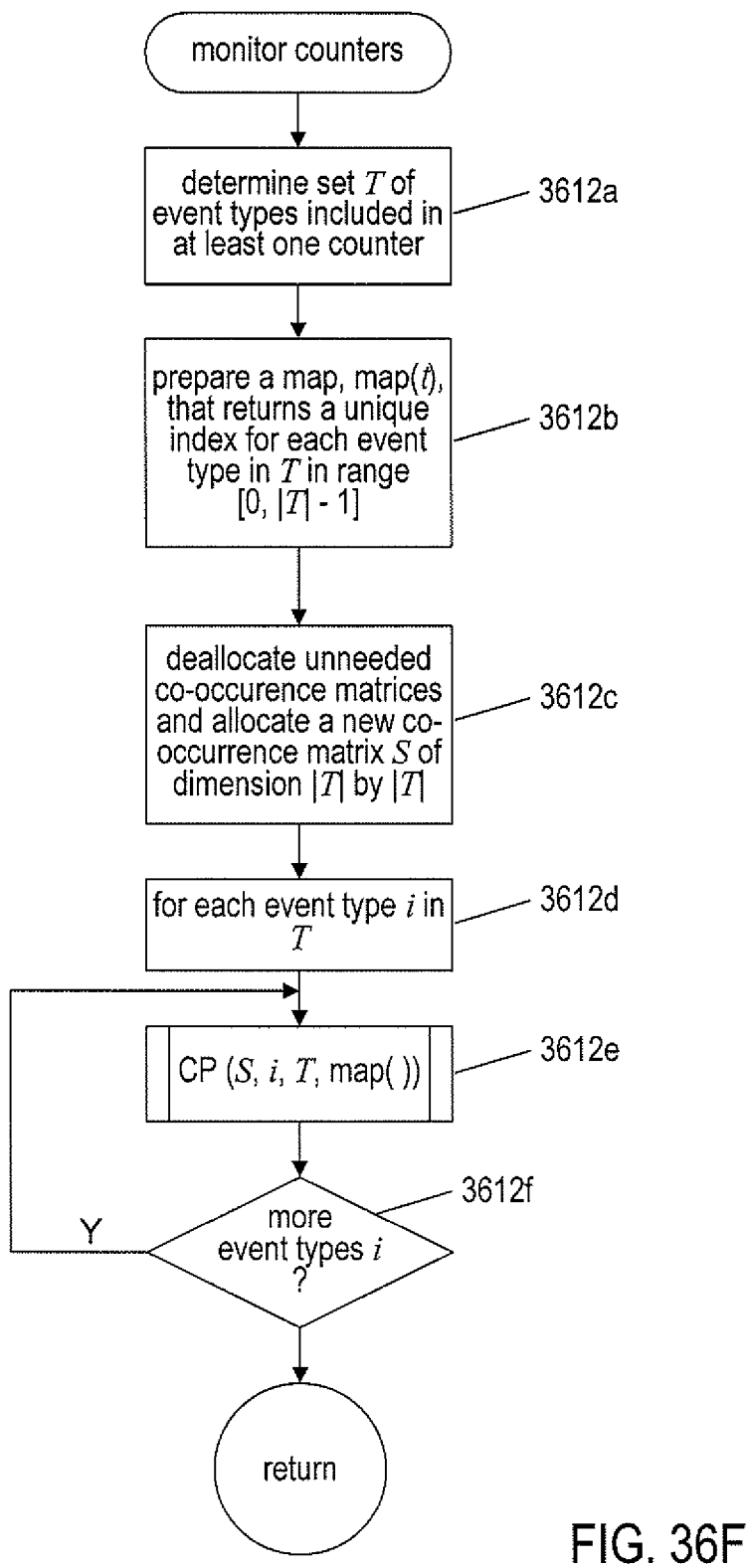

FIG. 36F provides a control-flow diagram for the routine "monitor counters," called in step 3604g of FIG. 36B. In step 3612a, the routine "monitor counters" determines a set T of event-message types that are included in at least one counter. In step 3612b, a map is prepared for mapping event-message types into a monotonically increasing range of integers that are used as indexes into a matrix. In step 3612c, previously allocated but no longer needed co-occurrence matrices are de-allocated and a new co-occurrence matrix S is allocated with dimensions |T| by |T|, where |T| represents the cardinality of the set T. Then, in the for-loop of steps 3612d-3612f, the routine "CP" is called, for each event-message type i in T in order to detect and remove heartbeat event-message types.

Figure 36G:
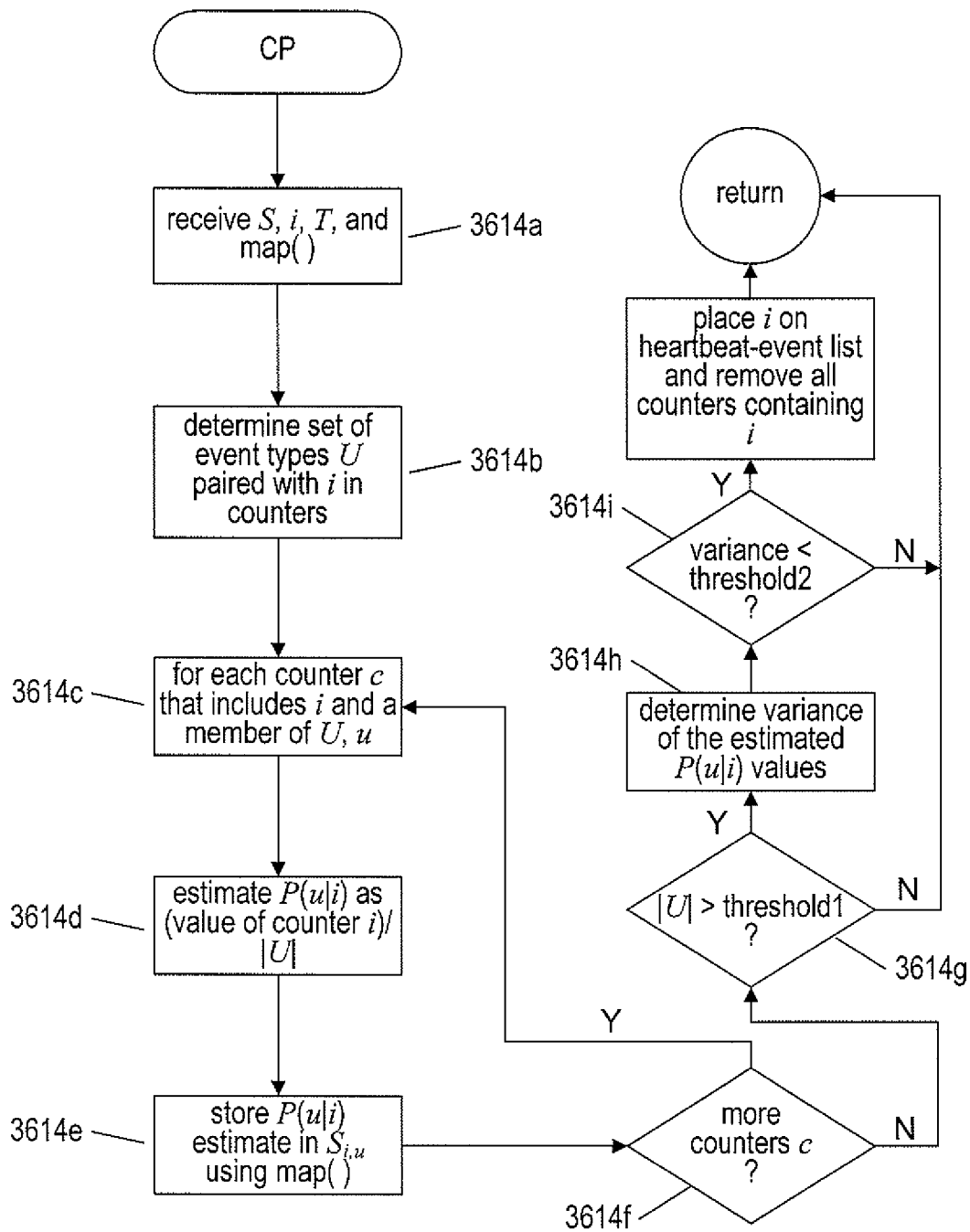

FIG. 36G provides a control-flow diagram for the routine "CP," called in step 3612e in FIG. 36F. In step 3614a, the routine "CP" receives the co-occurrence matrix S, in event-message type i, and the map generated in step 3612b of FIG. 36F. In step 3614b, the routine "CP" determines the set of event-message types U, each of which is paired with event-message type i in one of the counters. In the for-loop of steps 3614c-3614f, each counter c that counts co-occurrences of the event-message type i and one of the members of U is considered. In step 3614d, an estimate of the conditional probability of the occurrence of u given occurrence of event-message type i is computed based on the counter value for the currently considered counter c. This estimated conditional probability is stored in the co-occurrence matrix S in step 3614e. When the number of co-occurring event-message types, |U|, is less than or equal to a threshold value, as determined in step 3614g, then the routine "CP" returns, having computed the co-occurrence matrix values for event-message type i. Otherwise, in step 3614h, a variance of the estimated conditional probability values computed in the for-loop of step 3614c-3614f is computed, in step 3614h. When the variance is less than a threshold value, as determined in step 3614i, then event-message type i is placed on the heartbeat-event list and all counters containing i are de-initialized for use for counting other event-message-type co-occurrences.

Figure 36H:
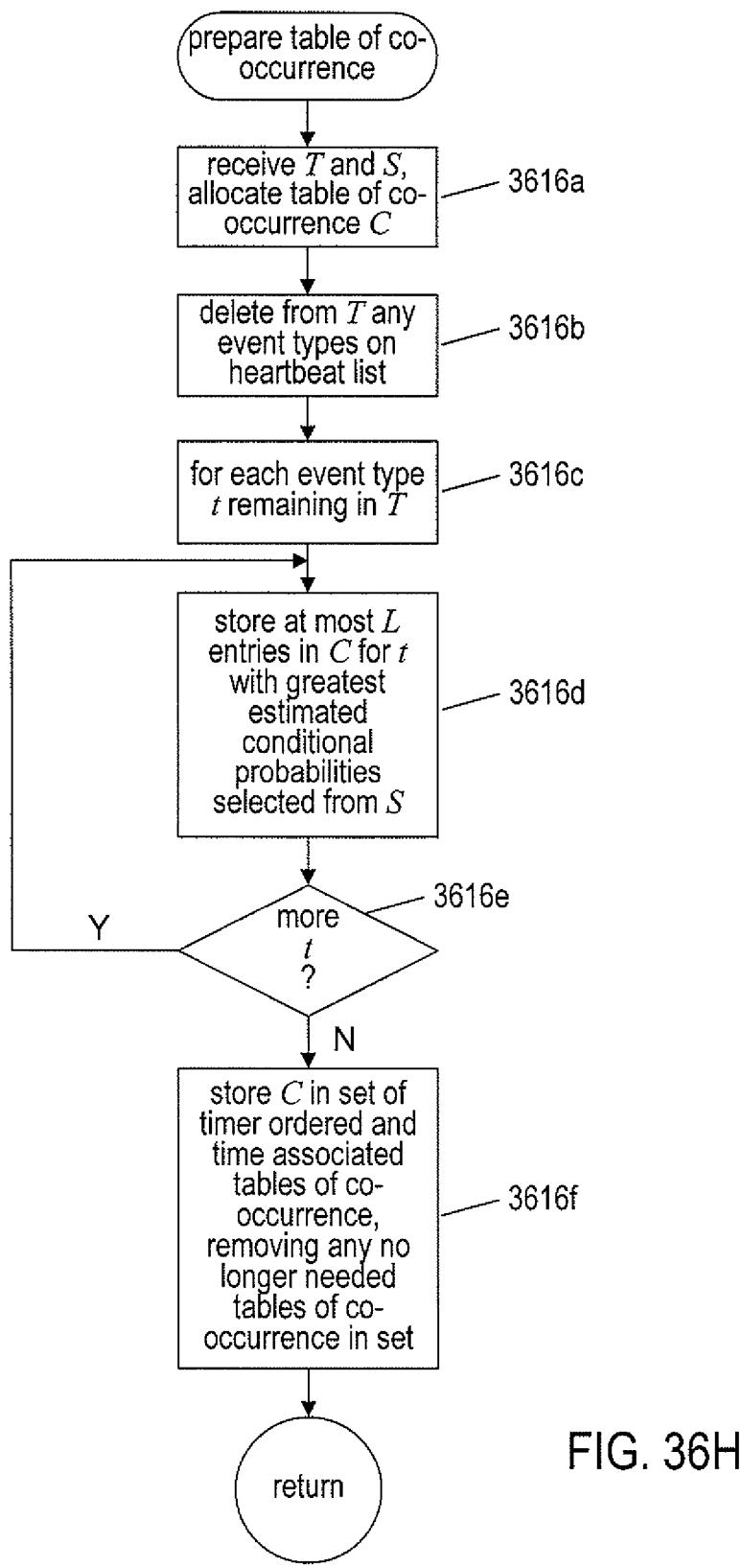

The co-occurrence matrix S, computed by the routine "monitor counters," discussed above with reference to FIG. 36F, is used to prepare a table of co-occurrence that can be used to determine related event-message types as well as to identify event-message-type transactions. FIG. 36H provides a control-flow diagram for the routine "prepare table of co-occurrence." In step 3616a, the routine receives a set of event-message types that occur in the counters T and a recent co-occurrence matrix S and allocates an empty table of co-occurrence C. In step 3616b, any event-message types on the heartbeat list are deleted from set T. In the for-loop of steps 3616c-3616e, a list of at most L entries are stored for each event-message type t with greatest estimated conditional probabilities selected from the co-occurrence matrix S. The table of co-occurrence C is then stored, in step 3616f, for further use.

Figure 36I:
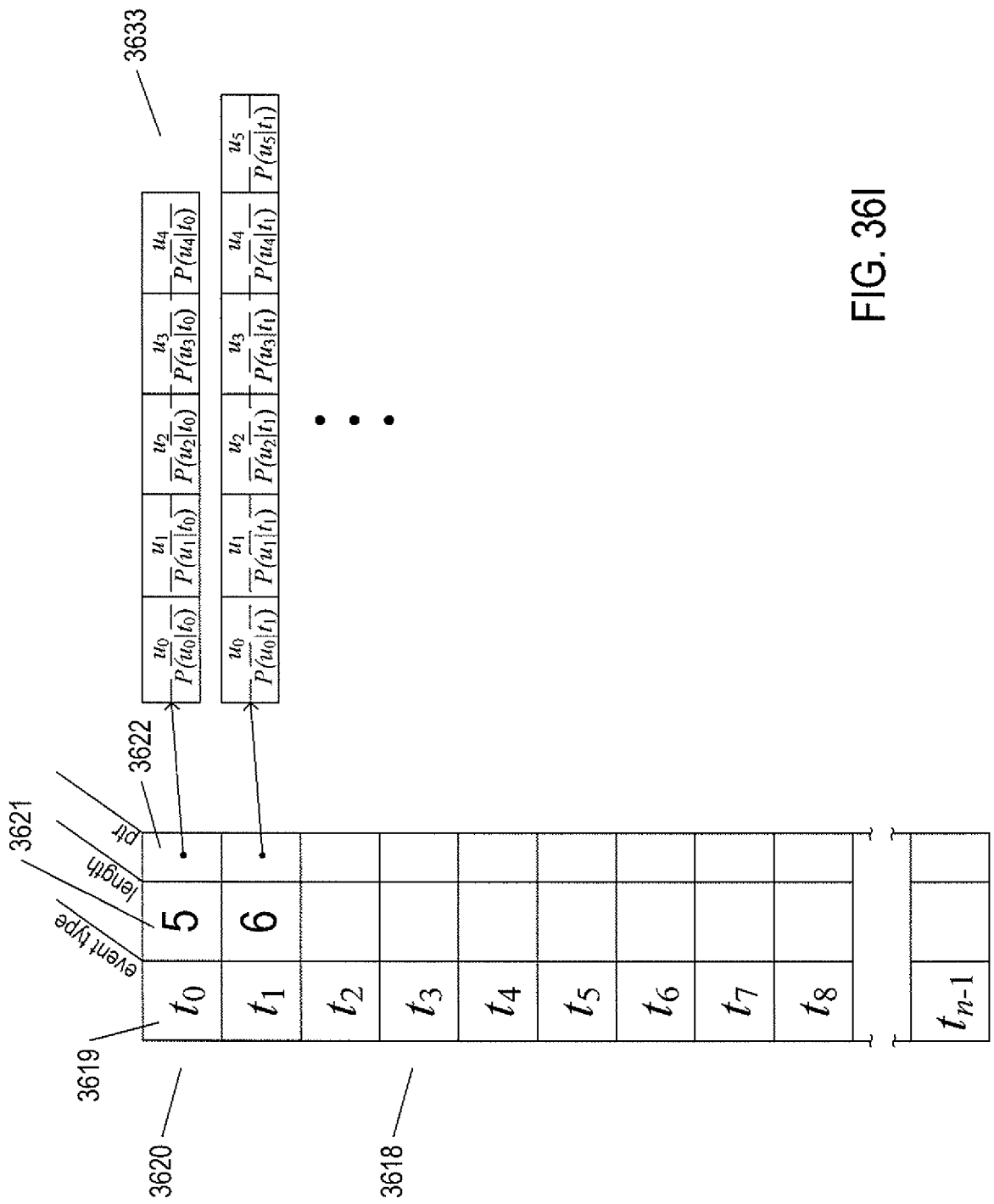
Figure 36J:
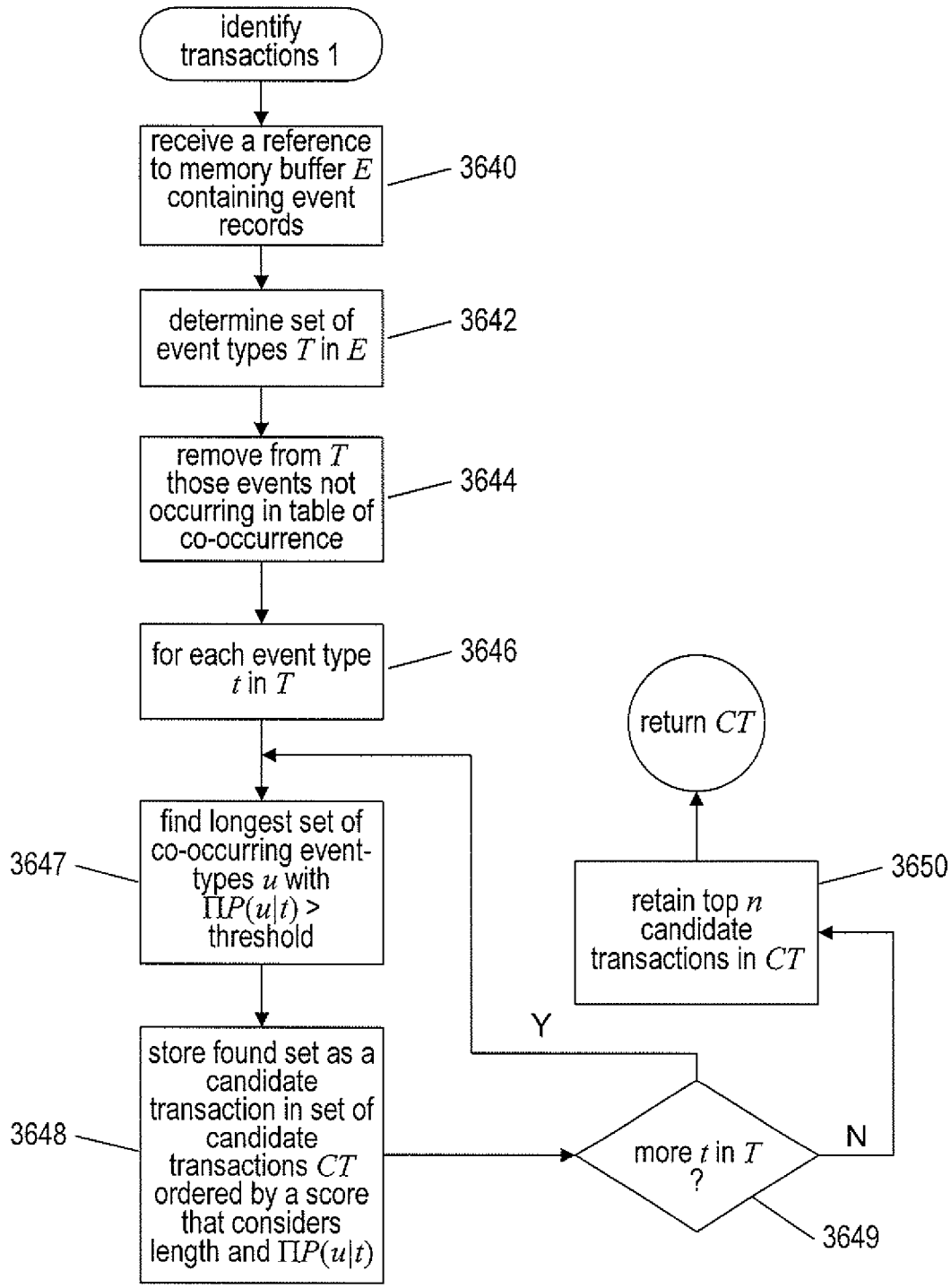

FIG. 36I illustrates a table of co-occurrence. The table of co-occurrence 3618 includes a row for each event-message type that occurs in a counter that is not a heartbeat event-message type. The event-message types are stored in the first field of each row, such as the event-message type $t_0$ 3619 in the first row 3620 of the table of co-occurrence. The second field in each row indicates the length of an array containing a list of co-occurring event-message types for the event-message type associated with the row. Thus, the second field 3621 of the first row 3620 contains the integer 5 indicating that there are five co-occurring event-message types for event-message type $t_0$. The third field in each row contains a pointer to an array containing records, each record indicating the co-occurring event-message type and the computed conditional probability for the co-occurring event-message type. The third field 3622 in row 3620 references array 3623, with five entries or records, each indicating a co-occurring event-message type and computed conditional probability. Thus, a table of co-occurrence is essentially a list of co-occurring event-message types for each of the event-message types associated with counters that are not heartbeat event-message types. As discussed below, co-occurring event-message types can be considered to be related to one another and may be considered to be candidates for transactions. FIG. 36J provides a control-flow diagram for a routine "identify transactions 1." This routine identifies event-message-type transactions from a table of co-occurrence. In step 3640, the routine "identify transactions 1" receives a reference to a memory buffer or file E containing event records. In step 3642, the routine "identify transactions 1" determines a set of event-message types t contained in the event records in E. In step 3644, event-message types are removed from the set T that are not also present in the table of co-occurrence. Then, in the for-loop of steps 3646-3649, each event-message type t remaining in the set T is considered. In step 3647, the longest set of co-occurring events in the table of co-occurrence for the currently considered event-message type t having a product of conditional probabilities greater than a threshold value is determined. This set of event-message types is stored, along with the event-message type t, as a candidate transaction in a set of candidate transactions CT. Each candidate transaction is associated with a score that considers both the length of the transaction as well as the product of the conditional probabilities of the event-message types within the transaction. The top scored candidate transactions are retained in CT, in step 3650, and returned as a set of event-message-type transactions. Below, a different method for identifying transactions is discussed.

Figure 37A:
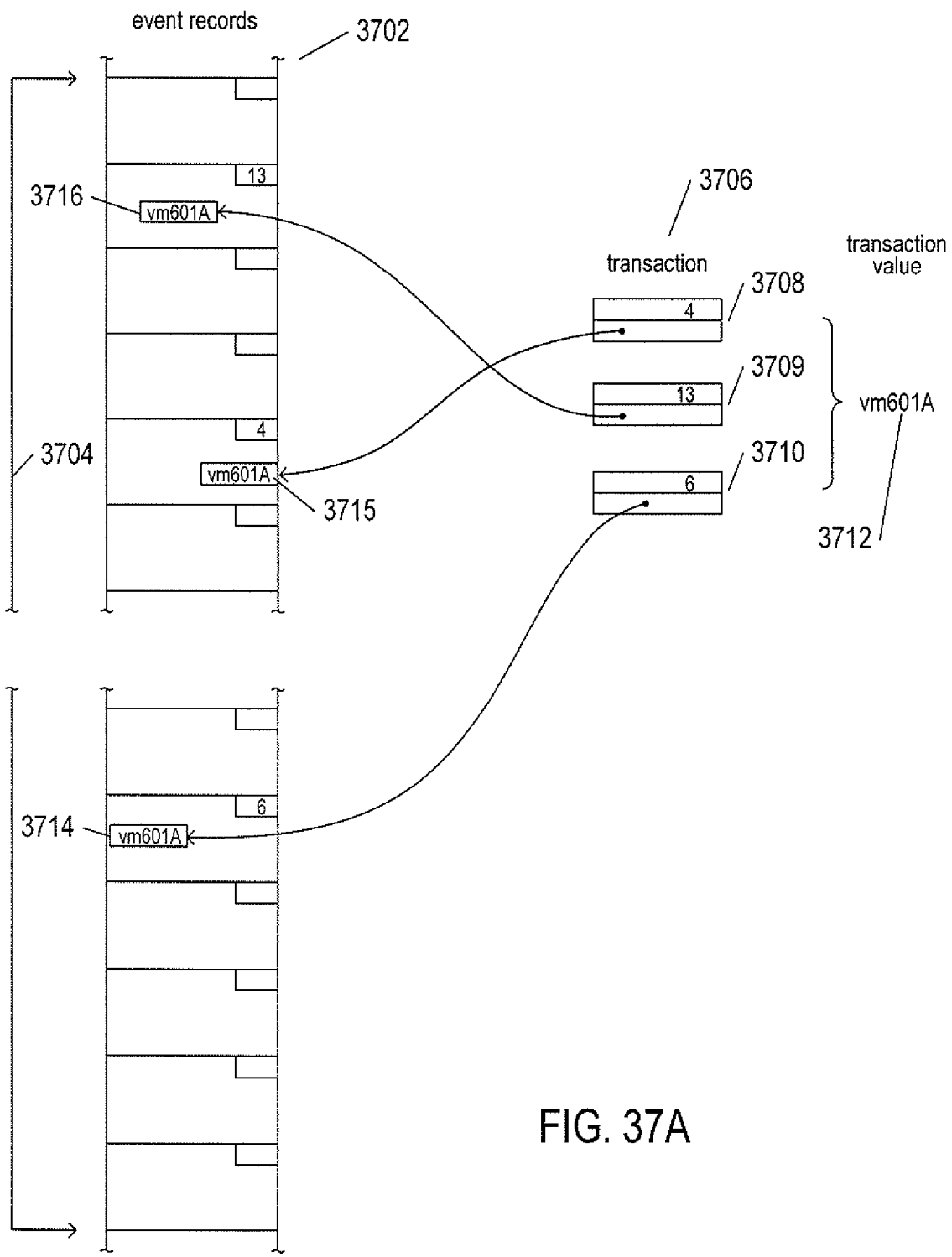
FIGS. 37A-B provide initial explanations and data-structure illustrations to facilitate discussion of flow-control diagrams provided by FIGS. 38A-38L which follow.
Figure 37B:
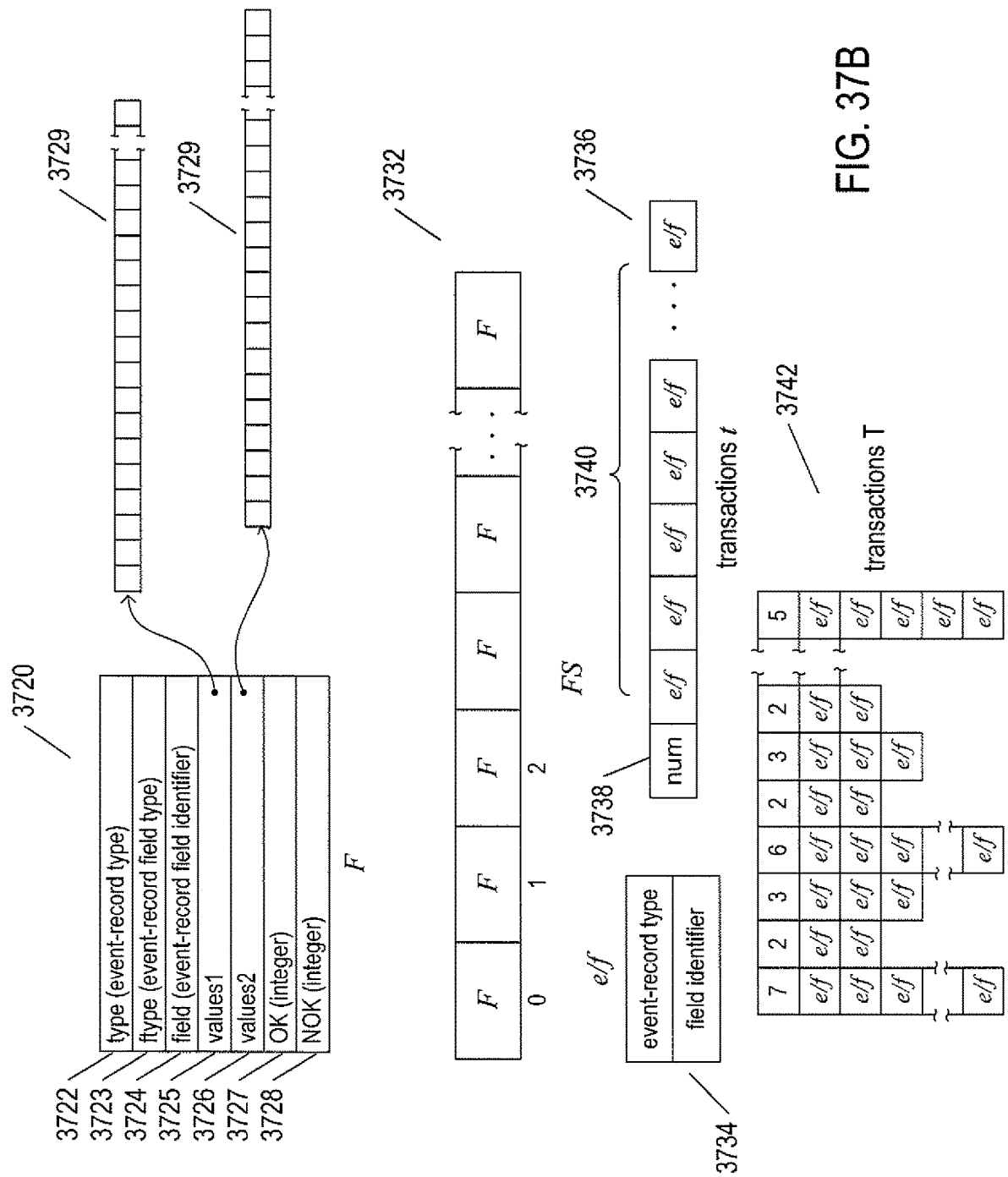

Next, a different and more precise method for identifying transactions within streams or sequences of event records is described. FIGS. 37A-B provide initial explanations and data-structure illustrations to facilitate discussion of flow-control diagrams provided by FIGS. 38A-38L which follow.

FIG. 37A shows a column of event records 3702 similar to the column of event records 3402 discussed above with reference to FIG. 34A. The event records are ordered in time and contained within a time window 3704. A transaction 3706 has been determined to include the co-occurrence of event records with event-message types 4, 13, and 6 3708-3710. In addition to the co-occurrence of event records with these types, the transaction specifies fields, within the event records of the event-message types, which contain the same value in order for an occurrence of the transaction to be detected within time window 3704. When the fields in the event records with event-message types specified by the transaction contain the same value, as they do in the example shown in FIG. 37A, then an occurrence of the transaction has been detected and the transaction can be considered to have a value 3712 equal to the common value of the specified fields 3714-3716 within the event records with the specified event-message types. Thus, this type of transaction is a set of event-message-type/field elements, each element specifying the event-message type of a record as well as a field in an event record of the event-message type. The theory behind these event-message type/field transactions is that quite often, related event records will contain a common field with a common value indicating an instruction, routine, module, or other element of the control programs within a distributed-computing system that generate the events. Alternatively, the common value in the common fields of the event records may refer to some other common source for the set of event records that co-occur, in time, repeatedly within a stream or sequence of event records and therefore constitute a transaction.

FIG. 37B shows a number of data structures used in the control-flow diagrams that follow in FIGS. 38A-L. A field node F 3720 describes or represents a particular field within a particular type of event record. The field node F 3720 includes an indication of the event-message type of the event record containing the field 3722, an indication of the data type of value stored in the field 3723, a field identifier 3724 that allows the field to be extracted from a stored event record, a first set of values 3725 and a second set of values 3726 for the field obtained by various methodologies to be discussed below, and two integer counts 3727 and 3728 that are used in the methods discussed below. Note that, in one implementation, the fields "values1" and "values2" contain references to arrays 3729 and 3730 that contain a set of values for the field described by the field node F. A field set FS 3732 is an array or list of field nodes. An event-record-type/field-identifier node 3734, or e/f node, includes an indication of an event-record type and an identifier for a field within the event record. A transaction t 3736 includes an indication of a number of e/f nodes within the transaction 3738 and an array or list of elf nodes 3740 that describe the event-record types and included fields that together comprise a transaction. A set of transactions T 3742 is an array of transactions. In FIG. 37B, the transactions are rotated into a vertical position within the array.

FIGS. 38A-L provide control-flow diagrams that describe a second method for finding transactions of the type discussed above with reference to FIG. 37A within a sequence, stream, or set of stored event records. In step 3802a, the routine "find transactions" receives a reference E to a set of stored event records. In step 3802b, the routine "find transactions" generates a list L of common event-record types. In step 3802c, the routine "find transactions" allocates a set of candidate field sets FS. The set of candidate field sets FS is discussed above with reference to 3732 in FIG. 37B. In step 3802d, the routine "find transactions" calls the routine "find identifier fields" in order to determine a set of candidate fields within event records from which to construct transactions. When the routine "find identifier fields" returns a true value, as determined in step 3802e, then, in step 3802f, a routine "identify transactions" is called to identify a set of transactions based on the identifier fields discovered by the routine "find identifier fields," called in step 3802d. Finally, the list L and the data structure FS are deallocated, in step 3802g. When the routine "find identifier fields" returns a false value, then the routine "find transactions" returns the value Ø in step 3802h. Otherwise, the routine "find transactions" returns a reference to a set of transactions in step 3802i. The set of transactions is discussed above with reference to 3742 in FIG. 37B.

Figure 38A:
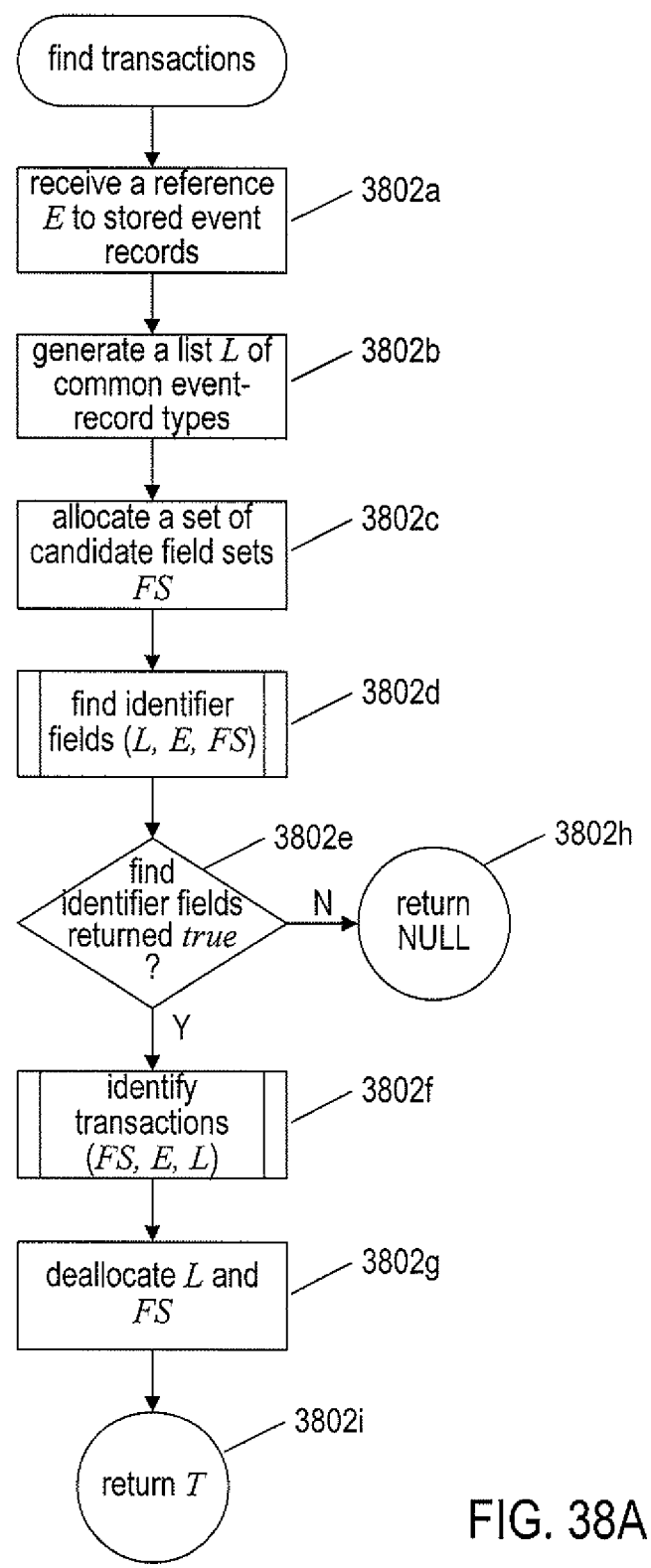
FIGS. 38A-L provide control-flow diagrams that describe a second method for finding transactions of the type discussed above with reference to FIG. 37A within a sequence, stream, or set of stored event records.
Figure 38B:
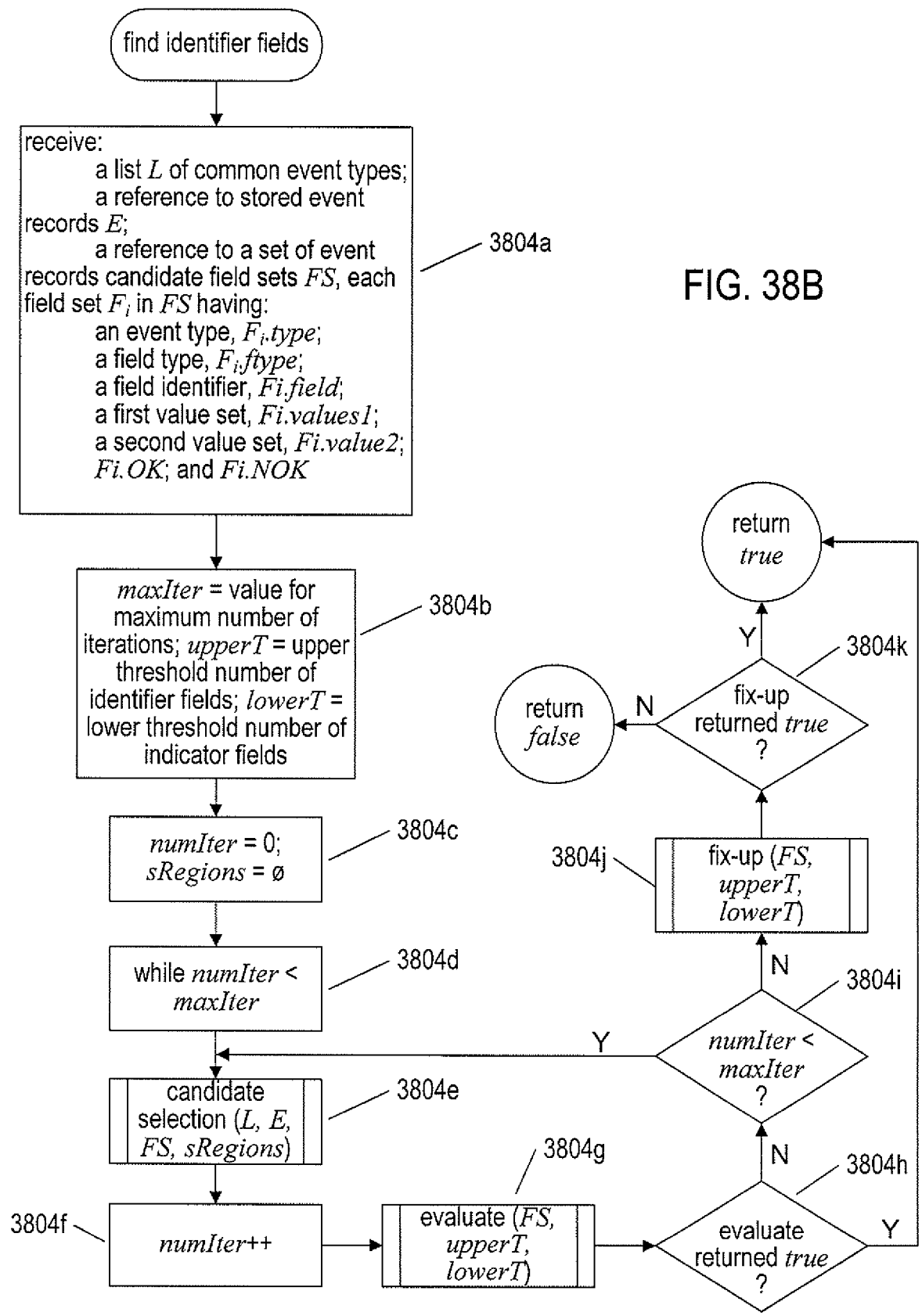

FIG. 38B provides a first control-flow diagram for the routine "find identifier fields," called in step 3802d of FIG. 38A. In step 3804a, the routine "find identifier fields" receives the list L of common event-message types, a reference E to stored event records, and the candidate field sets data structure FS. In step 3804b, the local variable maxIter is set to the maximum number of iterations for a subsequent while-loop, the local variable upperT is set to an upper threshold for the number of identifier fields determined by the routine "find identifier fields," and the local variable lowerT is set to a lower threshold for the number of identifier fields identified by the routine "find identifier fields." In step 3804c, the local variable numIter is set to 0 and the set variable sRegions is set to the Ø set. The local variable sRegions is a list of event-record windows already sampled during candidate-field selection, discussed below. In the while-loop of steps 3804d-3804i, the routine "candidate selection" is called, in step 3804e, repeatedly until the while-loop terminates. During each iteration, following the call to the routine "candidate selection" in step 3804e, the local variable numIter is incremented, in step 3804f, and then the routine "evaluate" is called in step 3804g. The routine "evaluate" determines whether the set of candidate fields FS contains a sufficient number of fields for loop termination. When this routine returns a true value, then the while-loop is exited, in step 3804h. When the local variable numIter has a value equal to maxIter, as determined in step 3804i, the while-loop is also terminated followed by a call to the routine "fix-up," in step 3804j. When this routine returns a true value, as determined in step 3804k, then the routine "find identifier fields" returns a true value. Otherwise, the routine "find identifier fields" returns the value false. The routine "fix-up" modifies the set of candidate fields FS in order to produce an acceptable set of candidate fields for transaction identification.

Figure 38C:
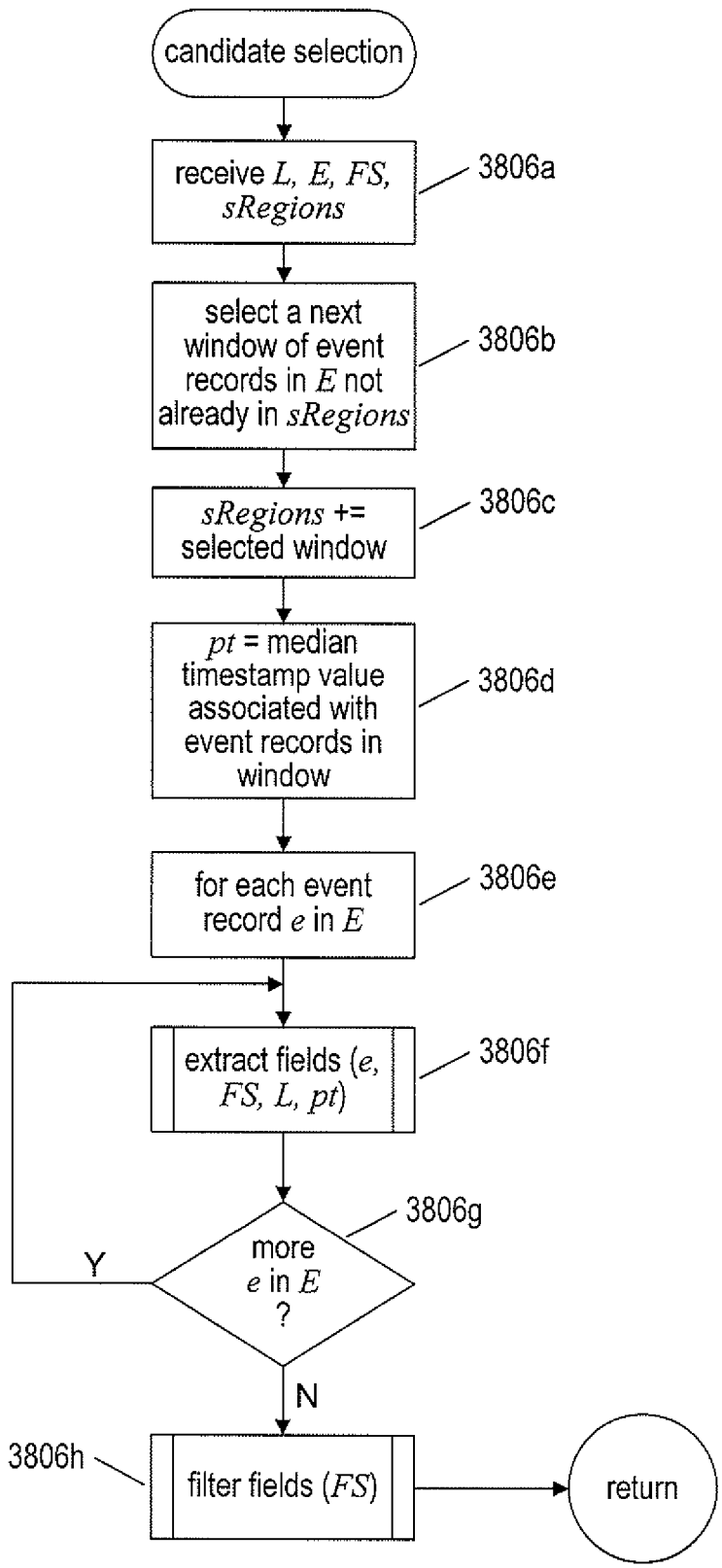

FIG. 38C provides a control-flow diagram for the routine "candidate selection," called in step 3804e of FIG. 38B. In step 3806a, the routine "candidate selection" receives the list of common event-message types L, a reference to the stored event records E, the set of candidate field sets FS, and the set sRegions. In step 3806b, the routine "candidate selection" selects a next window of event records in E that is not already a member of the set sRegions. In step 3806c, the selection window is added to the set sRegions. In step 3806d, the local variable pt is set to the median timestamp value associated with the event records in the selected window. In the for-loop of steps 3806e-g, the routine "candidate selection" iteratively calls the routine "extract fields" to place event-record fields and their values into field nodes of the FS data structure. Once the fields and field values have been extracted from the event records and the currently considered window, the routine "filter fields" is called, in step 3806h, to process the fields and field values.

Figure 38D:
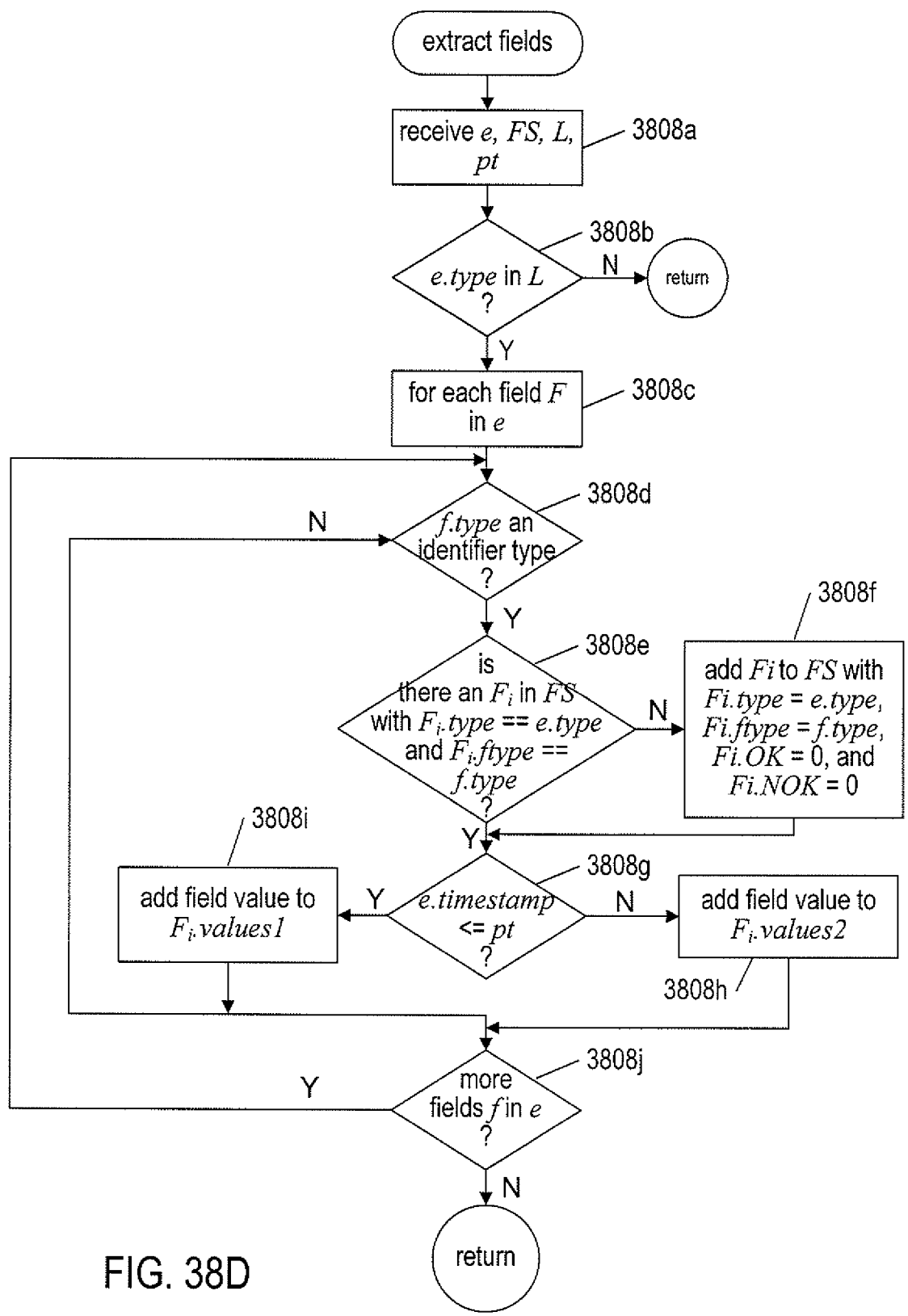

FIG. 38D provides a control-flow diagram for the routine "extract fields," called in step 3806f of FIG. 38C. In step 3808a, the routine "extract fields" receives an event record e, the FS data structure, the list of common events types L, and the median timestamp value pt. When the type of the event record is not a common event-message type, as determined in step 3808b, then the routine "extract fields" returns. Only common event-message types provide candidate identifier fields for construction of candidate transactions. In the for-loop of steps 3808c-3808j, each field in the event record e is considered. When the type of the field is a type consistent with an identifier field, or candidate field, for transactions, as determined in step 3808d, and when there is a field node within the FS data structure corresponding to the event-record type and field type, as determined in step 3808e, then the value of the field is added to either the values1 array of the field node when the timestamp of the currently considered event record is less than the median timestamp value pt, in step 3808i, and is otherwise added to the values2 array of the field node in step 3808h. When there is no node in the FS data structure corresponding to the currently considered field, then a node is added to the FS structure in step 3808f, and initialized. When, in step 3808d, the type of the currently considered field is not a type corresponding to a potential identifier field, then no further action is taken with respect to the currently considered field. Thus, for each potential candidate identifier field, the value of the field in the currently considered event record e is added to a node corresponding to the field in the FS data structure, with the value of the field added to the values1 array when the timestamp of the event record e is less than pt and otherwise is added to the values2 array. This has the effect of partitioning field values into field values in the first portion of the currently considered window and field values in the second portion of the currently considered window. The lists of field values are subsequently compared to identify candidate identifier fields as those in which the field values differ in the different partitions, indicating that the field values change relatively quickly. Field types consistent with identifier fields are those that may contain values correlated with sources of event messages within control-program instruction sequences. Thus, for example, a field with Boolean type is not compatible with the requirements for identifier fields, since Boolean type can have only one of two values and therefore cannot identify sources of event messages.

Figure 38E:
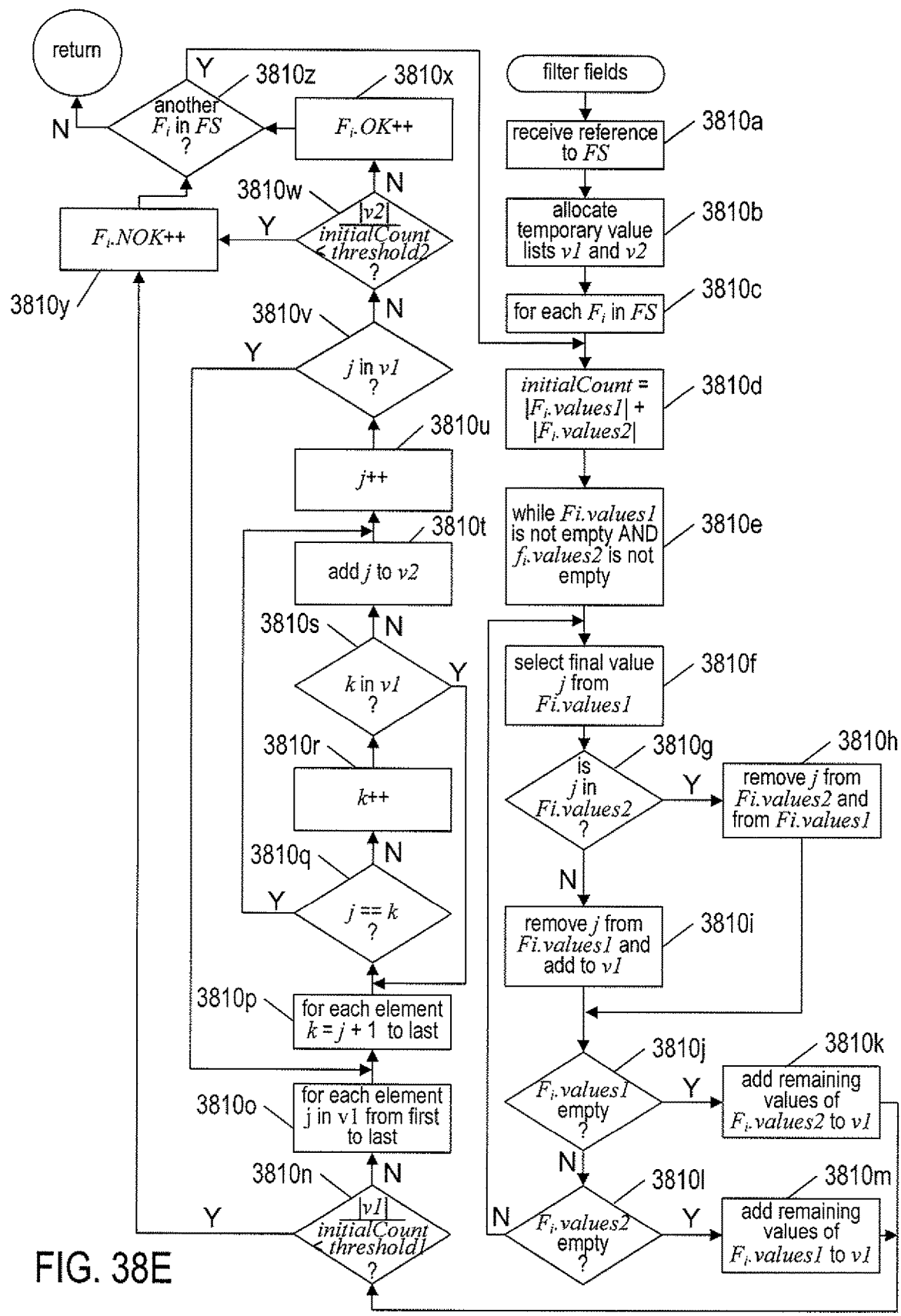

FIG. 38E provides a control-flow diagram for the routine "filter fields," called in step 3806h of FIG. 38C. In step 3810a, the routine "filter fields" receives a reference to the FS data structure. In step 3810b, two temporary field-value lists v1 and v2 are allocated. In the for-loop of steps 3810c-3810z, each node $F_i$ in the FS data structure is considered. In step 3810d, the local variable initialCount is set to the sum of the number of values in the two arrays values1 and values2 of the currently considered node $F_i$. Thus, the variable initialCount contains the total number of values for the field in the two arrays values1 and values2. In the while-loop of steps 3810e-3810m, values that occur both in $F_i$.values1 and $F_i$.values2 are removed from the two value arrays and the remaining values in the two arrays are removed from the two arrays and transferred to the temporary array or list v1. When the ratio of the number of values in v1 to the initial count is less than a first threshold, as determined in step 3810n, then the node count $F_i$.NOK is incremented, in step 3810y,eew3w to indicate that the value distribution in the currently considered node $F_i$ was unsatisfactory. A satisfactory distribution of values has the values prior to the median timestamp in the currently considered window for a field largely different from the values following the median timestamp in the currently considered event-record window. This means that the values of the field generally differ over short periods of time. Otherwise, in the nested for-loops of steps 3810o-3810v, the unique values in the list or array v1 are transferred to list or array v2. When the ratio of the number of the unique values to the initial count is less than a second threshold, as determined in step 3810w, then, in step 3810y, the counter $F_i$.NOK is incremented to indicate that the distribution of the values in the currently considered node $F_i$ was not compatible with an identifier field. This is because identifier fields should have mostly different values within any given time window or, in other words, could not remain constant over significant periods of time. When the values prior to the median timestamp in the currently considered event-record window differs substantially from the values following the median timestamp, and when most of the values for the field are unique within the currently considered time window, then the counter $F_i$.OK is incremented, in step 3810x, to indicate that the distribution of values for the currently considered field represented by node $F_i$ were compatible with the expected value distribution for an identifier field.

Figure 38F:
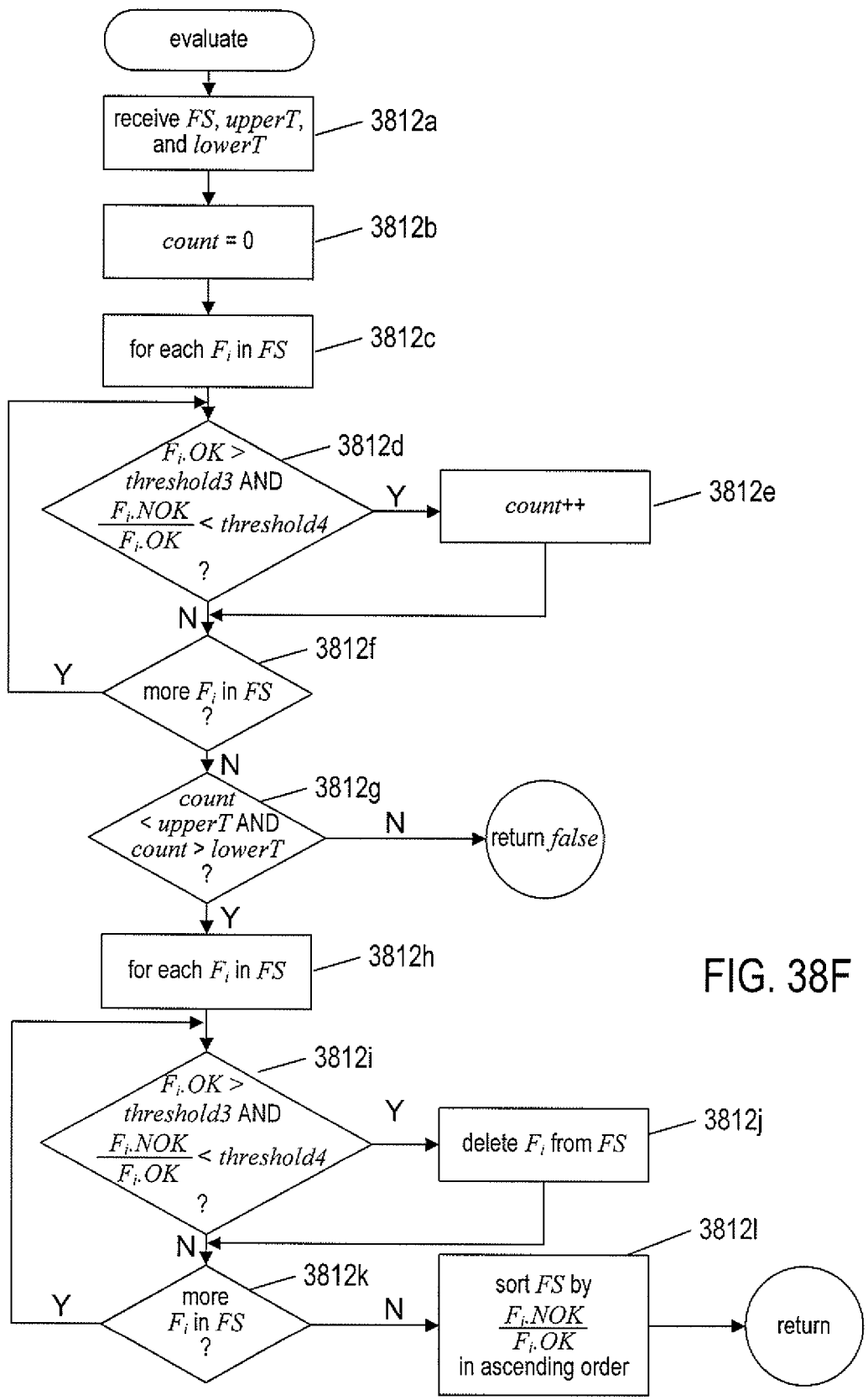

FIG. 38F provides a control-flow diagram for the routine "evaluate," called in step 3804g of FIG. 38B. The routine "evaluate" determines whether the data structure FS contains a sufficient number of viable candidate identifier fields to terminate the while-loop of steps 3804d-3804i in the routine "find identifier fields" shown in the control-flow diagram of FIG. 38B. In step 3812a, the routine "evaluate" receives the thresholds upperT and lowerT as well as the data structure FS. In step 3812b, the local variable count is set to 0. In the for-loop of steps 3812c-3812f, the number of acceptable candidate fields in the FS data structure are counted. A candidate field represented by a field node $F_i$ is acceptable when the count of acceptable value distributions in $F_i$.OK is greater than a threshold value and the ratio of unacceptable distributions to acceptable distributions is less than a different threshold value. When the number of acceptable fields is less than upperT and greater than lowerT, as determined in step 3812g, then, in the for-loop of steps 3812h-3812k, all of the unacceptable field nodes are removed from the FS data structure and the FS data structure is sorted, in step 3812l, in ascending order by the ratio of unacceptable to acceptable distributions. When the number of acceptable candidate fields does not fall in the desired range, as determined in step 3812g, then the routine "evaluate" returns the value false.

Figure 38G:
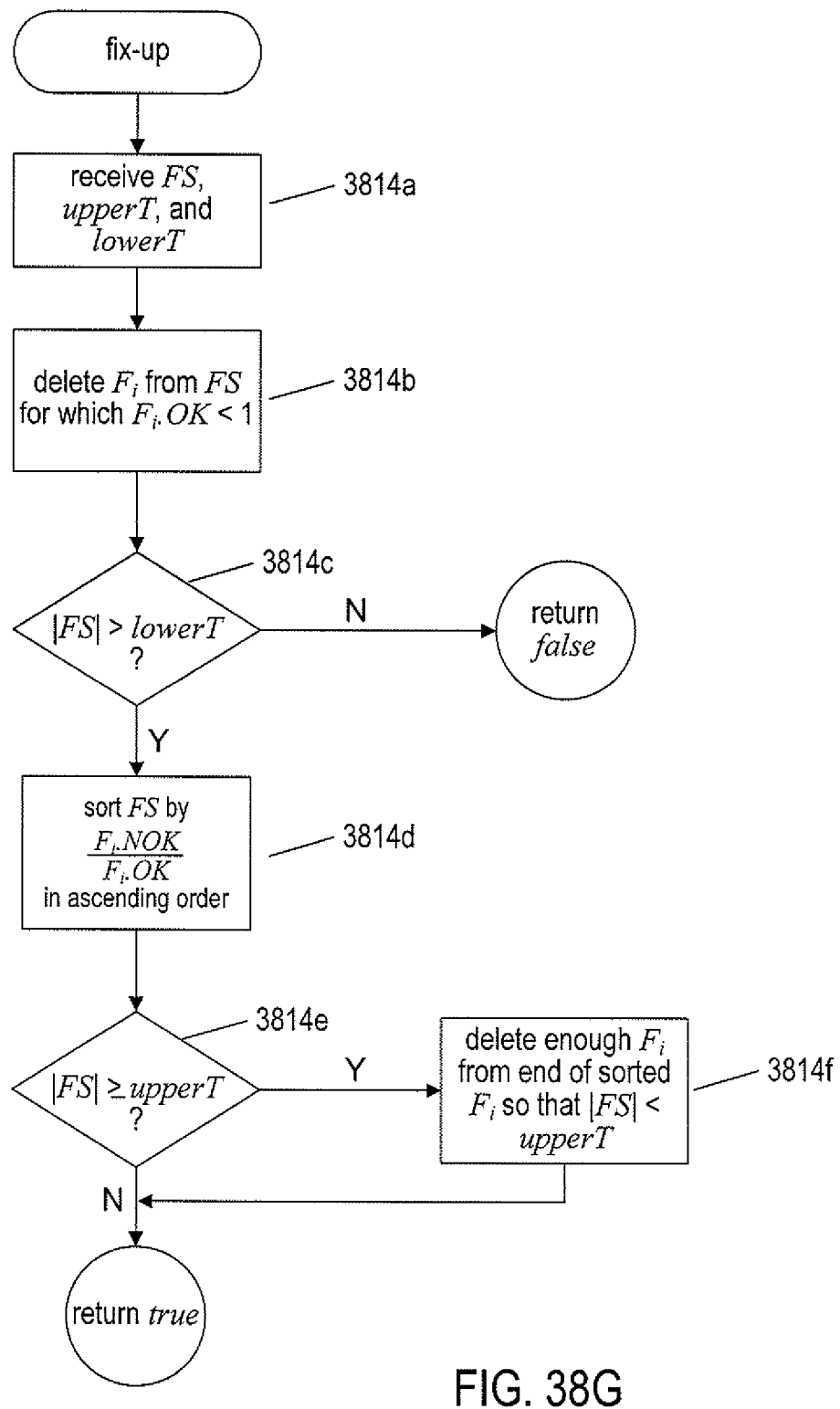

FIG. 38G provides a control-flow diagram for the routine "fix-up," called in step 3804j of FIG. 38B. The routine "fix-up" attempts to generate a set of candidate identifier fields from the fields contained in the FS data structure by retaining those fields for which at least one value distribution was acceptable, sorting the remaining fields, and then removing a sufficient number of the fields so that the number of fields is less than the upper threshold upperT. In step 3814a, the routine "fix-up" receives the FS data structure FS and the thresholds upperT and lowerT. In step 3814b, any field nodes $F_i$ are deleted from FS for which $F_i$.OK is less than 1. When the number of remaining fields is less than or equal to the threshold lowerT, as determined in step 3814c, then the routine "fix-up" returns a false value. Otherwise, in step 3814d, the remaining field nodes are sorted by the ratio of unacceptable to acceptable distributions and, in steps 3814e-3814f, the least desirable of the remaining fields are deleted in order that the number of candidate fields in the FS data structure is less than the upper threshold upperT.

Figure 38H:
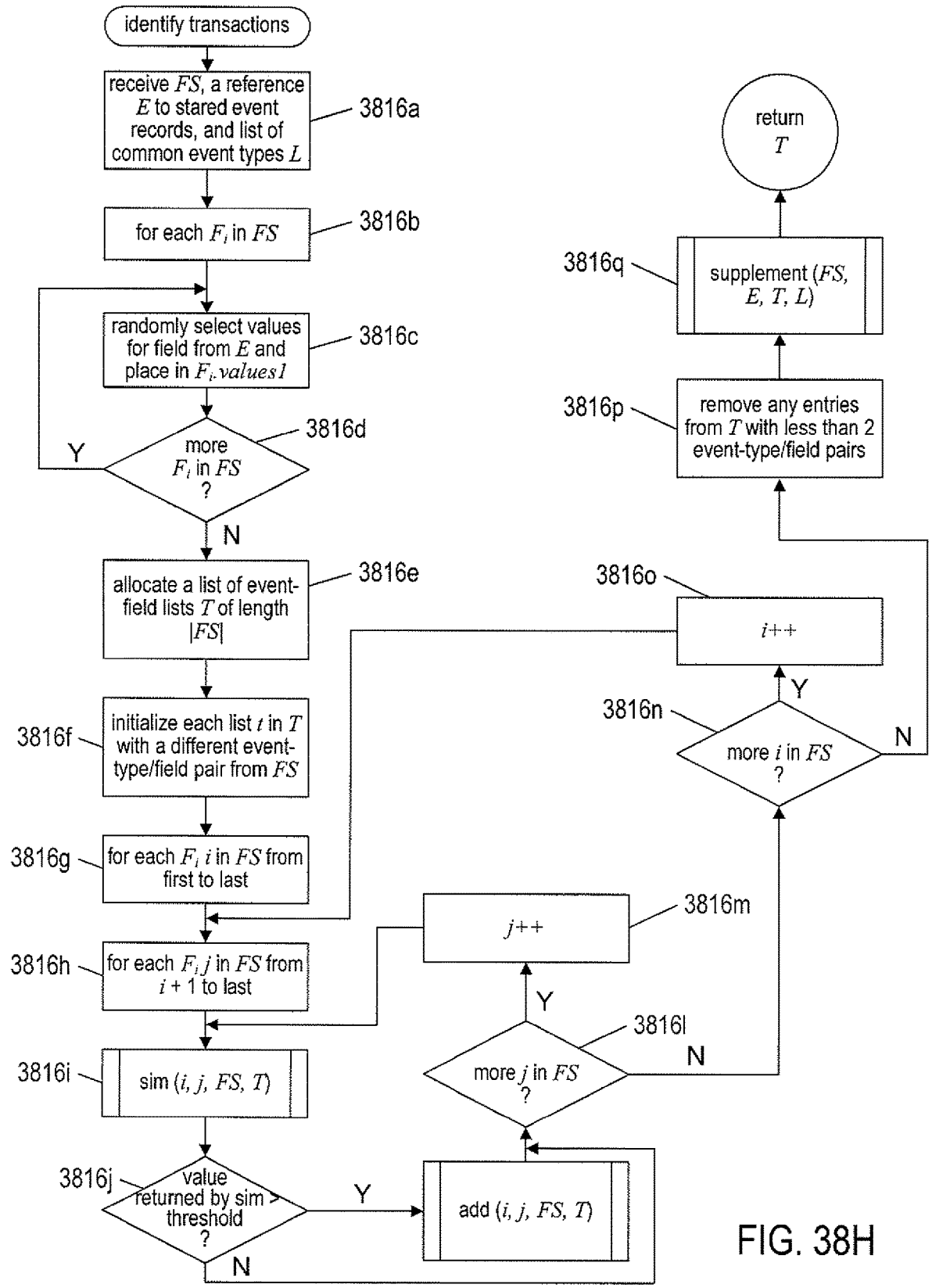

FIG. 38H provides a control-flow diagram for the routine "identify transactions," called in step 3802f of FIG. 38A. This routine uses the candidate identifier fields stored in the data structure FS and the stored set of event records E to identify a set of transactions T. In step 3816a, the routine "identify transactions" receives the FS data structure, a reference E to the stored event records, and a list of common event-message types L. In the for-loop of steps 3816b-d, field values are selected from the event records for each field represented by a field node $F_i$ and placed into the array $F_i$.values1 for that field. In step 3816e, a transactions data structure (3742 in FIG. 37B) is allocated and, in step 3816f, initialized with single-element transactions, each containing a different event-message-type/field pair, or e/f pair, corresponding to a node $F_i$ of the FS data structure. In other words, each e/f pair represented by a node $F_i$ in FS becomes the first element of each candidate's transaction in the transactions data structure. In the nested for-loops of steps 3816g-3816o, all possible pairs of candidate identifier fields are compared, using the function "sim," called in step 3816i, and when the field values of the pair of candidate identifier fields are sufficiently similar, the fields are combined together to form a multi-field transaction. As the nested for-loop progresses, transactions comprising larger numbers of candidate identifier fields are generated. In the outer for-loop of steps 3816g-3816o, each candidate identifier field represented by a field node $F_i$ is considered, from first to last in the set of candidate identifier fields FS. In the inner for-loop of steps 3816h-3816m, the candidate identifier fields following the currently considered candidate identifier field i are compared with the candidate identifier field i by a call to the routine "sim" in step 3816i. Note that the following candidate identifier fields j considered in the inner for-loop of steps 3815h-m may be multi-field transactions. When the currently considered candidate identifier field i compares favorably with one of the following candidate identifier fields j, the values of the currently considered candidate identifier field i are added to those of the candidate identifier field j, by a call to the routine "add," in step 3816k, and an e/f pair is added to the transaction corresponding to the candidate identifier field j. Following completion of the nested for-loops of steps 3816f-3816o, any transactions in the set of transactions T that contain less than two e/f pairs are removed, in step 3816p. Then, in step 3816q, the routine "supplement" is called to attempt to add any uncommon event-message types to the transactions in the set of transactions T.

Figure 38I:
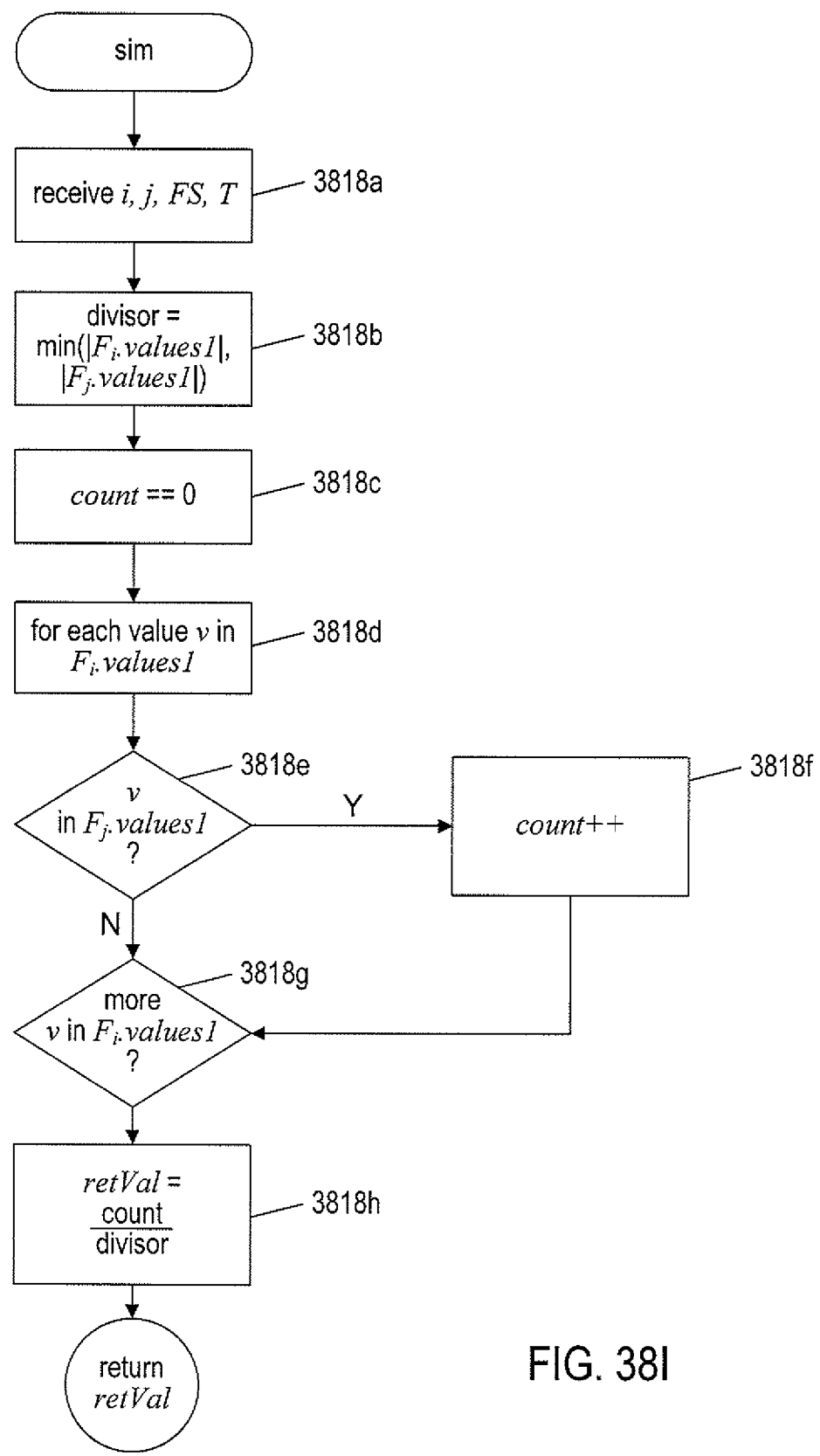

FIG. 38I provides a control-flow diagram for the routine "sim," called in step 3816i of FIG. 38H. In step 3818a, the routine "sim" receives the indexes or identifiers i and j for two nodes in the FS data structure along with the FS data structure and the transactions data structure T. In step 3818b, the local variable divisor is set to the minimum of the number of values contained in the two field nodes $F_i$ and $F_j$. In step 3818c, the local variable count is set to 0. In the for-loop of steps 3818d-3818g, the number of values in field node $F_i$ that also occur in field node $F_j$ are counted. The return value for the function "sim" is computed, in step 3818h, as the ratio of the contents of the local variable count to the contents of the local variable divisor. From a set standpoint, the return value is the cardinality of the intersection of the values in field nodes $F_i$ and $F_j$ divided by the minimum of the number of values in the two nodes. Again, note that as the nested for-loops of steps 3816g-3816o of FIG. 38H iterate, all of the field nodes except for the first field node in the set of field nodes FS may become nascent transactions and contain values representing the union of values of multiple candidate identifier nodes.

Figure 38J:
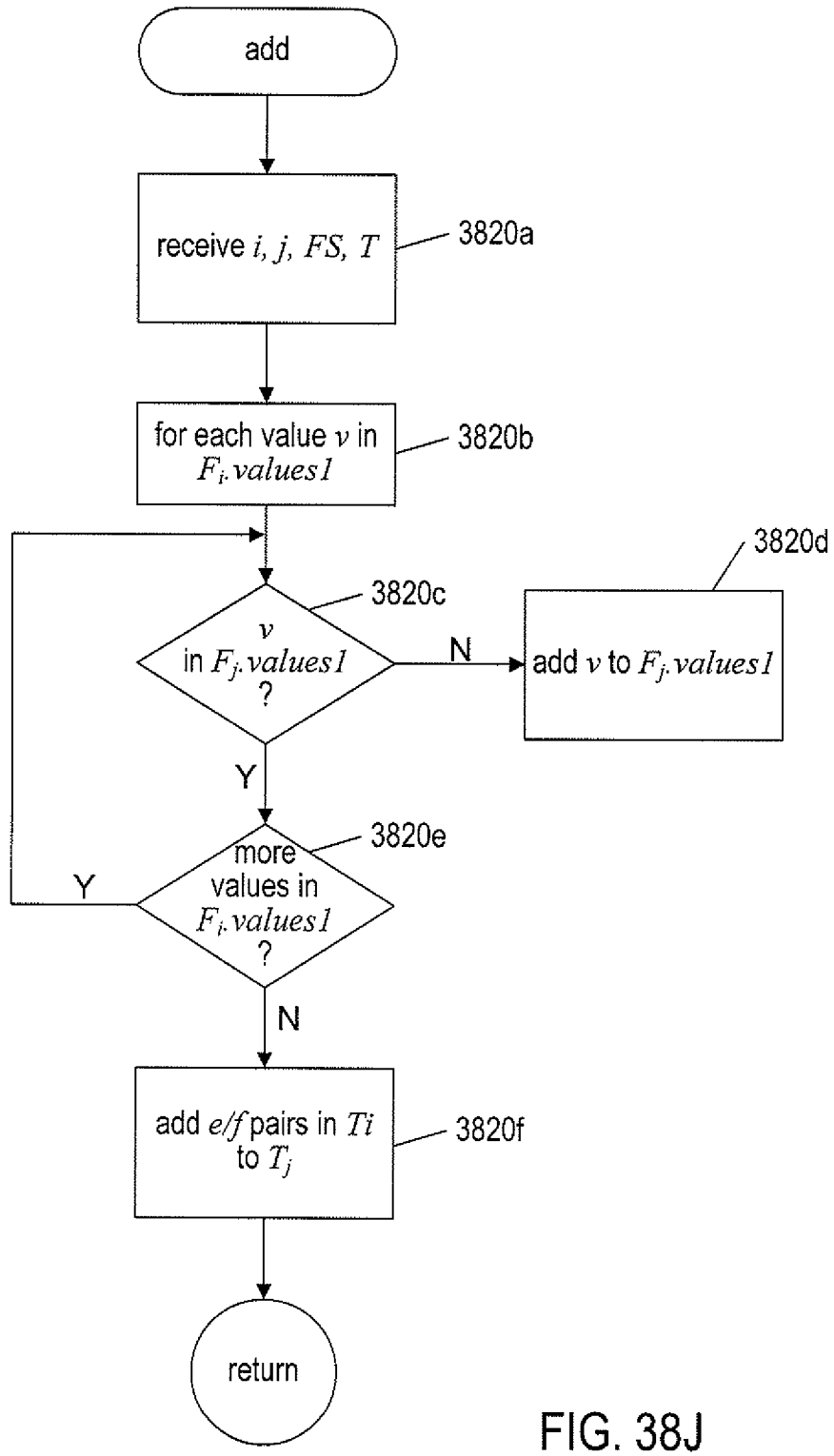

FIG. 38J provides a control-flow diagram for the routine "add," called in step 3816k of FIG. 38H. In step 3820a, the routine "add" receives indexes or identifiers i and j of two nodes in the FS data structure along with the transactions data structure T. In the for-loop of steps 3820b-3820e, the values in the field node i are added to the values in the field node j. In step 3820f, the e/f pairs in transaction $T_i$ are added to transaction $T_j$.

Figure 38K:
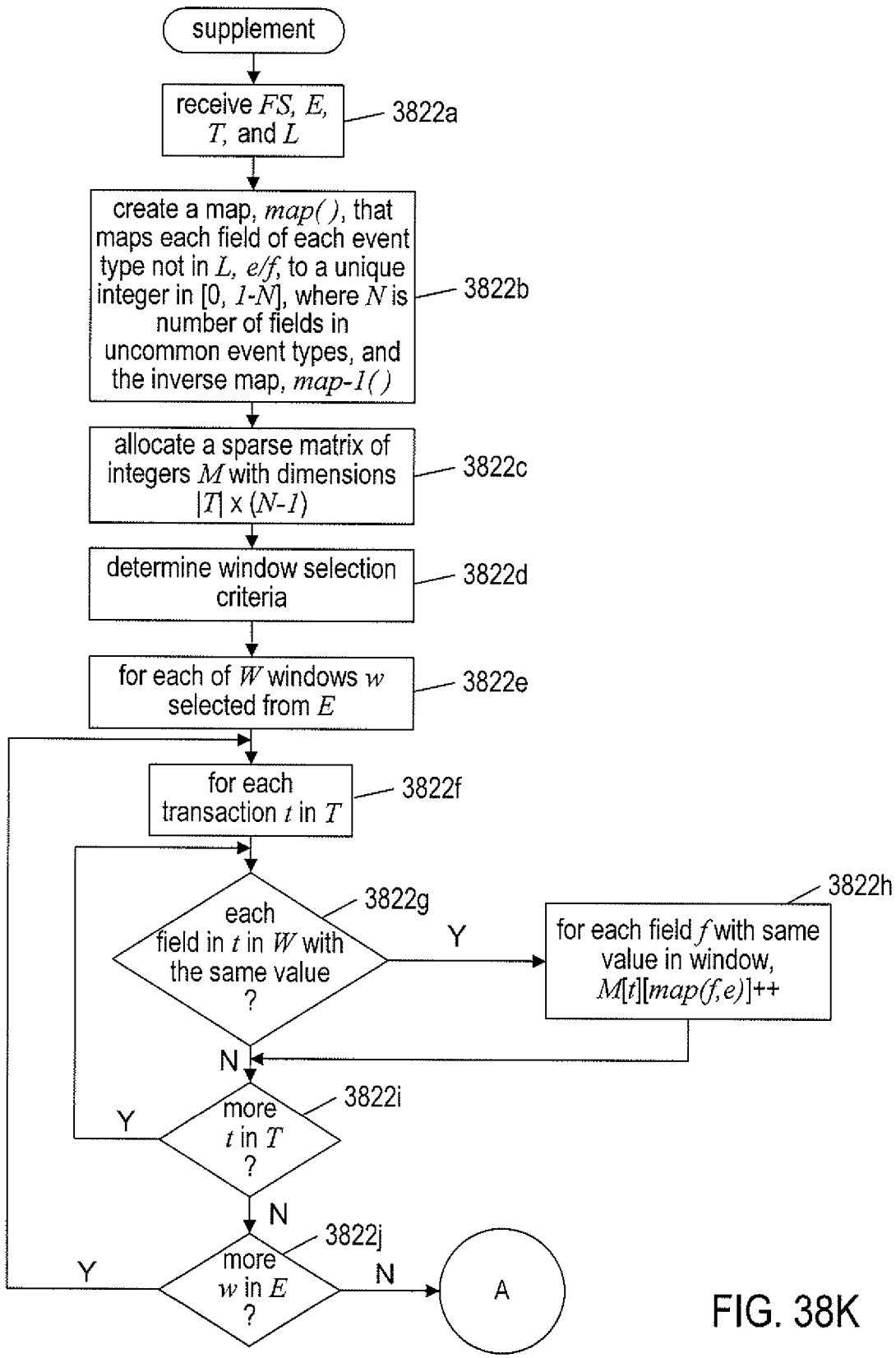
Figure 38L:
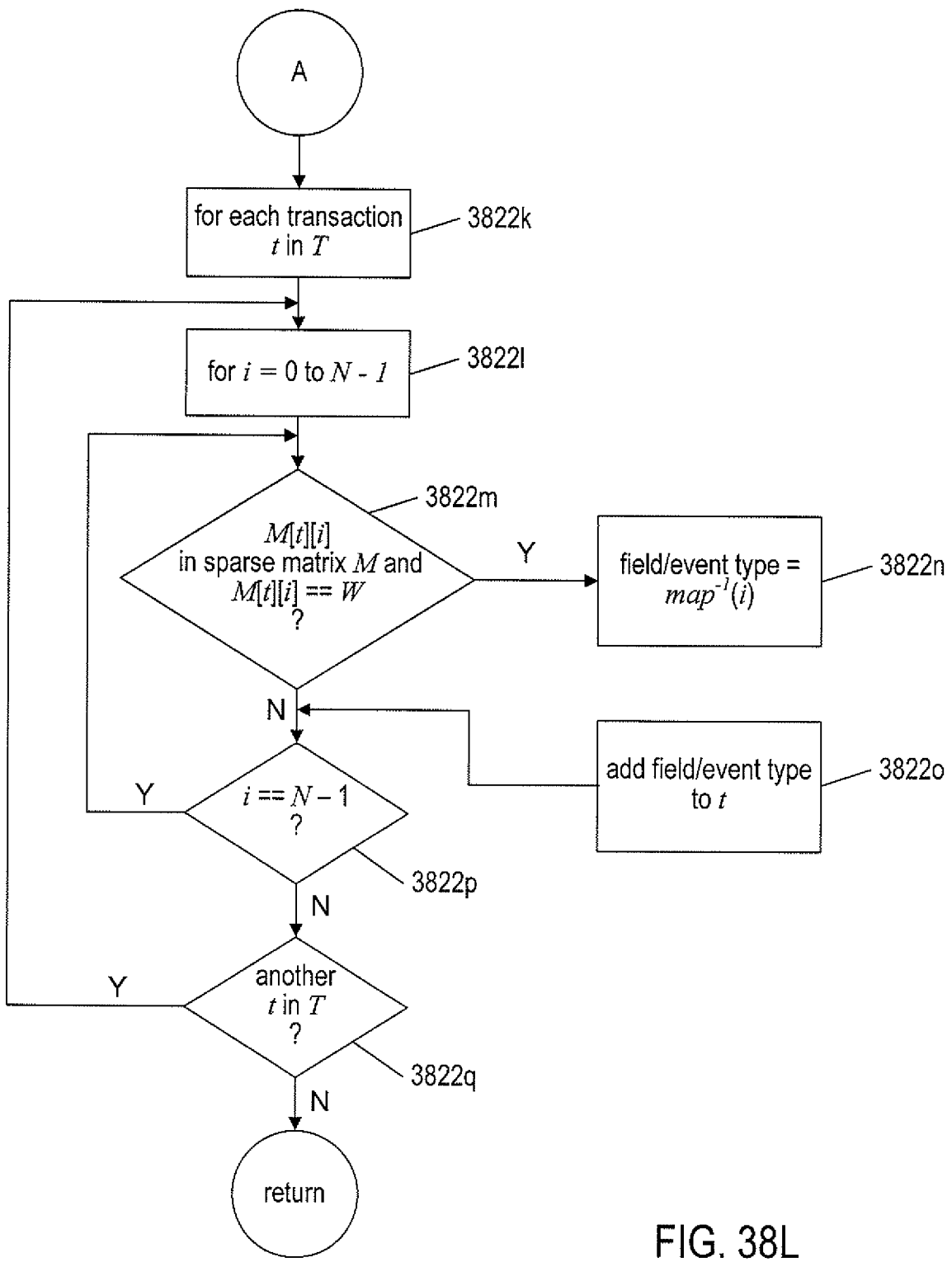

FIGS. 38K-L provide a control-flow diagram for the routine "supplement," called in step 3816q of FIG. 38H. In step 3822a, the routine "supplement," receives a reference to the FS data structure, a reference to the set of stored event records E, the transactions data structure T, and the list L of common event-message types. In step 3822b, the routine "supplement" creates a map, map[ ] that maps each field of each event-message type that is not common, or, in other words, not in the list L or, in other words, maps each e/f pair, to a unique integer in the range [0, 1–N], where N is the number of fields in uncommon event-message types. In addition, an inverse map, $map^{-1}$[ ] is also created. The map is used to generate indexes into a sparse matrix M. In step 3822c, the sparse matrix M is allocated. The sparse matrix M has dimensions |T|×(N–1). In step 3822d, window-selection criteria are determined. In the nested for-loops of steps 3822e-3822j, for each of W windows w within the stored event records E, each transaction t in the set of transactions T, when the transaction t occurs in the currently considered window, as determined in step 3822g, then a count in the matrix M for each uncommon-event-message-type field f that have the same value as the fields of the transaction is incremented, in step 3822h. Then, moving to FIG. 38L, the nested for-loops of steps 3822k-3822q, each transaction t in the set of transactions T is considered along with each of the uncommon-event-message-type fields. When the number of counts for a particular non-common event-message-type field is equal to the number of windows examined in the for-loop of steps 3822e-3822j in FIG. 38K, the uncommon-event-message-type field is added to the transaction in steps 3822n-3822o.

Both of the above-described methods may be used to enhance event-record-display applications in order to facilitate identification of meaningful patterns of event-message-type occurrences. The first counter-based method for identifying related event-message types, discussed above with reference to FIGS. 34A-36J, generates tables of co-occurrence, such as the table of co-occurrence shown in FIG. 36I, asynchronously as event records are processed. These tables of co-occurrence correspond to periods of time during event-record generation and processing, and can be used to identify related event-message types of event records generated during corresponding time periods. The methods discussed above with reference to FIGS. 37A-38L can be used to identify specific event-record transactions within an event log.

Figure 39:
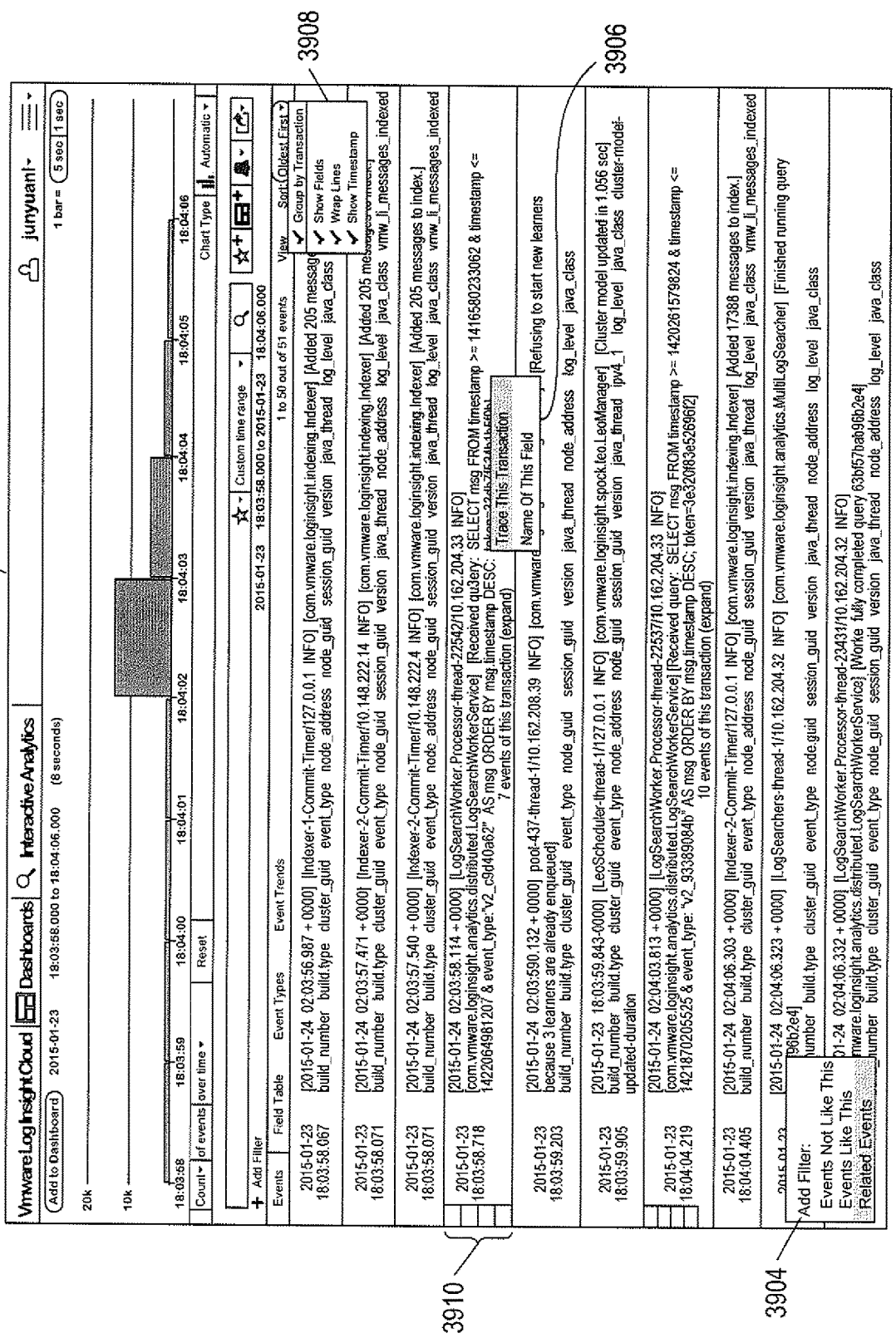
FIG. 39 illustrates various features provided in a user interface for viewing event logs and discovering state changes of interest.

FIG. 39 illustrates various features provided in a user interface for viewing event logs and discovering state changes of interest. A first feature 3904 overlaid above the event-log-display user interface 3902 is a pop-up inquiry that allows a user to filter displayed event messages so that event messages related to a particular, selected event message are displayed together. This filtering is carried out using the table of occurrences generated by the methods discussed above with reference to FIGS. 34A-36J. A second feature 3906 allows a user to select a field within an event message, and the user interface then uses the value of the field to identify a transaction that includes multiple event records with similar fields containing the same value. The set of transactions T generated by the second method described in FIGS. 37A-38L can be used to identify the transaction to which the event message belongs and then find other event messages of the transaction within the event log. Of course, a time window centered around the event message is used for transaction identification. A third feature 3908 allows a user to group event messages into transactions for display of transactions. In this case, the first and last messages of the transaction are displayed along with an indication 3910 that there are additional event messages within the transaction. User input to the indication 3910 allows a user to display an particular additional event message within the transaction or all of the event messages within the transaction. Many other user-interface features may be developed based on event-message transactions identified using the above-described methods.

Although the present invention has been described in terms of particular embodiments, it is not intended that the invention be limited to these embodiments. Modification within the spirit of the invention will be apparent to those skilled in the art. For example, any of many different alternative implementations can be obtained by varying any of many different design and implementation parameters, including choice of hardware components and configurations of distributed computer systems, choice of programming languages, operating systems, virtualization layers, control structures, data structures, modular organization, and other such design and implementation parameters. The methods for determining related event-message types and specific transactions depend on many different thresholds and considerations, the values of which may be varied to produce alternative implementations. Various types of automated feedback and verification may be employed to tune the transaction-identification methods.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A subsystem that identifies groups of related event-message types, the subsystem comprising:
   one or more processors;
   one or more memories;
   one or more data-storage devices; and
   computer instructions, stored in one or more of the one or more memories that, when executed by one or more of the one or more processors, control the subsystem to
      receive event messages from event-message sources within a distributed computer system that includes the subsystem;
      assign event-message types to the received event messages;
      count event-message-type co-occurrences, in time, within the received messages;
      determine and store in memory, from the counted event-message-type co-occurrences, pairs of related event-message types; and
      use the determined pairs of related event-message types to select, from one or more sets of event messages, related event-message types that are output to one or more of an automated analysis subsystem, a display device, and a system monitor.

2. The subsystem of claim 1 wherein the subsystem assigns an event-message type to each received event message by:
   identifying non-parameter tokens within the event messages;
   determining a feature vector generated from the non-parameter tokens identified within the event message,
   determining a distance between the determined feature vector and a feature vector associated with each event-message cluster, and
   assigning to the event message a type associated with a group of event messages associated with the feature vector at the smallest determined distance from the determined feature vector.

3. The subsystem of claim 1 wherein the subsystem counts event-message-type co-occurrences, in time, within the received messages by:
   maintaining a set of counters, each associated with two event-message types and a most-recent access time;
   maintaining each received event message in a memory buffer, along with a timestamp, in time order, along with earlier and later received messages until at least one more recently received event message in the memory buffer is outside an event-message window that includes the received event message; and
   counting each co-occurring event message in the memory buffer within the window that includes the received event message in a counter associated with the type of the co-occurring event message and the type associated with the received event message.

4. The subsystem of claim 3 wherein the window that includes the received event message includes additional event messages associated times that differ from the time associated with the received event message by less than a time-difference value.

5. The subsystem of claim 4 wherein the window that includes the received event message includes no more than a maximum number of additional event message.

6. The subsystem of claim 3 wherein counting each co-occurring event message in the memory buffer within the window that includes the received event message in a counter associated with the type of the co-occurring event message and the type associated with the received event message further comprises:
when one of the counters in the set of counters is associated with the type of the co-occurring event message and the type associated with the received event message,
setting the most-recent access time associated with the counter to the time represented by one of the timestamps associated with the co-occurring event message and the received event message, and
incrementing the counter; and
when no counters in the set of counters is associated with the type of the co-occurring event message and the type associated with the received event message,
reinitializing a counter in the set of counters having a most-recent access time earliest in time by
setting the most-recent access time associated with the counter to the time represented by one of the timestamps associated with the co-occurring event message and the received event message,
setting the counter to one, and
associating the counter with the type of the co-occurring event message and the type associated with the received event message.

7. The subsystem of claim 3 wherein the subsystem determines and stores in memory, from the counted event-message-type co-occurrences, pairs of related event-message types by:
for each event-message type associated with a counter,
determining a conditional probability for the co-occurrence of other event-message types associated with counters also associated with the event-message type;
generating a set of event-message-type pairs that each includes the event-message type and a different other co-occurring event-message type, the set ordered by conditional probability for the pairs; and
adding at most a fixed number of the event-message-type pairs with greatest conditional probabilities to determined and stored related event-message types.

8. The subsystem of claim 3 wherein event messages are one of:
raw event messages; and
event records that include the event-message type and the values of parameter fields.

9. A subsystem that identifies event-message transactions, the subsystem comprising:
one or more processors;
one or more memories;
one or more data-storage devices; and
computer instructions, stored in one or more of the one or more memories that, when executed by one or more of the one or more processors, control the subsystem to
receive a set of typed and time-stamped event messages from event-message sources within a distributed computer system that includes the subsystem;
identify a set of identifier fields among parameter fields of the received set of typed and time-stamped event messages;
determine and store in memory a set of multi-event-message transactions within the set of typed and time-stamped event messages; and
use the determined multi-event-message transactions to select, from one or more sets of event messages, multi-event-message transactions that are output to one or more of an automated analysis subsystem, a display device, and a system monitor.

10. The subsystem of claim 9 wherein the subsystem assigns an event-message type to each received event message by:
identifying non-parameter tokens within the event messages;
determining a feature vector generated from the non-parameter tokens identified within the event message,
determining a distance between the determined feature vector and a feature vector associated with each event-message cluster, and
assigning to the event message a type associated with a group of event messages associated with the feature vector at the smallest determined distance from the determined feature vector.

11. The subsystem of claim 9 wherein event messages are one of:
raw event messages, values of parameter fields within which are extracted by regular expressions; and
event records that include the event-message type and the values of parameter fields that are extracted by field types and positions associated with each type of event record.

12. The subsystem of claim 9 wherein event-message transactions comprise multiple event messages the co-occur within a time window and that have common values for each of one or more sets of identifier fields.

13. The subsystem of claim 12 wherein the subsystem identifies a set of identifier fields among parameter fields of the received set of typed and time-stamped event messages by:
for each of a number of common event-message types t,
for each of a number of time windows w,
for each of a number of initial candidate identifier fields f,
extracting two sets of values from typed and time-stamped event messages of event-message type t within time window w for field f, and
adding an evaluation of field f to a set of evaluations maintained for field f; and
for each of the number of common event-message types t,
for each of a number of candidate identifier fields f,
when the set of evaluations maintained for field f indicate that field f is an identifier field,
adding field f in association with type t to a final set of candidate fields.

14. The subsystem of claim 13 wherein initial candidate identifier fields are selected from event-message parameter fields to have field types that are associated with fields that store greater than a threshold number of different possible values and that occur in multiple types of event messages.

15. The subsystem of claim 13 wherein an evaluation is one of a positive evaluation and a negative evaluation.

16. The subsystem of claim 15 wherein adding an evaluation of field f to a set of evaluations maintained for field f further comprises:
  comparing the two sets of values extracted from typed and time-stamped event messages for field f;
  when the sets of values have more than a threshold number of common values and when a ratio of unique to total values in either set of values is below a threshold value, adding a negative evaluation to the set of evaluations maintained for field f; and
  when the sets of values have less than a threshold number of common values and when a ratio of unique to total values in either set of values is above a threshold value, adding a positive evaluation to the set of evaluations maintained for field f.

17. The subsystem of claim 15 wherein the set of evaluations maintained for field f indicate that field f is an identifier field when a ratio of positive evaluations to negative evaluations in the set of evaluations is greater than a threshold value.

18. The subsystem of claim 13 wherein the subsystem determines and stores in memory a set of multi-event-message transactions within the set of typed and time-stamped event messages by clustering fields of the final set of candidate fields by similarity, where the similarity between two fields f1 and f2 is a ratio of a cardinality of an intersection of two sets of sample values, one set of sample values for each field, to the minimum cardinality of the two cardinalities of the two sets of sample values.

19. The subsystem of claim 18 further comprising storing, as a transaction, a set of field/event-message-type pairs for each cluster as a different transaction.

20. Computer instructions encoded in a physical data-storage device that, when executed by one or more processors of a system having one or more memories, one or more data-storage devices, and a display device, control the system to:
  receive a set of typed and time-stamped event messages from event-message sources within a distributed computer system that includes the subsystem;
  identify a set of identifier fields among parameter fields of the received set of typed and time-stamped event messages;
  determine and store in memory a set of multi-event-message transactions within the set of typed and time-stamped event messages; and
  use the determined multi-event-message transactions to select, from one or more sets of event messages, multi-event-message transactions that are output to one or more of an automated analysis subsystem, a display device, and a system monitor.

* * * * *